(12) United States Patent
Murai et al.

(10) Patent No.: US 8,810,611 B2
(45) Date of Patent: *Aug. 19, 2014

(54) LIQUID CRYSTAL DISPLAY DEVICE

(75) Inventors: Takayuki Murai, Osaka (JP); Kohji Fujiwara, Osaka (JP); Hideki Ichioka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 304 days.

This patent is subject to a terminal disclaimer.

(21) Appl. No.: 13/379,174

(22) PCT Filed: Mar. 16, 2010

(86) PCT No.: PCT/JP2010/054392
§ 371 (c)(1),
(2), (4) Date: Dec. 19, 2011

(87) PCT Pub. No.: WO2011/001720
PCT Pub. Date: Jan. 6, 2011

(65) Prior Publication Data
US 2012/0098876 A1   Apr. 26, 2012

(30) Foreign Application Priority Data
Jul. 3, 2009 (JP) ................................. 2009-159087

(51) Int. Cl.
*G09G 5/10* (2006.01)

(52) U.S. Cl.
USPC .......................... 345/690; 345/102; 345/207

(58) Field of Classification Search
CPC . G09G 3/2014; G09G 3/2044; G09G 3/3406; G09G 3/342; G09G 3/3426; G09G 2320/064; G09G 2320/0646

USPC .......................................... 345/102, 690, 207
See application file for complete search history.

(56) References Cited

U.S. PATENT DOCUMENTS

| | | | |
|---|---|---|---|
| 6,762,743 B2 * | 7/2004 | Yoshihara et al. | 345/102 |
| 6,888,529 B2 * | 5/2005 | Bruning et al. | 345/102 |
| 6,980,225 B2 * | 12/2005 | Funamoto et al. | 345/691 |
| 7,095,393 B2 * | 8/2006 | Lee | 345/89 |

(Continued)

FOREIGN PATENT DOCUMENTS

| | | |
|---|---|---|
| JP | 2005-258404 A | 9/2005 |
| JP | 2006053520 A | 2/2006 |
| JP | 2006235461 A | 9/2006 |
| KR | 10-2009-0037281 | 4/2009 |

OTHER PUBLICATIONS

PCT/ISA/210.

*Primary Examiner* — Gregory J Tryder
*Assistant Examiner* — Peter D McLoone
(74) *Attorney, Agent, or Firm* — Harness, Dickey & Pierce

(57) ABSTRACT

A method is disclosed for controlling a light source installed in a liquid crystal display device. An embodiment includes a liquid crystal display panel for displaying an image by virtue of having liquid crystals whose orientation changes in response to application of a voltage; a backlight unit with a built-in PWM light modulation type LED for emitting light to be supplied to the liquid crystal display panel; and a control unit for controlling the liquid crystal display panel and the backlight unit. When the response speed of liquid crystal molecules is relatively high, the LED is driven at a relatively low drive frequency, and when the response speed of the liquid crystal molecules is relatively low, the LED is driven at a relatively high drive frequency.

19 Claims, 55 Drawing Sheets

(56) References Cited

U.S. PATENT DOCUMENTS

| | | | |
|---|---|---|---|
| 7,161,577 B2* | 1/2007 | Hirakata et al. | 345/102 |
| 7,209,129 B2* | 4/2007 | Sako et al. | 345/204 |
| 7,397,470 B2* | 7/2008 | Hata et al. | 345/204 |
| 7,595,784 B2 | 9/2009 | Yamamoto et al. | |
| 7,602,371 B2* | 10/2009 | Sultenfuss et al. | 345/102 |
| 7,679,628 B2* | 3/2010 | Kanai | 345/691 |
| 7,804,477 B2* | 9/2010 | Sawada et al. | 345/101 |
| 7,825,893 B2* | 11/2010 | Oka et al. | 345/102 |
| 7,893,917 B2* | 2/2011 | Baba et al. | 345/102 |
| 7,990,360 B2* | 8/2011 | Song et al. | 345/102 |
| 8,035,605 B2* | 10/2011 | Tsujii | 345/102 |
| 8,278,846 B2* | 10/2012 | Roberts et al. | 315/308 |
| 8,514,210 B2* | 8/2013 | Roberts et al. | 345/207 |
| 8,525,934 B2* | 9/2013 | Okui et al. | 348/687 |
| 2002/0067332 A1* | 6/2002 | Hirakata et al. | 345/102 |
| 2002/0070914 A1* | 6/2002 | Bruning et al. | 345/102 |
| 2003/0010894 A1* | 1/2003 | Yoshihara et al. | 250/208.1 |
| 2003/0098839 A1* | 5/2003 | Lee | 345/89 |
| 2003/0142118 A1* | 7/2003 | Funamoto et al. | 345/691 |
| 2003/0231194 A1* | 12/2003 | Morgan et al. | 345/691 |
| 2004/0046726 A1* | 3/2004 | Sako et al. | 345/98 |
| 2004/0207609 A1* | 10/2004 | Hata et al. | 345/204 |
| 2005/0057484 A1* | 3/2005 | Diefenbaugh et al. | 345/102 |
| 2005/0206660 A1* | 9/2005 | Kanai | 345/691 |
| 2005/0231457 A1 | 10/2005 | Yamamoto et al. | |
| 2006/0274023 A1* | 12/2006 | Sultenfuss et al. | 345/102 |
| 2007/0115228 A1* | 5/2007 | Roberts et al. | 345/82 |
| 2007/0216704 A1* | 9/2007 | Roberts et al. | 345/597 |
| 2007/0229443 A1* | 10/2007 | Sawada et al. | 345/101 |
| 2008/0074372 A1* | 3/2008 | Baba et al. | 345/89 |
| 2008/0074381 A1 | 3/2008 | Kumamoto | |
| 2008/0088574 A1* | 4/2008 | Tsujii | 345/102 |
| 2008/0117160 A1* | 5/2008 | Oka et al. | 345/102 |
| 2008/0191998 A1* | 8/2008 | Kuwabata | 345/102 |
| 2008/0315780 A1 | 12/2008 | Lee et al. | |
| 2009/0002310 A1* | 1/2009 | Kawaguchi et al. | 345/102 |
| 2009/0015536 A1* | 1/2009 | Takeoka et al. | 345/99 |
| 2009/0073343 A1* | 3/2009 | Kojima et al. | 349/61 |
| 2009/0091265 A1* | 4/2009 | Song et al. | 315/185 R |
| 2009/0096741 A1 | 4/2009 | Kim | |
| 2010/0328535 A1* | 12/2010 | Okui et al. | 348/578 |
| 2011/0084980 A1* | 4/2011 | Lee | 345/589 |
| 2011/0279486 A1* | 11/2011 | Kang | 345/690 |
| 2012/0086628 A1* | 4/2012 | Ichioka et al. | 345/102 |
| 2012/0086684 A1* | 4/2012 | Ichioka et al. | 345/207 |
| 2012/0086740 A1* | 4/2012 | Murai et al. | 345/690 |

\* cited by examiner

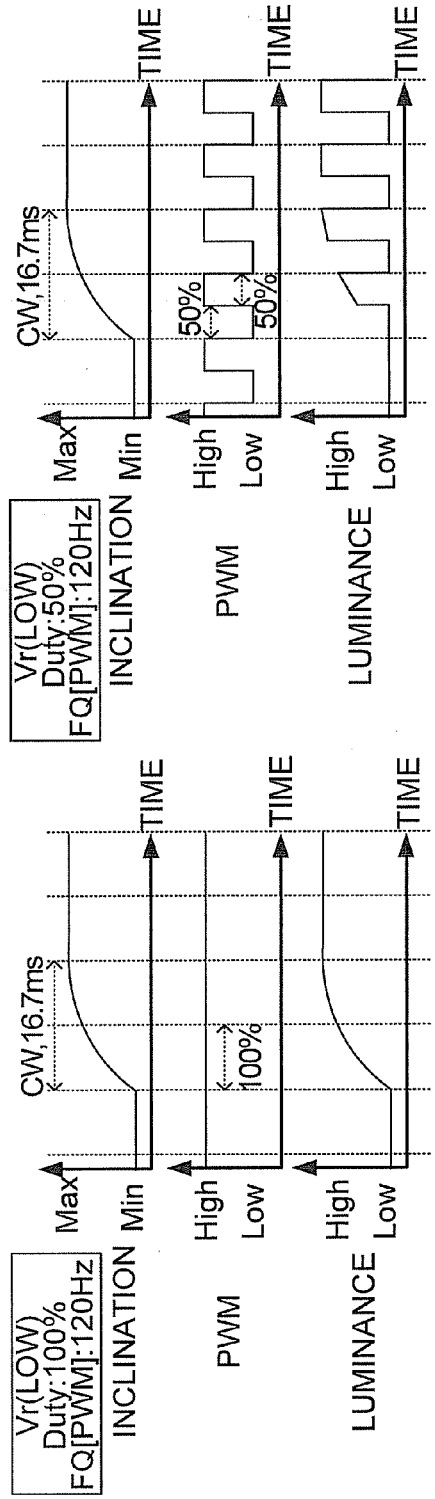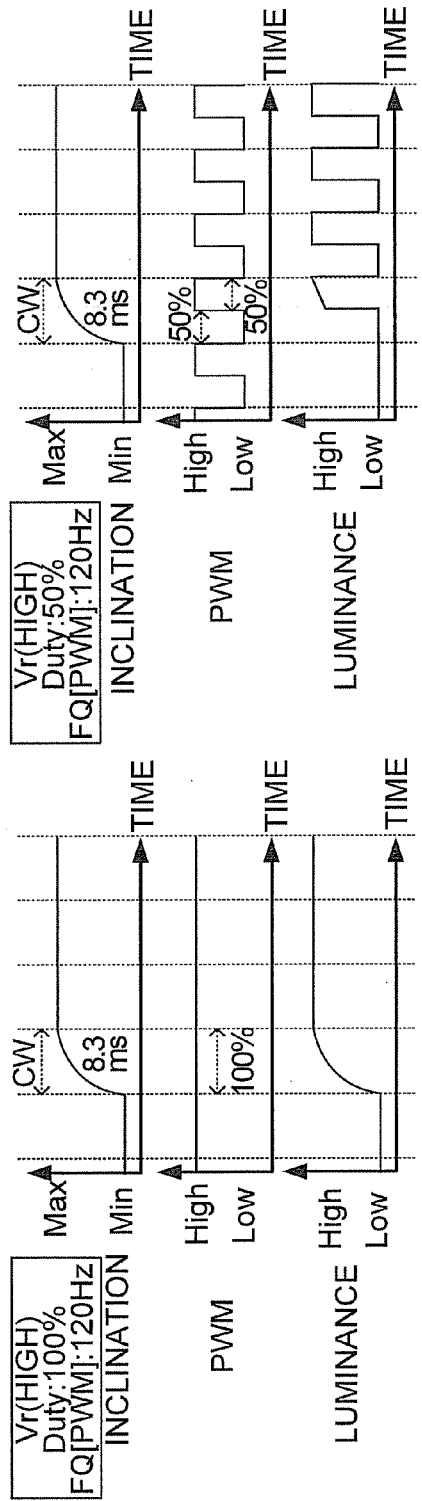

AFTERIMAGE

| PWM SIGNAL | 120Hz | | | |
|---|---|---|---|---|
| RESPONSE SPEED (Vr) OF THE LIQUID CRYSTAL MOLECULES | SLOW | | RAPID | |
| Duty | >50% | ≦50% | >50% | ≦50% |
| BLACK INSERTION RATIO (RATIO[BK]) | <50% | ≧50% | <50% | ≧50% |
| SHARPNESS | FAIR | EXCELLENT | GOOD | EXCELLENT |
| NON-OCCURRENCE OF GHOST OUTLINES | GOOD | POOR | EXCELLENT | EXCELLENT |
| GENERAL IMAGE QUALITY | GOOD | POOR | GOOD | EXCELLENT |

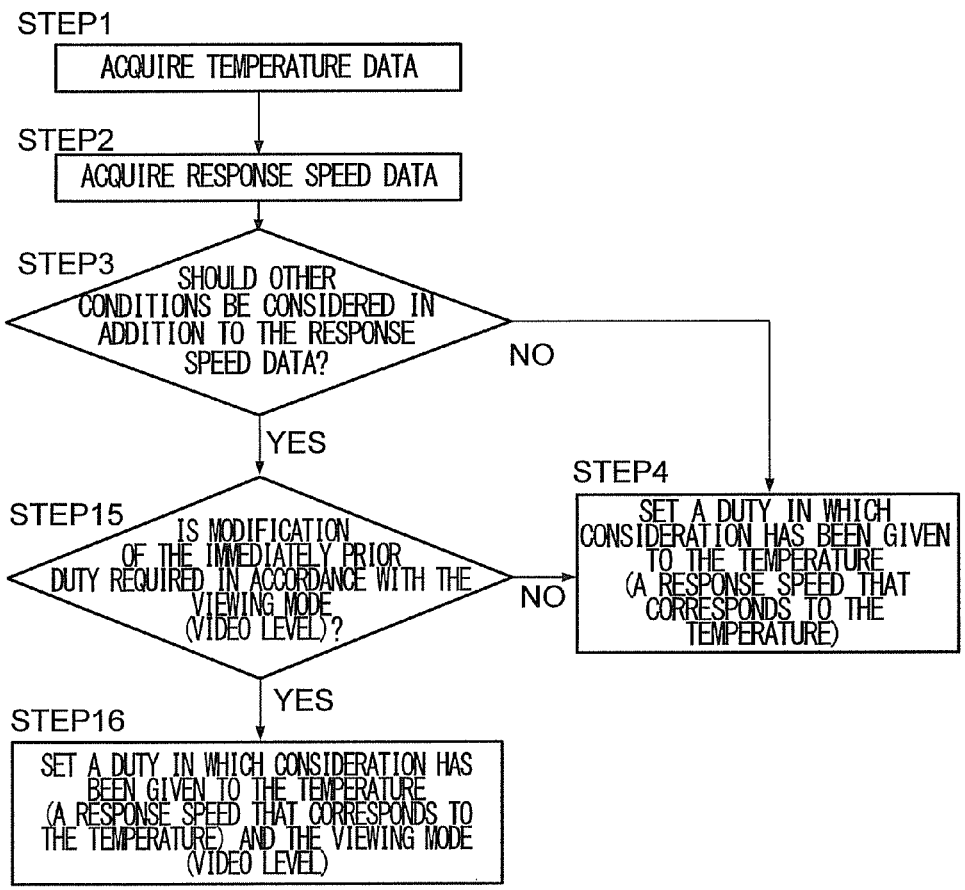

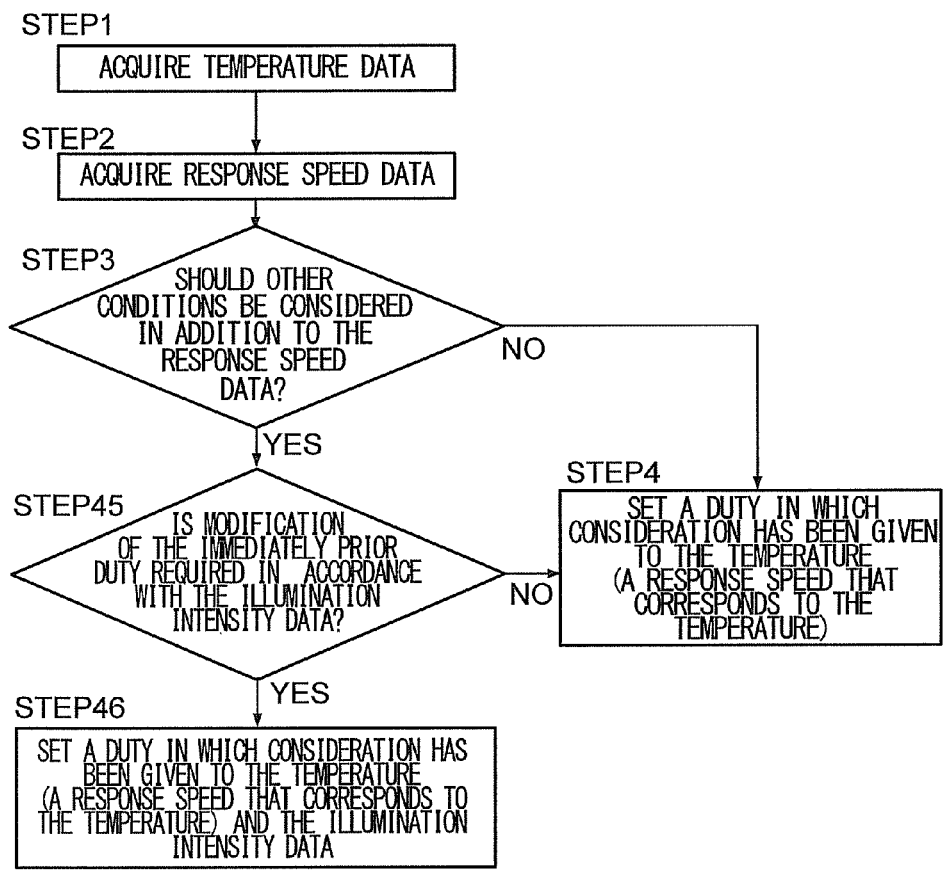

FIG.37

| MVA MODE | | |
|---|---|---|
| OVER | ⇐ OCCUPANCY RATIO ⇒ | BELOW |
| LOW | ⇐ GRADATION ⇒ | HIGH |
| Duty(HIGH) | ⇐ Duty ⇒ | Duty(LOW) |
| RATIO[BK] (LOW) | ⇐ RATIO [BK] ⇒ | RATIO[BK] (HIGH) |

FIG.55

| MVA MODE | | | |
|---|---|---|---|
| OVER | ⇐ OCCUPANCY RATIO ⇒ | | BELOW |
| DARK | ⇐ LUMINANCE ⇒ | | BRIGHT |
| LOW | ⇐ FQ[PWM] ⇒ | | HIGH |

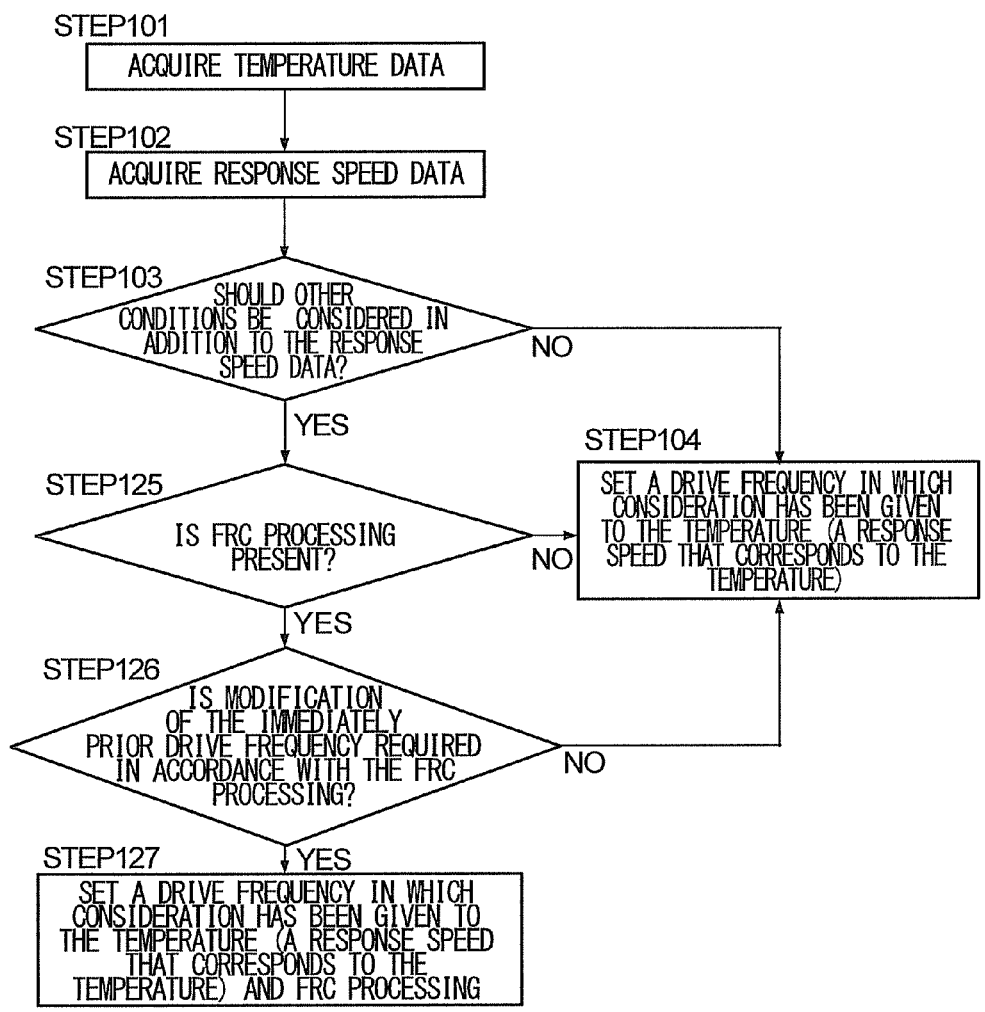

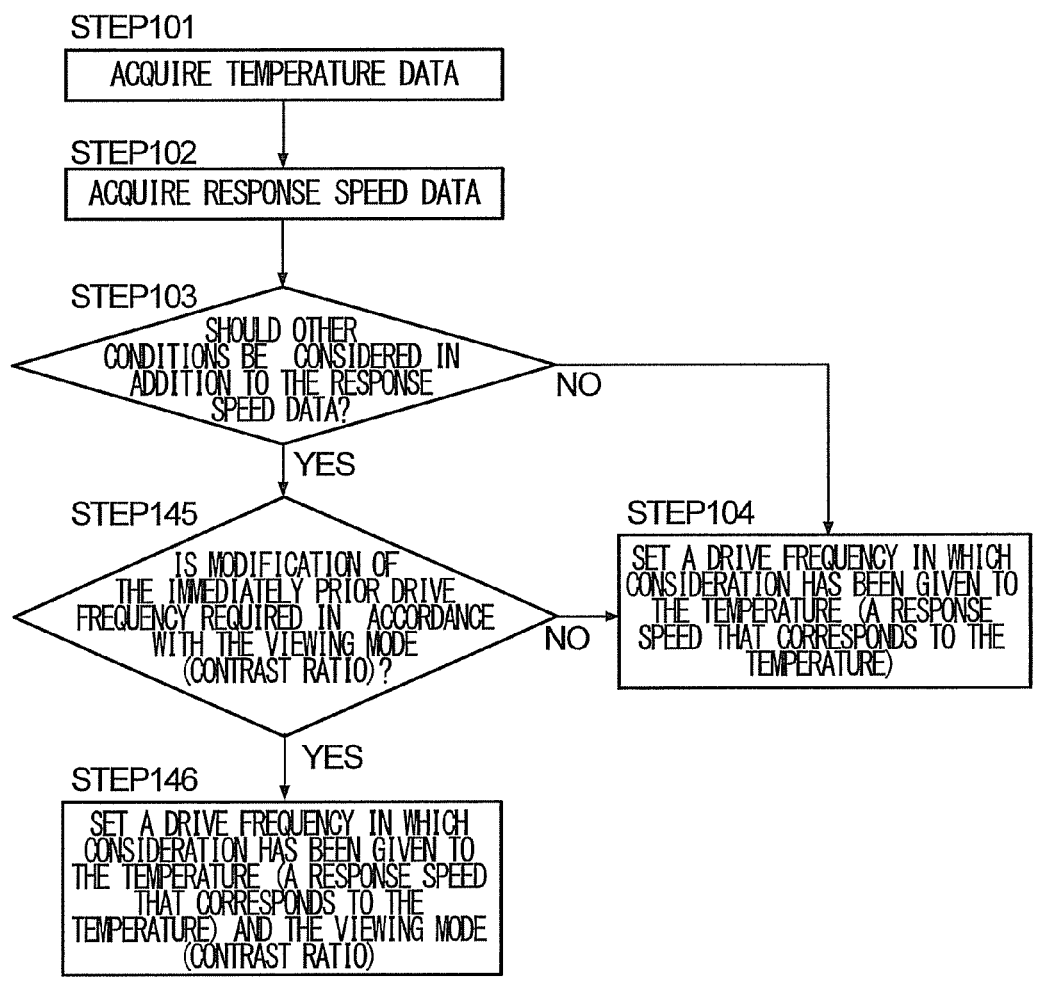

FIG.79

| VA-IPS MODE | | | |
|---|---|---|---|
| OVER | ⇐ | OCCUPANCY RATIO ⇒ | BELOW |
| MIDDLE | ⇐ | GRADATION ⇒ | HIGH/LOW |
| Duty(HIGH) | ⇐ | Duty ⇒ | Duty(LOW) |
| RATIO[BK] (LOW) | ⇐ | RATIO [BK] ⇒ | RATIO[BK] (HIGH) |

FIG.80

| VA-IPS MODE | | | |
|---|---|---|---|
| OVER | ⇐ | OCCUPANCY RATIO ⇒ | BELOW |
| MIDDLE | ⇐ | LUMINANCE ⇒ | BRIGHT /DARK |
| LOW | ⇐ | FQ[PWM] ⇒ | HIGH |

LIQUID CRYSTAL DISPLAY DEVICE

TECHNICAL FIELD

The present invention relates to a liquid crystal display device, which is a display device, and a method for controlling a light source installed in a liquid crystal display device.

BACKGROUND ART

In a liquid crystal display device (display device) in which a non-luminescent liquid crystal display panel (display panel) is installed, a backlight unit (illumination device) for supplying light to the liquid crystal display panel is ordinarily also installed. There are various types of light sources for a backlight unit. For example, in the case of the backlight unit described in Patent Document 1, the light source is a light-emitting diode (LED).

The LED is driven by pulse width modulation (PWM) control, which is well-known. In particular, an LED is set so as to turn on and off in chronological fashion in a single frame interval (in a single vertical interval).

Ordinarily, in the case of a "hold"-type display device such as a liquid crystal display device, the same image is displayed for an entire frame interval in continuous frame images. When this happens, the user will be able to continuously view an uninterrupted image and will sometimes perceive afterimages, blurring, or the like in the image.

In view of the above, the liquid crystal display device of Patent Document 1 turns LEDs on and off in a chronological fashion in single-frame intervals and artificially displays a single frame image in a non-continuous manner (setting the off-time in this manner is referred to as "black insertion"). In other words, the liquid crystal display device of Patent Document 1 performs driving similar to an impulse display device (for example, a display device in which a cathode ray tube (CRT) is installed). The liquid crystal display device thereby ensures, e.g., an improvement in video performance.

LIST OF CITATIONS

Patent Literature

Patent Document 1: Japanese Laid-open Patent Application No. 2006-53520

SUMMARY OF INVENTION

Technical Problem

However, the effects of various characteristics of liquid crystal are more readily manifested in the case that video performance is to be improved by black insertion. For example, a liquid crystal display panel varies light transmissivity from a backlight unit by using the tilt of liquid crystal molecules to display an image. Accordingly, image quality is readily affected by the tilt speed (response speed) of the liquid crystal molecules. In such a case, afterimages are not improved and ghost outlines and other image-quality degradation occur when only the LED on-time and off-time are uniformly varied depending on the response speed.

The present invention was devised in order to solve the problems described above. An object thereof is to provide a liquid crystal display device or the like that ensures improvement in image quality by controlling the light source with consideration given to the characteristics of liquid crystal.

Solution to Problem

The liquid crystal display device includes a liquid crystal display panel for displaying an image by having liquid crystal that changes orientation in accordance with application of a voltage; a backlight unit housing a PWM light-modulating light source that emits light to be supplied to the liquid crystal display panel; and a control unit for controlling the liquid crystal display panel and the backlight unit.

In this liquid crystal display device, the liquid crystal is included in the liquid crystal display panel and is disposed between two substrates; and a first electrode and a second electrode are aligned opposite one another on the surface of one of the substrates that faces the liquid crystal. Liquid crystal molecules included in the liquid crystal are of a positive type and are oriented so that a major-axis direction thereof is made to follow along the vertical direction of the two substrates in a case where a voltage is not applied to the two electrodes.

Furthermore, in this liquid crystal display device, the control unit acquires response speed data of orientation change of the liquid crystal molecules in the liquid crystal, and varies a drive frequency of a PWM light modulation signal in accordance with the response speed data.

With this configuration, the light emission of the light source is controlled with consideration given to the response speed of the liquid crystal molecules, i.e., the tilt state of the liquid crystal molecules. Accordingly, this liquid crystal display device prevents defects in image quality (ghost outlines and the like) that readily occur in accordance with the tilt amount of the liquid crystal molecules.

It is preferred that the control unit have at least one arbitrary response speed data threshold value, set a plurality of arbitrary response speed data ranges using the response speed data threshold value as a boundary, and vary the drive frequency for each of the response speed data ranges. With this configuration, defects in the image quality are further prevented because the drive frequency is varied in multiple stages.

In particular, it is preferred that the drive frequency be varied for each of the response speed data ranges so as to yield an inverse relationship with the magnitude relationship of the data values in the plurality of response speed data ranges.

The drive frequency is preferably equal to or greater than the frame frequency. Furthermore, the drive frequency is preferably an integral multiple of the frame frequency.

It is preferred that the liquid crystal display device comprise a first temperature sensor for measuring the temperature of the liquid crystal, wherein the control unit has a storage section for storing response speed data of the liquid crystal molecules with dependency on the liquid crystal temperature, and for storing at least one response speed datum as a response speed data threshold value; and acquires the response speed data by correlating the temperature data of the first temperature sensor and the liquid crystal temperature.

The liquid crystal display device has various functions for improving image quality. In view whereof, the control unit preferably sets the drive frequency that corresponds to such functions.

For example, the control unit has a histogram unit for generating histogram data showing a frequency distribution for gradation by forming a histogram from picture data. The control unit divides all gradations of the histogram data and judges whether the occupancy ratio in at least one specific gradation range among the divided gradation ranges exceeds or is equal to or less than an occupancy ratio threshold value.

Preferably, in a case where the occupancy ratio exceeds the occupancy ratio threshold value, the control unit sets the drive frequency to be less than the drive frequency in a case where the occupancy ratio is equal to or less than the occupancy ratio threshold value; and, in a case where the occupancy ratio is equal to or less than the occupancy ratio threshold value, the control unit sets the drive frequency to be greater than the drive frequency in a case where the occupancy ratio exceeds the occupancy ratio threshold value. With such a configuration, the drive frequency is set in correspondence with the function that uses the histogram data for improving image quality, and further improvement in image quality can be ensured.

The liquid crystal display device preferably comprises a first temperature sensor for measuring the temperature of the liquid crystal, wherein the control unit has a storage section for storing the occupancy ratio threshold value; and at least one of the specific gradation range and the occupancy ratio threshold value of the occupancy ratio is varied in accordance with the temperature data of the first temperature sensor.

In the case that the drive frequency is set in accordance with a function for improving image quality using histogram data in a liquid crystal display device in which such a liquid crystal display panel is installed, the drive frequency is preferably 480 Hz in the case that the frame frequency is 120 Hz, the temperature data is 20° C., and the specific gradation range is a gradation range of 100 or more and 192 or less among the entire gradation range of 0 or more and 255 or less.

The control unit preferably has an FRC processing section for carrying out frame rate control processing. Also, the control unit preferably varies the drive frequency in accordance with the presence of frame rate control processing of the FRC processing section. With this configuration, the drive frequency is set in accordance with the ON/OFF state of FRC processing, and a further improvement in the image quality is ensured.

The drive frequency in a case where frame rate control processing is carried out is preferably lower than the drive frequency in a case where frame rate control processing is not carried out.

The control unit has a viewing mode setting section for switching a viewing mode of the liquid crystal display panel; and in the case that the viewing mode setting section has switched the viewing mode, the control unit preferably varies the drive frequency in accordance with the selected viewing mode. With this configuration, the drive frequency is set in accordance with the viewing mode, and a further improvement in the image quality is ensured.

Since setting of the PWM (setting of the drive frequency of the PWM light modulation signal) can be performed for each viewing mode, it is preferred that in the case that the viewing mode setting section sets the high video level viewing mode and the low video level viewing mode in accordance with the video level of the picture data, the drive frequency be varied for each of the selected viewing modes so as to be in an inverse relationship with a high-low relationship of the video levels in the plurality of viewing modes.

Since setting of the PWM (setting of the drive frequency of the PWM light modulation signal) can be performed for each viewing mode, it is preferred that in the case that the viewing mode setting section sets the high contrast level viewing mode and the low contrast level viewing mode in accordance with the contrast level of the picture data, the drive frequency be varied for each of the selected viewing modes so as to be in an inverse relationship with the high-low relationship of the contrast levels in the plurality of viewing modes.

The control unit preferably acquires exterior illumination intensity data and varies the drive frequency in accordance with the illumination intensity data. With this configuration, the drive frequency is set in accordance with the light level of the environment in which the liquid crystal display device is placed, and a further improvement in the image quality is ensured.

The drive frequency is preferably varied for each illumination intensity data range so as to be in an inverse relationship with the magnitude relationship of the data values in each of the plurality of illumination intensity data ranges.

It is preferred that the liquid crystal display device comprise an illumination intensity sensor for measuring exterior illumination intensity, wherein the illumination intensity data is the illumination intensity measured by the illumination intensity sensor.

The control unit preferably synchronizes a final timing in a single frame interval and a final timing of a high interval in the PWM light modulation signal. With this configuration, light is not supplied in the initial stage of the tilting of the liquid crystal molecules. In other words, light is no longer supplied to the liquid crystal molecules which have not reached a predetermined angle, and due to this fact, defects in image quality are less likely to occur.

The control unit preferably matches a low interval of the PWM light modulation signal with an interval equal to at least one frame in continuous frames.

In the liquid crystal display device, a plurality of the light sources are preferably arranged so as to be capable of partially supplying light to a surface of the liquid crystal display panel. In view whereof, the plurality of light sources are divided, and the divided single or plurality of light sources constitutes a divided light source. In such a case, the control unit preferably varies the drive frequency for each of the divided light sources.

With this configuration, power consumption is reduced because all of the light sources are not controlled as a single unit, but can rather be partially controlled. Also, the drive frequency is locally varied, whereby partial light-amount control is achieved. Therefore, variation in the luminance level is reduced and optimal image quality can be provided.

For example, in the case that there are a plurality of divided light sources, the divided light sources emit linear light in the plane of the liquid crystal display panel, emit light in accordance with blocks obtained by dividing the plane interior in an ordered fashion, or emit light in accordance with a partial area in the plane.

The control unit preferably has a function for overdriving the voltage applied to the liquid crystal; and varies the drive frequency of the PWM light modulation signal in accordance with the presence of the overdriving. Such control is used for achieving improvement in image quality of the liquid crystal display device.

With the liquid crystal display described above, liquid crystal is contained in the liquid crystal display panel and is disposed between two substrates, a first electrode and a second electrode are aligned opposite one another on the surface of one of the substrates that faces the liquid crystal. Liquid crystal molecules contained in the liquid crystal are positive liquid crystals and are oriented so that the major-axis direction thereof is made to follow along a vertical direction of the two substrates in a case where voltage is not applied to the two electrodes.

In such a liquid crystal display device, particularly, in a liquid crystal display device comprising a liquid crystal display panel having liquid crystal that changes orientation in accordance with application of a voltage, and a backlight unit housing a PWM light-modulating light source that emits light to be supplied to the liquid crystal display panel, the light source is controlled using a control method such as the following. In other words, a step is included for acquiring response speed data of orientation change of liquid crystal molecules in the liquid crystal, and varying a drive frequency of a PWM light modulation signal in accordance with the response speed data.

In such a liquid crystal display device, particularly, in a liquid crystal display device comprising a liquid crystal display panel having liquid crystal that changes orientation in accordance with application of a voltage; a backlight unit housing a PWM light-modulating light source that emits light to be supplied to the liquid crystal display panel; and a control unit for controlling the liquid crystal display panel and the backlight unit, the light source is controlled using a light source control program such as the following. In other words, the control unit is made to execute a step for acquiring response speed data of orientation change of liquid crystal molecules in the liquid crystal, and varying a drive frequency of a PWM light modulation signal in accordance with the response speed data.

The present invention may also be regarded as a computer-readable recording medium on which a light source control program such as that described above is recorded.

Advantageous Effects of the Invention

In accordance with the present invention, the light emission of the light source is controlled in accordance with the tilt state of the liquid crystal molecules, which affects the transmissivity of the liquid crystal display panel. Accordingly, defects in image quality (ghost outlines and the like), which readily occur in accordance with the amount of tilt of the liquid crystal molecules, are prevented.

BRIEF DESCRIPTION OF DRAWINGS

FIG. 13A is a graph showing the tilt amount of the liquid crystal molecules, the waveform of the PWM light modulation signal, and the luminance variation with respect to time in the case that the light of the LED driven by PWM light modulation signal at 100% duty is supplied to liquid crystal having relatively low response speed;

FIG. 13B is a graph showing the tilt amount of the liquid crystal molecules, the waveform of the PWM light modulation signal, and the luminance variation with respect to time in the case that the light of the LED driven by PWM light modulation signal at 50% duty is supplied to liquid crystal having relatively low response speed;

FIG. 13C is a graph showing the tilt amount of the liquid crystal molecules, the waveform of the PWM light modulation signal, and the luminance variation with respect to time in the case that the light of the LED driven by PWM light modulation signal at 100% duty is supplied to liquid crystal having relatively high response speed;

FIG. 13D is a graph showing the tilt amount of the liquid crystal molecules, the waveform of the PWM light modulation signal, and the luminance variation with respect to time in the case that the light of the LED driven by PWM light modulation signal at 50% duty is supplied to liquid crystal having relatively high response speed;

FIG. 27 is a flowchart of a case where the duty of the PWM light modulation signal is set with consideration given to the viewing mode (modification of the video level);

FIG. 28 is a chart showing the relationship between the video level and the duty of the PWM light modulation signal (black insertion ratio);

FIG. 32 is a flowchart of a case where the duty of the PWM light modulation signal is set with consideration given to an environment adaptation function;

FIG. 33 is a chart showing the relationship between the illumination intensity data used by the environment adaptation function and the duty of the PWM light modulation signal (black insertion ratio);

FIG. 37 is a chart showing the relationship between the occupancy ratio of a specific gradation range used in the picture signal adaptation function, the gradation value, and the duty (black insertion ratio) of the PWM light modulation signal (where the liquid crystal is MVA mode liquid crystal);

FIG. 55 is a chart showing the relationship between the occupancy ratio of a specific gradation range used in a picture signal adaption function, the luminance, the duty of the PWM light modulation signal, and the drive frequency of the PWM light modulation signal (where the liquid crystal is MVA mode liquid crystal);

FIG. 56 is a flowchart of a case where the drive frequency of the PWM light modulation signal is set with consideration given to FRC processing;

FIG. 57 is a chart showing the relationship between the presence of FRC processing and the drive frequency of the PWM light modulation signal;

FIG. 60 is a flowchart of a case where the drive frequency of the PWM light modulation signal is set with consideration given to the viewing mode (modification of the contrast ratio);

FIG. 61 is a chart showing the relationship between the contrast ratio and the drive frequency of the PWM light modulation signal;

FIG. 79 is a chart showing the relationship between the occupancy ratio of a specific gradation range used in the picture signal adaptation function, the gradation value, and the duty (black insertion ratio) of the PWM light modulation signal (for VA-IPS mode liquid crystal); and FIG. 80 is a chart showing the relationship between the occupancy ratio of a specific gradation range used in the picture signal adaptation function, the luminance, the duty of the PWM light modulation signal, and the drive frequency of the PWM light modulation signal (for VA-IPS mode liquid crystal).

DESCRIPTION OF EMBODIMENTS

Embodiment 1

Figure 1:
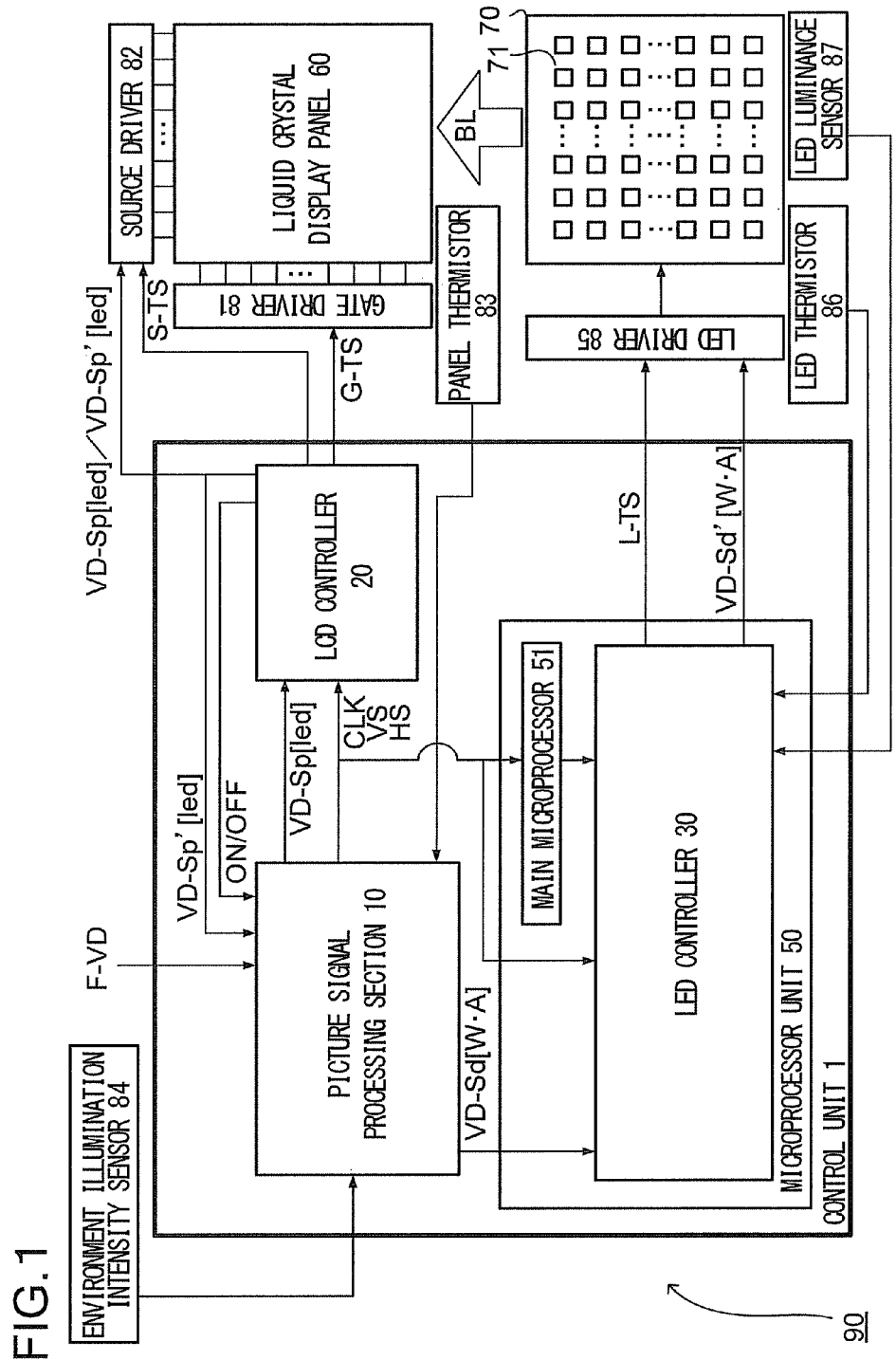
FIG. 1 is a block diagram of a liquid crystal display device.

A description of embodiments is provided below with reference to the drawings. There may be cases in which members, reference numerals, and the like are omitted for convenience, but in such cases, reference shall be made to other drawings. There may be cases in which a reference numeral indicating a signal type is assigned to an arrow indicating the travel direction of the signal, but the arrow does not refer to the travel direction solely of the indicated signal type. Flowcharts showing steps of operation are examples; no limitation is imposed by the flow of operation thereof.

The numbers, examples, graphs, and the like are merely examples; no limitation is imposed by the numbers and graph lines. In the description below, a liquid crystal display device is used as an example of a display device, but no limitation is imposed thereby; application can also be made to other display devices.

<Liquid Crystal Display Device>

Figure 2:
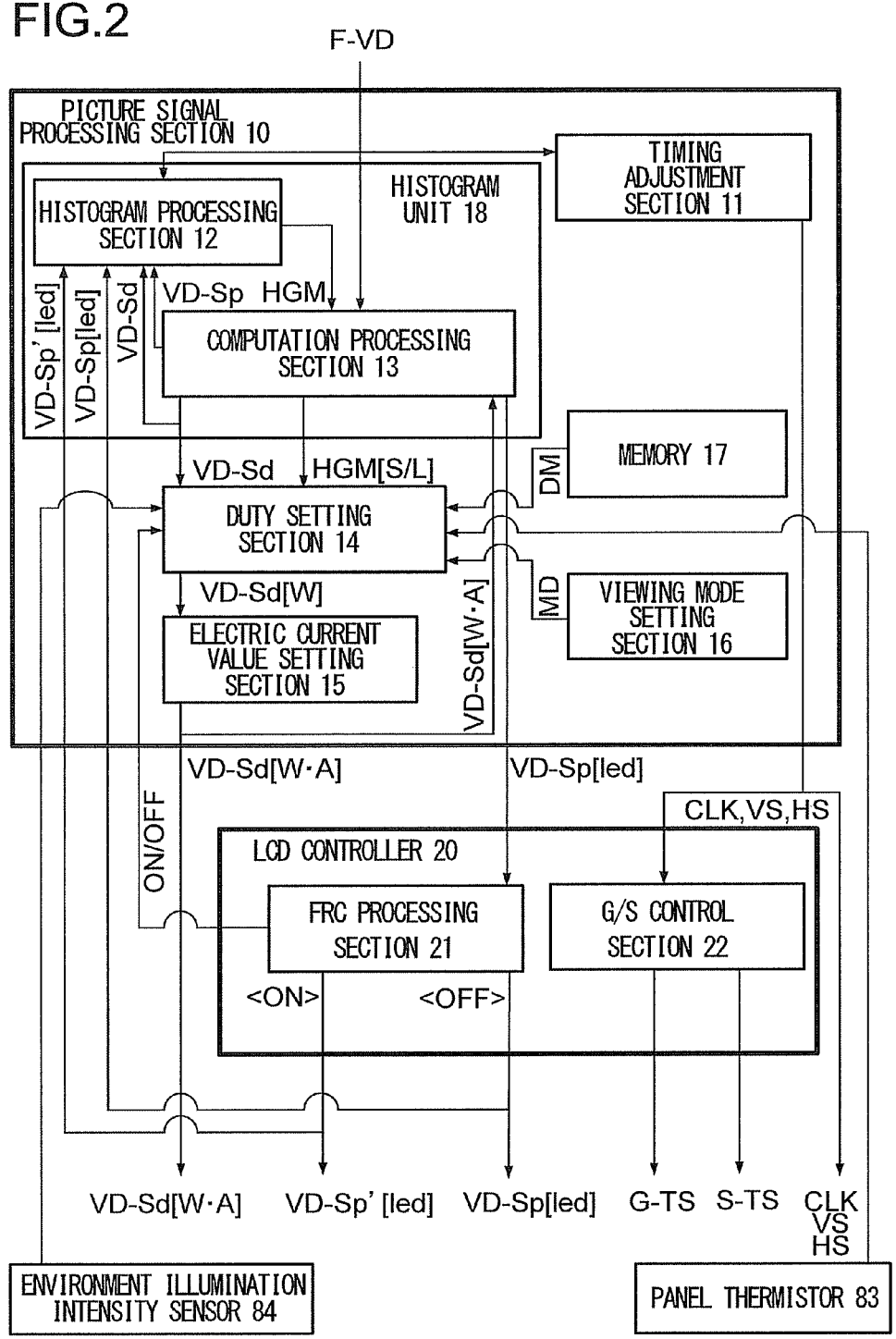
FIG. 2 is a block diagram in which a portion of the block diagram of the liquid crystal display device has been extracted and shown in greater detail.
Figure 3:
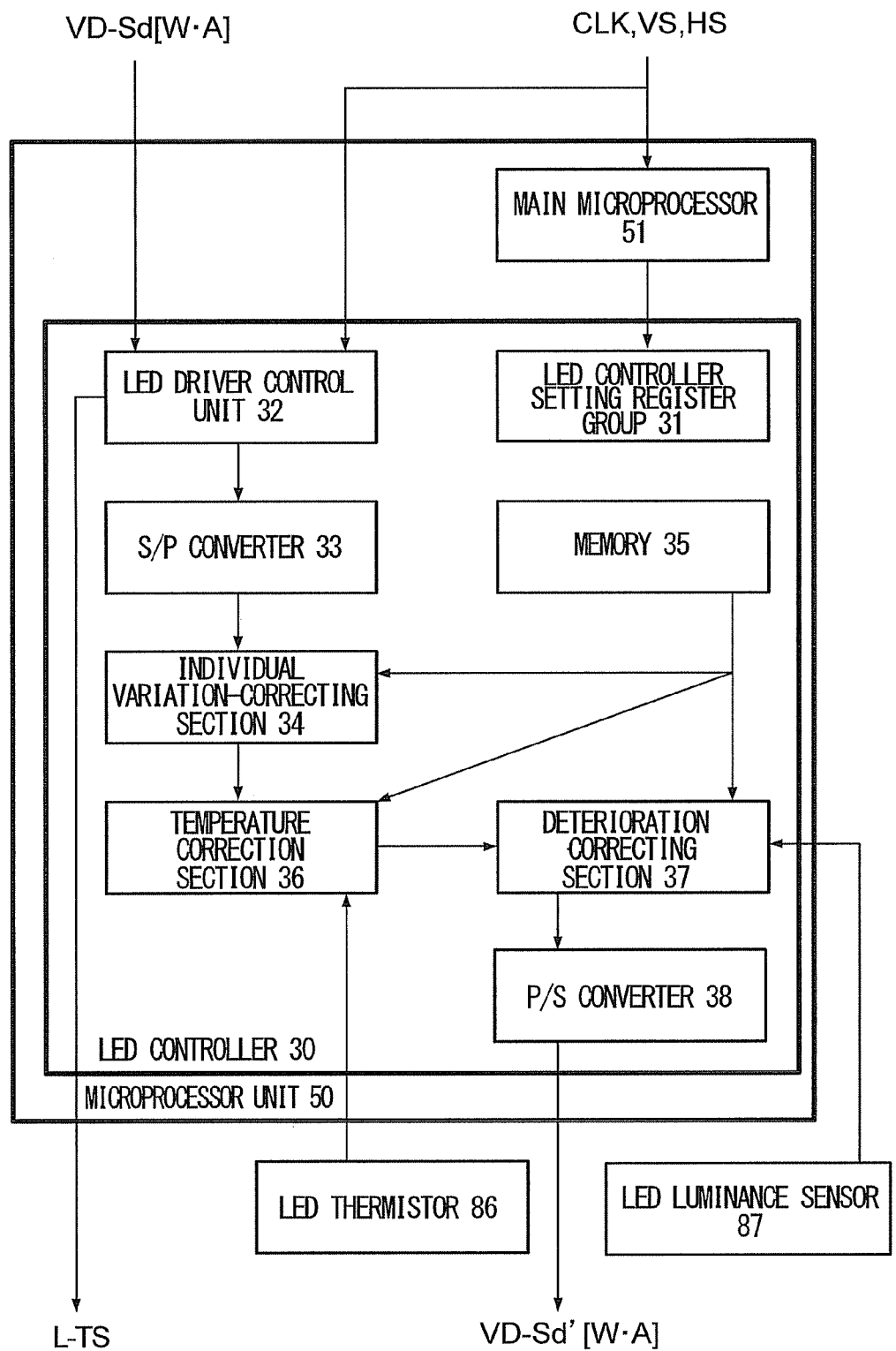
FIG. 3 is a block diagram in which a portion of the block diagram of the liquid crystal display device has been extracted and shown in greater detail.

FIGS. 1 to 3 are block diagrams showing various members related to the liquid crystal display device 90 (FIGS. 2 and 3 are block diagrams in which a portion of FIG. 1 has been extracted and shown in greater detail). The liquid crystal display device 90 includes a liquid crystal display panel 60, a backlight unit 70, a gate driver 81, a source driver 82, a panel thermistor 83, an environment illumination intensity sensor 84, an LED driver 85, an LED thermistor 86, an LED luminance sensor 87, and a control unit (control unit) 1, as shown in FIG. 1.

The liquid crystal display panel 60 has liquid crystal 61 (liquid crystal molecules 61M) sandwiched between an active matrix substrate 62 and an opposing substrate 63 (see FIG. 4, described later), and seals in the liquid crystal 61 using a seal material (not shown). Gate signal lines and source signal lines are arranged in mutually intersecting fashion on the active matrix substrate 62, and a switching element (e.g., thin film transistor) required for adjusting the voltage applied to the liquid crystal 61 is arranged at the intersection of the two signal lines.

The backlight unit 70 includes, e.g., a light source (light-emitting element) such as a light-emitting diode (LED) 71 as shown FIG. 1, and supplies light from the LEDs 71 to the non-luminescent liquid crystal display panel 60. At this point, in the liquid crystal display device 90, the orientations of the liquid crystal molecules 61M are adjusted in accordance with the applied voltage, whereby the transmissivity of the liquid crystal 61 is partially varied (essentially, the amount of light transmitted from the backlight unit 70 to the exterior is varied), and the displayed image is varied.

There are many types of LEDs 71 included in the backlight unit 70. Examples include LEDs 71 that emit white light, red light, green light, and blue light.

However, in the case of LEDs 71 that emit white light, the backlight also becomes white due to that fact that all of the LEDs 71 installed in the backlight unit 70 are white light-emitting diodes. There are also many methods for generating white light. Examples include LEDs 71 that generate white light using mixed colors, including a red LED chip, a green LED chip, and a blue LED chip; and LEDs 71 that generate white light using fluorescent emission.

In the case of LEDs 71 that emit light other than white light, white backlight is generated by color mixing. Therefore, the LEDs 71 included in the backlight unit 70 are a red light-emitting LED 71, a green light-emitting LED 71, and a blue light-emitting LED 71.

The arrangement is not particularly limited, regardless of the type of LED 71, and a matrix arrangement is given as an example, as shown in FIG. 1. The LEDs 71 are driven by pulse width modulation (PWM) control, which is well-known.

The gate driver 81 is a driver for supplying a gate signal G-TS, which is a control signal (timing signal) of the switching element, to the gate signal line of the liquid crystal display panel 60. The gate signal G-TS is generated by the control unit 1.

The source driver 82 is a driver for supplying a pixel write signal (the LCD picture signal VD-Sp'[led], or the LCD picture signal VD-Sp[led]; described in detail later) as an example of image data to the source signal line of the liquid crystal display panel 60. More specifically, the source driver 82 supplies a write signal to the source signal line on the basis of a timing signal S-TS generated by the control unit 1 (the write signal and the timing signal S-TS are generated by the control unit 1).

The panel thermistor (first temperature sensor) 83 is a temperature sensor for measuring the temperature of the liquid crystal display panel 60, more specifically, the temperature of the liquid crystal 61 contained in the liquid crystal display panel 60. The reason for the use of a panel thermistor 83 is described later.

The environment illumination intensity sensor 84 is a photometric sensor for measuring the illumination intensity of the environment in which the liquid crystal display device 90 is placed. The reason for the use of an environment illumination intensity sensor 84 is described later.

The LED driver 85 supplies a control signal of the LEDs 71 (VD-Sd'[W·A]) to the LEDs 71 on the basis of a timing signal (L-TS) generated by the control unit 1 (the control signal of the LEDs 71 is generated by the control unit 1). More specifically, the LED driver 85 controls the lighting of the LEDs 71 in the backlight unit 70 on the basis of the signal from an LED controller 30 (PWM light modulation signal VD-Sd'[W·A], and timing signal L-TS).

The LED thermistor 86 is a temperature sensor for measuring the temperature of the LEDs 71 installed in the backlight unit 70. The reason for the use of an LED thermistor 86 is described later.

The LED luminance sensor 87 is a photometric sensor for measuring the luminance of the LEDs 71. The reason for the use of an LED luminance sensor 87 is described later.

<Concerning the Control Unit>

The control unit 1 is a control unit for generating the various signals described above, and includes a main microcomputer (main microprocessor) 51, a picture signal processing section 10, a liquid crystal display panel controller (LCD controller) 20, and an LED controller 30.

<<Main Microprocessor>>

The main microprocessor 51 oversees various controls related to the picture signal processing section 10, the liquid crystal display panel controller 20, and the LED controller 30, which are included in the control unit 1 (the main microprocessor 51 and the LED controller 30 controlled thereby may together be referred to as the microprocessor unit 50).

<<Image Signal Processing Section>>

The picture signal processing section 10 includes a timing adjustment section 11, a histogram processing section 12, a computation processing section 13, a duty setting section 14, an electric current value setting section 15, a viewing mode setting section 16, and a memory 17, as shown in FIG. 2.

The timing adjustment section 11 receives initial image signals (initial image signals F-VD) from an external signal source. Initial image signals F-VD are, e.g., television signals, and include picture signals and synchronization signals for synchronization with the picture signal (the picture signal is composed of, e.g., a red picture signal, a green picture signal, a blue picture signal, and a luminance signal).

In view of the above, the timing adjustment section 11 generates from these synchronization signals new synchronization signals (a clock signal CLK, a vertical synchronization signal, a horizontal synchronization signal, and the like) that are required for the liquid crystal display panel 60 to display an image. The timing adjustment section 11 transmits the newly generated synchronization signals to the liquid crystal display panel controller 20 and the microprocessor unit 50 (see FIGS. 1 and 2).

The histogram processing section 12 receives the initial image signal F-VD and forms the picture signal (picture data) included in the initial image signal F-VD into a histogram. More specifically, the histogram processing section 12 acquires a frequency distribution with respect to the gradations in the initial image signal F-VD in a single frame.

However, data to be formed into a histogram is not limited to the initial image signals F-VD. For example, it is also possible to perform histogram processing for a later-described separator LED signal VD-Sd, separator LCD signal VD-Sp, and LCD picture signal VD-Sp[led] or LCD picture signal VD-Sp'[led], which has undergone frame rate control processing (essentially, these various picture signals (picture data) can be formed into a histogram). The data of a histogram is referred to as histogram data HGM. The histogram data HGM is transmitted to the computation processing section 13 by the histogram processing section 12.

The computation processing section 13 receives the initial image signals F-VD and separates the initial image signal F-VD into a signal suitable for driving the backlight unit 70 (more specifically, LEDs 71), and a signal suitable for driving the liquid crystal display panel 60. Among the initial image signals F-VD, the computation processing section 13 transmits the separator LED signal VD-Sd suitable for the LEDs 71 to the duty setting section 14.

Among the initial image signals F-VD, the computation processing section 13 corrects and thereafter transmits to the liquid crystal display panel controller 20 a separator LCD signal VD-Sp that is suitable to the liquid crystal display panel 60. This correction processing accounts for a later-described control signal (PWM light modulation signal Vd-Sd[W·A]) of the LEDs 71 (the separator LCD signal VD-Sp having undergone this correction processing is referred to as LCD picture signal VD-Sp[led]).

The computation processing section 13 may transmit the separator LCD signal VD-Sp to the histogram processing section 12 in order to form a histogram.

The computation processing section 13 calculates at least one among the histogram data HGM [S] of an average signal level (ASL) and a histogram data HGM [L] of an average luminance level (ALL), using the histogram data HGM.

In other words, the computation processing section 13 is capable of calculating the histogram data HGM of at least one among the average signal level ASL and the average luminance level ALL from the initial image signals F-VD, the separator LED signal VD-Sd, the separator LCD signal VD-Sp, the LCD picture signal VD-Sp[led], or the LCD picture signal VD-Sp'[led]; and furthermore transmits the result to the duty setting section 14.

Also, the computation processing section 13 is capable of calculating at least one among the average value of the average signal level ASL and the average value of the average luminance level ALL; and furthermore transmits the result to the duty setting section 14. The histogram processing section 12 and the computation processing section 13 will be referred to as a histogram unit 18 because various processing related to various histogram data HGM is carried out.

The duty setting section 14 receives the separator LED signal VD-Sd. The duty setting section 14 furthermore receives the histogram data HGM from the computation processing section 13. The duty setting section 14 receives signals (memory data DM) from the later-described memory 17, and also receives signals of at least one of the viewing mode setting section 16, the panel thermistor 83, the LED controller 30 (more specifically, a later-described FRC processing section 21), and the environment illumination intensity sensor 84.

The duty setting section 14 generates a PWM light modulation signal suitable for control of the LEDs 71 from at least one of these signals and the separator LED signal VD-Sd (described later in detail). Specifically, the duty setting section 14 sets the duty in the PWM light modulation signal (the PWM light modulation signal for which the duty has been set in the duty setting section 14 is referred to as a PWM light modulation signal VD-Sd[W]).

The duty is the ratio of the interval in which the LEDs 71 are turned on in a single cycle in the PWM light modulation signal (an AC signal). In other words, the case of 100% duty means that the LEDs 71 continue to be turned on for the interval of a single cycle (conversely, in the case of 60% duty, the LEDs 71 are turned off for 40% of the interval of a single cycle).

The electric current value setting section 15 receives the PWM light modulation signal VD-Sd[W] from the duty setting section 14, and varies the electric current value of the PWM light modulation signal VD-Sd[W]. The variability of this electric current value is described later in detail. The PWM light modulation signal VD-Sd[W] in which the electric current value has been suitably set is referred to as the PWM light modulation signal Vd-Sd[W·A]. The PWM light modulation signal Vd-Sd[W·A] is transmitted by the electric current value setting section 15 to the microprocessor unit 50 (more specifically, the LED controller 30) and also transmitted to the computation processing section 13.

The viewing mode setting section 16 sets the screen display format (viewing mode) in accordance with the type of image to be displayed on the liquid crystal display panel 60, the environment of the location in which the liquid crystal display device 90 is placed, or the preference of the viewer (the desired contrast ratio or the like). The viewing mode setting section 16 can set the following viewing modes, for example.

Sports mode: A viewing mode suited for displaying images in which the movement of soccer players or the like is rapid. In other words, this is a viewing mode having a relatively high video level.

Natural mode: A viewing mode suited for displaying images in which the movement of a news program or the like is slow. In other words, this is a viewing mode having a relatively low video level.

Dynamic mode: A viewing mode for enhancing the contrast between white images and black images. In other words, this is a viewing mode for when a relatively higher contrast level is desired.

Cinema mode: A viewing mode for moderating the contrast between white images and black images. In other words, this is a viewing mode for when a relatively lower contrast level is desired.

Standard mode: A viewing mode between the dynamic mode and the cinema mode.

In consideration of these viewing modes; in particular, the sports mode and the natural mode, the viewing mode setting section 16 is capable of setting a high video level viewing mode or a low video level viewing mode in accordance with the picture signal (picture data) video level (however, there is no limitation to a two-stage level setting).

In consideration of the dynamic mode, the standard mode, and the cinema mode, the viewing mode setting section 16 is capable of setting a high contrast level viewing mode, an intermediate contrast level viewing mode, and a low contrast level viewing mode in accordance with the picture signal (picture data) contrast level (however, there is no limitation to a three-stage level setting).

The memory (storage section) 17 stores various data tables required for duty setting by the duty setting section 14, various threshold data (threshold values), and other data. For example, the memory 17 holds a temperature-speed data table in which the temperature of the panel thermistor 83 and the response speed Vr of the liquid crystal molecules 61M are correlated. The memory 17 furthermore stores a certain response speed Vr as a threshold value (response speed data threshold value) in the temperature-speed data table. The number of threshold values may be one or more.

The memory 17 also stores threshold values for dividing all gradations in a histogram data HGM created using the average signal level ASL or the average luminance level ALL (gradation threshold value data). In other words, the histogram data HGM is divided into at least two or more gradation ranges by the gradation threshold values. The memory 17 furthermore stores threshold values for judging whether the occupancy ratio of a specific gradation range (at least one divided gradation range) in the histogram data HGM is above, or equal to or less than a set value (occupancy ratio threshold values).

<<LCD Controller>>

The liquid crystal display panel controller 20 includes a frame rate control processing section (FRC processing section) 21 and a gate driver/source driver control section (G/S control section) 22.

The FRC processing section 21 receives the LCD picture signal VD-Sp[led] transmitted from the picture signal processing section 10 (more specifically, the computation processing section 13). The FRC processing section 21 carries out an FRC process for switching at high speed the frame rate in the LCD picture signal VD-Sp[led] in order to artificially display an image using afterimage effects (an LCD picture signal VD-Sp[led] which has undergone FRC processing is referred to as an LCD picture signal VD-Sp'[led]).

The FRC processing section 21 is capable of being switched on and off. Therefore, in the case that the FRC processing section 21 is carrying out FRC processing at double speed, the LCD picture signal VD-Sp[led] will be 60 Hz in the case that the LCD picture signal VD-Sp'[led] is 120 Hz (these signals can be taken to be the frame frequency).

The FRC processing section 21 transmits the LCD picture signal VD-Sp'[led], which has undergone FRC processing, or the LCD picture signal VD-Sp[led], which has not undergone FRC processing, to the source driver 82 (see FIG. 1).

The G/S control section 22 generates timing signals for controlling the gate driver 81 and the source driver 82 from the clock signal CLK, the vertical synchronization signal VS, the horizontal synchronization signal HS, and other signals transmitted from the picture signal processing section 10 (more specifically, the timing adjustment section 11). (The timing signal corresponding to the gate driver 81 will be referred to as a timing signal G-TS and the timing signal corresponding to the source driver 82 will be referred to as timing signal S-TS). The G/S control section 22 transmits the timing signal G-TS to the gate driver 81 and transmits the timing signal S-TS to the source driver 82 (see FIG. 1).

In other words, the liquid crystal display panel controller 20 transmits the LCD picture signal VD-Sp'[led] (or the LCD picture signal VD-Sp[led]) and the timing signal S-TS to the source driver 82, and transmits the timing signal G-TS to the gate driver 81. The source driver 82 and the gate driver 81 control the image on the liquid crystal display panel 60 using the two timing signals G-TS, S-TS.

<<LED Controller>>

The LED controller 30 transmits various control signals to the LED driver 85 under management (control) of the main microprocessor 51. The LED controller 30 includes an LED controller setting register group 31, an LED driver control section 32, a serial/parallel converter (S/P converter) 33, an individual variation-correcting section 34, a memory 35, a temperature correction section 36, a deterioration-correcting section 37, and a parallel/serial converter (P/S converter) 38, as shown in FIG. 3.

The LED controller setting register group 31 temporarily holds various control signals from the main microprocessor 51. In other words, the main microprocessor 51 controls various members inside the LED controller 30 by first going through the LED controller setting register group 31.

The LED driver control section 32 transmits the PWM light modulation signal Vd-Sd[W·A] from the picture signal processing section 10 (more specifically, the electric current value setting section 15) to the S/P converter 33. The LED driver control section 32 generates and transmits a turn-on timing signal L-TS of the LEDs 71 to the LED driver 85 using the synchronization signals (clock signal CLK, vertical synchronization signal VS, horizontal synchronization signal HS, and other signals) from the picture signal processing section 10.

The S/P converter 33 converts the PWM light modulation signal Vd-Sd[W·A] transmitted from the LED driver control section 32 as serial data into parallel data.

The individual variation-correcting section 34 confirms in advance the performance of individual LEDs 71 and makes corrections to eliminate individual errors. For example, the luminance of the LEDs 71 is measured in advance using a specific PWM light modulation signal value. More specifically, for example, the red light-emitting LED chip, the green light-emitting LED chip, and the blue light-emitting LED chip are turned on in the LEDs 71, and a specific PWM light modulation signal that corresponds to each LED chip is corrected so that white light having a desired hue can be generated.

Next, a plurality of LEDs 71 are turned on, and the PWM light modulation signal corresponding to each of the LEDs 71 (each LED chip) is further corrected so as to eliminate luminance nonuniformity as planar light. Individual differences in the plurality of LEDs 71 are thereby corrected (individual variation in luminance, and consequently luminance nonuniformity of planar light).

There are various methods for processing such corrections, but correction processing that uses a lookup table (LUT) is generally used. In other words, the individual variation-correcting section 34 carries out correction processing using a LUT for individual variations in the LEDs 71 that is stored in the memory 35.

The memory 35 stores, e.g., the LUT for individual variations in the LEDs 71 as described above. The memory 35 also stores an LUT required in the temperature correction section 36 of a later stage of the individual variation-correcting section 34, and in the deterioration-correcting section 37.

The temperature correction section 36 performs correction in which consideration is given to a reduction in the luminance of the LEDs 71 caused by an increase in temperature that accompanies the light emission of the LEDs 71. For example, the temperature correction section 36 acquires the temperature data of the LEDs 71 (essentially, the LED chip of each color) using the LED thermistor 86 once per second, acquires the LUT that corresponds to the temperature data from the memory 35, and performs a correction for reducing luminance nonuniformity of planar light (i.e., modifies the PWM light modulation signal value that corresponds to the LED chip).

The deterioration-correcting section 37 performs a correction in which consideration is given to a reduction in the luminance of the LEDs 71 caused by a deterioration of the LEDs 71 over time. For example, the deterioration-correcting section 37 acquires the luminance data of the LEDs 71 (essentially, the LED chip of each color) using the LED luminance sensor 87 once per year, acquires the LUT that corresponds to the luminance data from the memory 35, and performs correction for reducing luminance nonuniformity of planar light (i.e., modifies the PWM light modulation signal value that corresponds to the LED chip of each color).

The P/S converter 38 converts into serial data the PWM light modulation signal, which has undergone various correction processing and is transmitted as parallel data, and transmits the data to the LED driver 85 (the PWM light modulation signal after correction processing by the LED controller 30 will be referred to as PWM light modulation signal Vd-Sd' [W·A]). At this point, the LED driver 85 turns on and controls the LEDs 71 in the backlight unit 70 on the basis of the PWM light modulation signal Vd-Sd'[W·A] and the timing signal L-TS.

<PWM Light Modulation Signal for Controlling the Light Emission of the LED>

Here, the PWM light modulation signal VD-Sd[W] for controlling the light emission of the LEDs 71 will be described. The PWM light modulation signal VD-Sd[W] varies the duty in accordance with the response speed Vr of the change in the orientation of the liquid crystal molecules 61M (where the duty of the PWM light modulation signal directly inputted to the LEDs 71 is set to a desired value after consideration has been given not only to the response speed Vr, but to the results of various corrections carried out by the LED controller 30 and the like).

<<Response Speed of the Liquid Crystal Molecules>>

Figure 4:
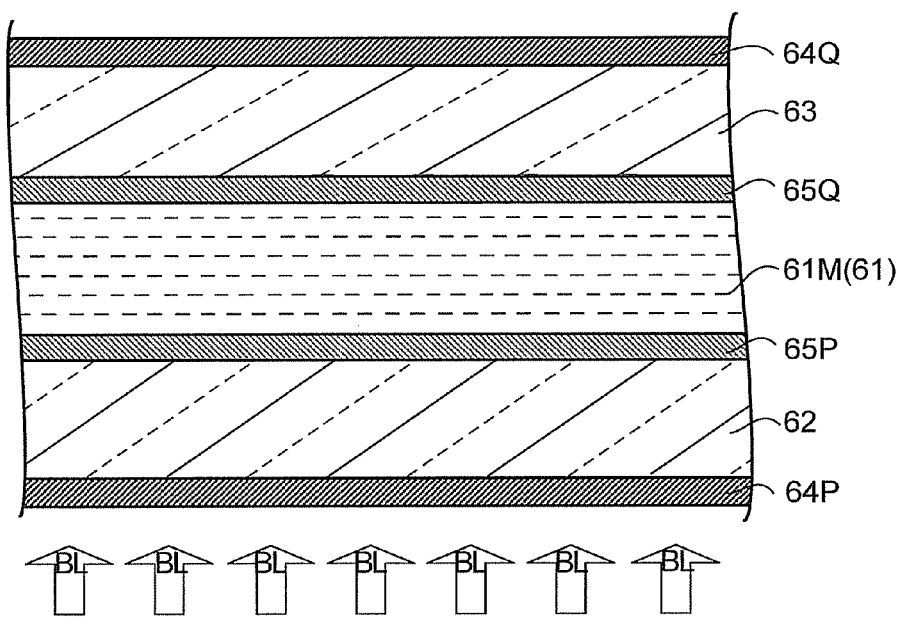
FIG. 4 is a partial cross-sectional view of a liquid crystal display panel.

In view of the above, first, the response speed Vr of the liquid crystal molecules 61M will be described with reference to FIGS. 4 to 8. FIG. 4 is a partial cross-sectional view of the liquid crystal display panel 60. In the liquid crystal display panel 60, the active matrix substrate 62 on which a thin film transistor or another switching element (not shown) and a pixel electrode 65P are arranged; and the opposing substrate 63, which faces the active matrix substrate 62, and has an opposing electrode 65Q arranged thereon, are laminated together interposed by a sealing material (not shown), as shown in the drawings. The liquid crystal 61 is sealed in the gap between the two substrates 62, 63 (more specifically, the two electrodes 65P, 65Q).

With this liquid crystal display panel 60, polarization films 64P, 64Q are mounted so as to sandwich the active matrix substrate 62 and the opposing substrate 63. At this point, the polarization film 64P transmits and directs specifically polarized light among the backlight BL from the backlight unit 70 to the liquid crystal (liquid crystal layer) 61, and the polarization film 64Q transmits to the exterior specifically polarized light among the light transmitted through the liquid crystal layer 61.

However, light that passes through the liquid crystal display panel 60 in this manner is affected at an intermediate point by the orientation of the liquid crystal molecules 61M, i.e., the tilt of the liquid crystal molecules 61M, that corresponds to the application of a voltage. More specifically, the amount of transmitted light to the exterior varies in accordance with the variation in transmissivity of the liquid crystal display panel 60 due to the tilt in the liquid crystal molecules 61M. In view of the above, the liquid crystal display panel 60 displays an image using variation in the transmissivity due to the tilt of the liquid crystal molecules 61M that corresponds to the application of a voltage.

Various modes are envisioned in the liquid crystal display panel 60. Examples include twist nematic (TN) mode, vertical alignment (VA) mode, in-plane switching (IPS) mode, and optically compensated bend (OCB) mode. However, whichever mode is used, the amount of transmitted light incident on the liquid crystal 61 varies depending on the orientation of the liquid crystal molecules 61M.

(MVA Mode)

For example, a multi-domain vertical alignment (MVA) mode, which is a type of VA mode, is described below with reference to FIGS. 5 and 6 (the arrows formed by a dash-dot line indicate light in these drawings and in later-described FIGS. 7 to 10).

Figure 5:
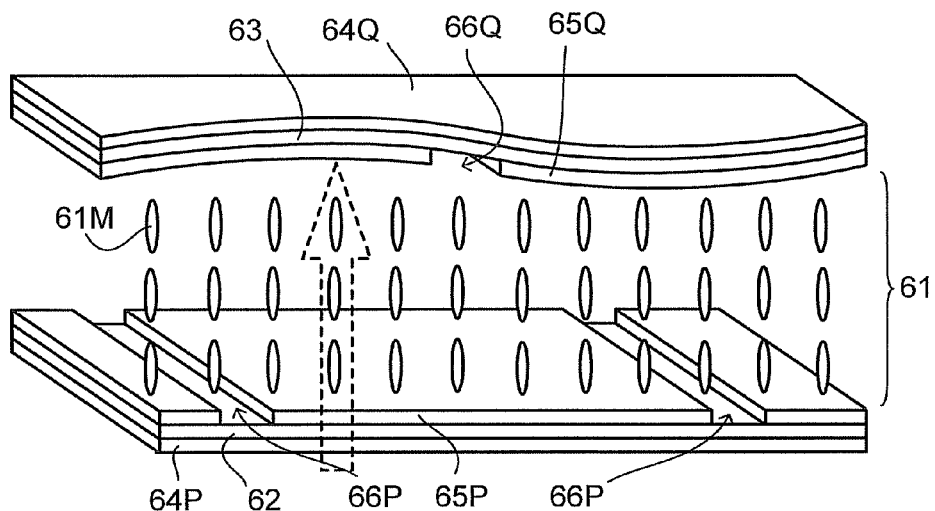
FIG. 5 is a perspective view showing the orientation of liquid crystal molecules in the case that voltage is not applied (the case of being OFF) in MVA mode (slit type) liquid crystal.
Figure 6:
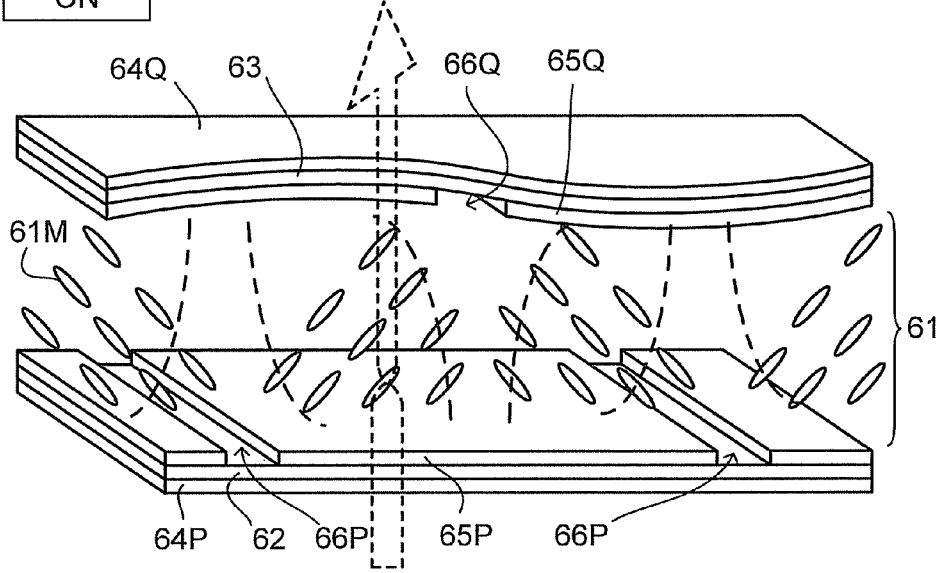
FIG. 6 is a perspective view showing the orientation of liquid crystal molecules in the case that voltage is applied (the case of being ON) in MVA mode (slit type) liquid crystal.

The liquid crystal 61 containing the liquid crystal molecules 61M shown in FIGS. 5 and 6 is negative liquid crystal having negative dielectric anisotropy. The pixel electrode (first electrode/second electrode) 65P is formed on one surface facing the liquid crystal 61 side of the active matrix substrate 62, and the opposing electrode (second electrode/first electrode) 65Q is formed on one surface facing the liquid crystal 61 side of the opposing substrate 63.

Also, a slit 66P (first slit/second slit) is formed on the pixel electrode 65P, and a slit 66Q (second slit/first slit) is formed in the opposing electrode 65Q as well (the slit 66P and the slit 66Q are oriented in the same direction). However, the slit 66P and the slit 66Q are offset and do not face each other along the alignment direction (e.g., the vertical direction in relation to the two substrates 62, 63) of the electrodes 65P, 65Q.

In the case that voltage is not applied between the pixel electrode 65P and the opposing electrode 65Q (the case of OFF), the major axis direction of the liquid crystal molecules 61M is oriented along the vertical direction with respect to the two substrates 62, 63, as shown in FIG. 5 (initial orientation in the absence of an electric field is designed, for example, through application of an orientation film material (not shown) having orientation-regulating force to the electrodes 65P, 65Q).

At this point, the backlight BL which has passed through the active matrix substrate 62 is not emitted to the exterior when the polarization film 64P and the polarization film 64Q are in a crossed Nicol arrangement (essentially, the liquid crystal display panel 60 is in a normally black mode).

On the other hand, in the case that voltage is applied between the pixel electrode 65P and the opposing electrode 65Q (the case of ON), the liquid crystal molecules 61M are tilted along the direction of the electric field produced between the two electrodes 65P, 65Q. However, the electric field direction tilts in a direction that does not align with the vertical direction of the two substrates 62, 63 (the direction in which the two substrates 62, 63 are arranged in a row). This is due to the fact that distortions occur in the electric field and an electric field in a diagonal direction is formed by the slit 66P formed in the pixel electrode 65P and the slit 66Q formed in the opposing electrode 65Q.

The negative liquid crystal molecules 61M tilt so that the minor axis direction thereof is made to follow along the electric field direction (electric force lines; see the two-dot chain line of FIG. 6), as shown in FIG. 6. In other words, the major axis direction of the negative liquid crystal molecules 61M in the liquid crystal display panel 60 is made to follow along the vertical direction of the two substrates 62, 63 (homeotropic orientation) in the case that voltage is not applied to the two electrodes 65P, 65Q. On the other hand, the major axis direction of the liquid crystal molecules is made to intersect the electric field direction between the two electrodes 65P, 65Q in the case that voltage is applied to the two electrodes 65P, 65Q. At this point, a portion of the backlight BL that has passed through the active matrix substrate 62 is emitted to the exterior as light that follows along the transmissive axis of the polarization film 64Q due to by the tilt of the liquid crystal molecules 61M.

The MVA-mode liquid crystal display panel 60 is not limited to the type shown in FIGS. 5 and 6 (referred to as a slit-type MVA mode), i.e., a type that generates a diagonal electric field using the slits 66P, 66Q. For example, there is also an MVA mode in which ribs 67P, 67Q are used (referred to as rib-type MVA mode) rather than slits 66P, 66Q, as shown in FIGS. 7 and 8.

More specifically, with this liquid crystal display panel 60, a rib 67P (first rib/second rib) is formed on the pixel electrode 65P, and a rib 67Q (second rib/first rib) is formed on the opposing electrode 65Q (the orientation of the rib 67P and the rib 67Q is the same direction). The rib 67P and rib 67Q are offset and do not face each other along the alignment direction (e.g., the vertical direction of the two substrates 62, 63) of the electrodes 65P, 65Q.

The rib 67P is, e.g., a triangular prism shape, and is arranged so that one side surface thereof faces the pixel electrode 65P and another side surface is in contact with the liquid crystal 61. Similarly, the rib 67Q is, e.g., a triangular prism shape, and is arranged so that one side surface thereof faces the pixel electrode 65Q and another side surface is in contact with the liquid crystal 61 (the side surface of the rib 67 in contact with the liquid crystal 61 will be referred to as a sloped surface).

Figure 7:
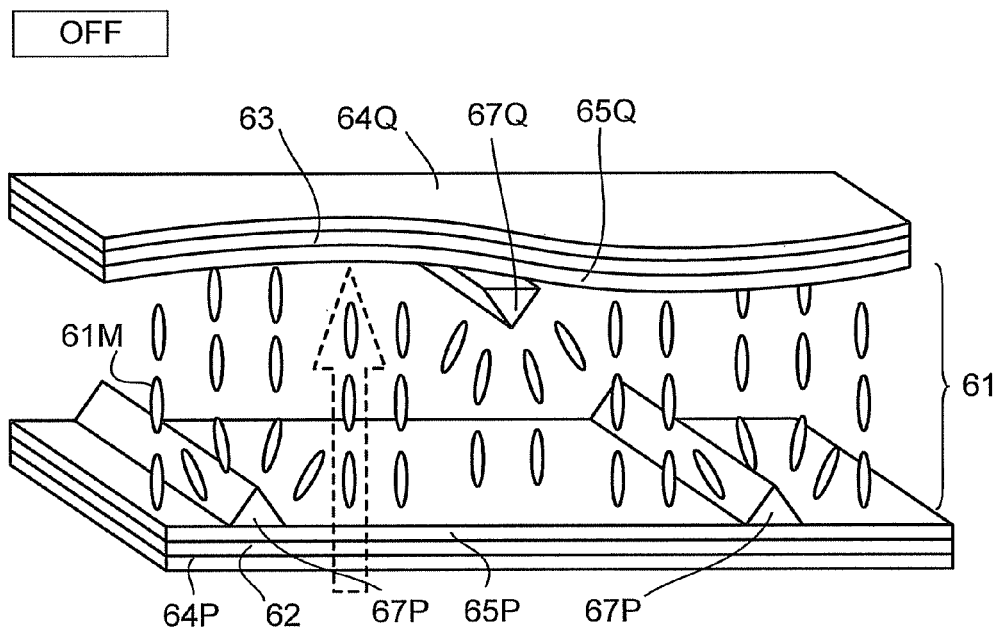
FIG. 7 is a perspective view showing the orientation of liquid crystal molecules in the case that voltage is not applied (the case of being OFF) in MVA mode (rib type) liquid crystal.
Figure 8:
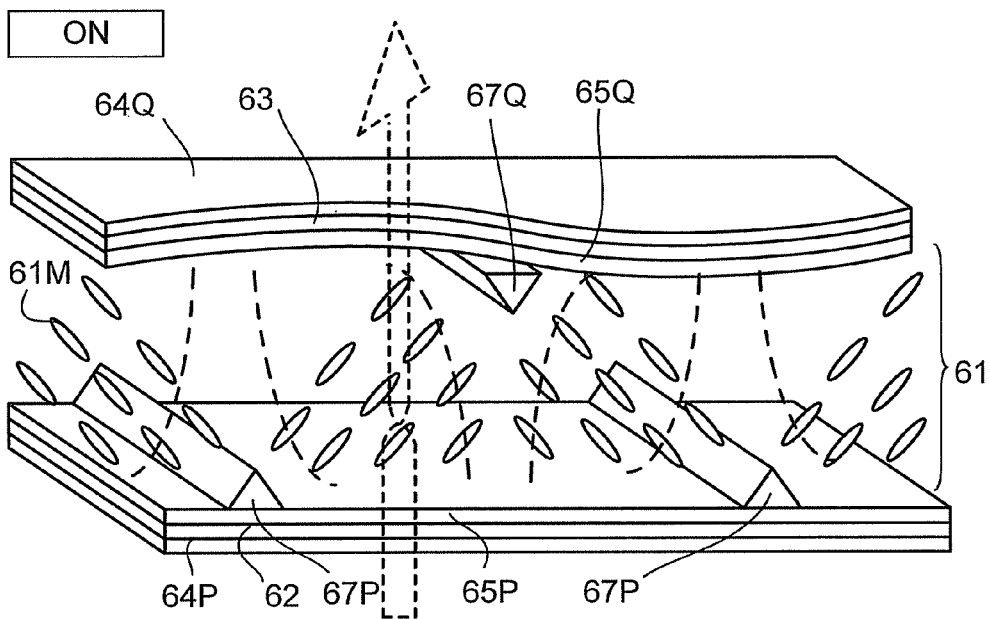
FIG. 8 is a perspective view showing the orientation of liquid crystal molecules in the case that voltage is applied (the case of being ON) in MVA mode (rib type) liquid crystal.

The major axis directions of the liquid crystal molecules 61M are oriented so as to be aligned with the vertical direction in relation to the two substrates 62, 63 in the case that voltage is not applied between the pixel electrode 65P and the opposing electrode 65Q (the OFF case), as shown in FIG. 7 (initial orientation in the absence of an electric field is designed, for example, through application of an orientation film material (not shown) having orientation-regulating force to the pixel electrode 65P and the rib 67P, and to the opposing electrode 65Q and the rib 67Q). However, the liquid crystal molecules 61M facing the sloped surface of the ribs 67P, 67Q are tilted relative to the vertical direction of the two substrates 62, 63 (the plate thickness direction of the two substrates 62, 63).

However, a majority of the liquid crystal molecules 61M follow along the vertical direction in relation to the two substrates 62, 63, and the backlight BL which has passed through the active matrix substrate 62 is not emitted to the exterior when the polarization film 64P and the polarization film 64Q are in a crossed Nicol arrangement.

On the other hand, the liquid crystal molecules 61M tilt along the direction of the electric field generated between the two electrodes 65P, 65Q in the case that voltage is applied between the pixel electrode 65P and the opposing electrode 65Q (the ON case). However, the electric field direction tilts without following along the vertical direction of the two substrates 62, 63. This is due to the fact that distortions occur in the electric field and an electric field in a diagonal direction (see the two-dot chain line of FIG. 8) is formed by the rib 67P formed in the pixel electrode 65P and the rib 67Q formed in the opposing electrode 65Q.

Furthermore, the other liquid crystal molecules 61M readily tilt diagonally so as to follow along the electric field direction because the liquid crystal molecules 61M on the sloped surface of the ribs 67P, 67Q are tilted. As a result, the liquid crystal molecules 61M tilt so that the minor axis direction thereof is made to follow along the electric field direction, as shown in FIG. 8.

In other words, the major axis direction of a majority of the negative liquid crystal molecules 61M (a majority of the liquid crystal molecules 61M that do not face the ribs 67P, 67Q) in the liquid crystal display panel 60 is made to follow along the vertical direction of the two substrates 62, 63 in the case that voltage is not applied to the two electrodes 65P, 65Q. On the other hand, the major axis direction of the liquid crystal molecules is made to intersect the electric field direction between the two electrodes 65P, 65Q in the case that voltage is applied to the two electrodes 65P, 65Q. At this point, a portion of the backlight BL that has passed through the active matrix substrate 62 is emitted to the exterior as light that follows along the transmissive axis of the polarization film 64Q due to by the tilt of the liquid crystal molecules 61M.

In summary, with the slit-type and rib-type MVA mode, the liquid crystal molecules 61M are negative type liquid crystal, and at least a portion of the liquid crystal molecules 61M (essentially, all of the liquid crystal molecules 61M or a portion of the liquid crystal molecules 61M) are oriented so that the major axis direction thereof follows along the vertical direction of the two substrates 62, 63, in the case that voltage is not applied to the two electrodes 65P, 65Q. The major axis direction of the liquid crystal molecules is made to intersect the electric field direction between the two electrodes 65P, 65Q in the case that voltage is applied to the two electrodes 65P, 65Q.

The slit-type and rib-type MVA modes were described above, but there is also an MVA mode having slits and ribs. An example is a liquid crystal display panel 60 in which the slit 66P is formed on the pixel electrode 65P and the rib 67Q is formed on the opposing electrode 65Q.

Therefore, the slit 66P or the rib 67P is formed on the pixel electrode 65P, the slit 66Q or the rib 67Q is formed on the opposing electrode 65Q, and the liquid crystal mode can be said to be an MVA mode in the case that the electric field direction between the two electrodes 65P, 65Q intersects the vertical direction of the two substrates 62, 63 (essentially, a diagonal electric field is generated), because of the combination of the slits 66P, 66Q, the ribs 67P, 67Q, or the slit 66P and rib 67P (slit 66Q and rib 67Q).

(IPS Mode)

Figure 9:
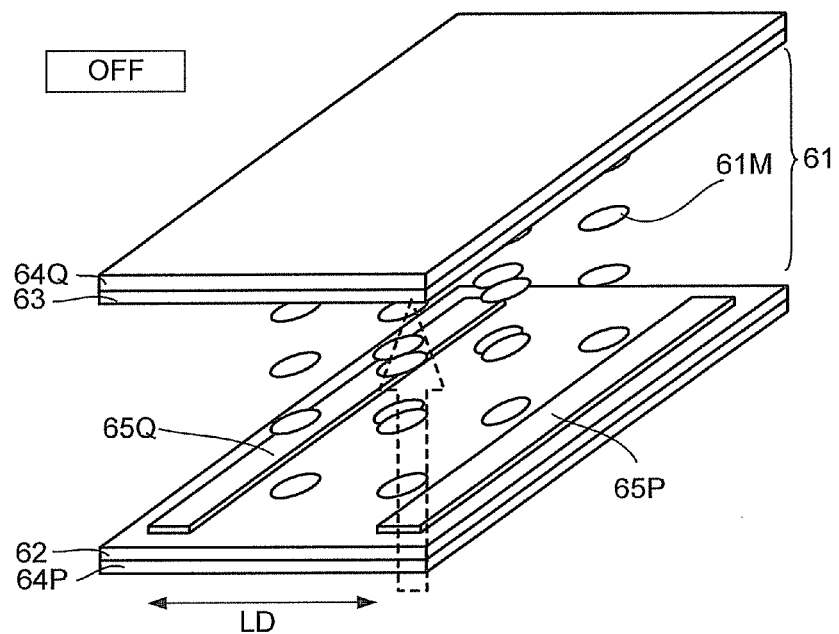
FIG. 9 is a perspective view showing the orientation of liquid crystal molecules in the case that voltage is not applied (the case of being OFF) in IPS mode liquid crystal.
Figure 10:
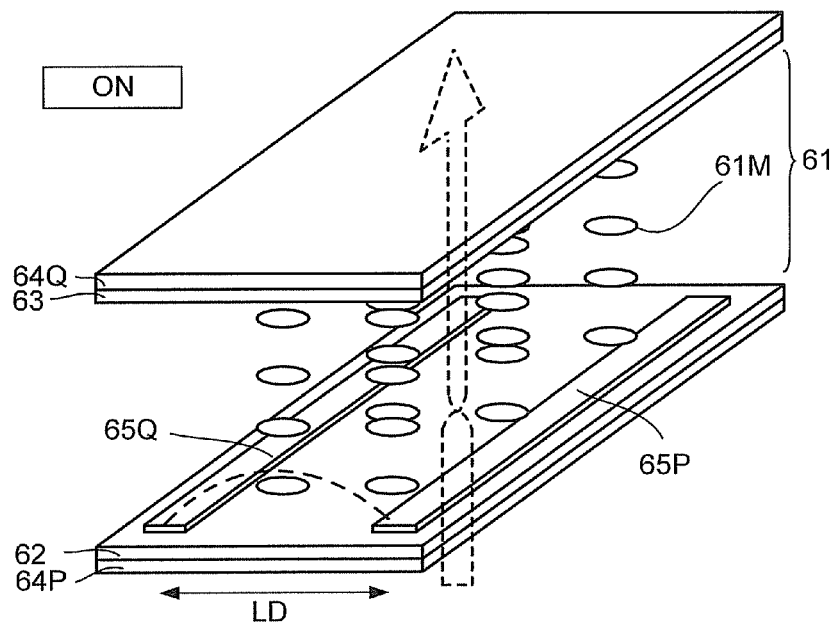
FIG. 10 is a perspective view showing the orientation of liquid crystal molecules in the case that voltage is applied (the case of being ON) in IPS mode liquid crystal.

The case in which the liquid crystal display panel 60 is IPS mode is described below. First, the liquid crystal 61 containing the liquid crystal molecules 61M shown in FIGS. 9 and 10 is positive liquid crystal having positive dielectric anisotropy. The pixel electrode 65P and the opposing electrode 65Q are formed on the active matrix substrate 62 on one surface facing the liquid crystal 61 side. In particular, the two electrodes 65P, 65Q are arranged so as so face each other.

In the case that voltage is not applied between the pixel electrode 65P and the opposing electrode 65Q (the OFF case), the major axis direction (the director direction) of the liquid crystal molecules 61M is made to follow along the in-plane direction of the active matrix substrate 62 (the horizontal direction of the substrate plane) and is oriented so as to intersect the direction LD in which the pixel electrode 65P and the opposing electrode 65Q are arranged in a row, as shown in FIG. 9 (initial orientation in the absence of an electric field is designed, for example, through application of an orientation film material (not shown) having orientation-regulating force to the two electrodes 65P, 65Q).

However, the backlight BL which has passed through the active matrix substrate 62 is not emitted to the exterior when the polarization film 64P and the polarization film 64Q are in a crossed Nicol arrangement (essentially, the liquid crystal display panel 60 is in a normally blank mode).

On the other hand, the liquid crystal molecules 61M tilt along the electric field generated between the two electrodes 65P, 65Q in the case that voltage is applied between the pixel electrode 65P and the opposing electrode 65Q (the ON case). The electric field direction is arcuate following along the direction LD in which the pixel electrode 65P and the opposing electrode 65Q are arranged in a row (essentially, the leading edge of the curve faces the opposing substrate 63, and arcuate electric force lines are generated that follow along the direction in which the pixel electrode 65P and the opposing electrode 65Q are arranged in a row; see the two-dot chain line of FIG. 10).

At this point, the liquid crystal molecules 61M, in which the initial orientation is made to follow along the in-plane direction of the substrate plane of the active matrix substrate 62, rotate as influenced by the direction of the arcuate electric field, and the major axis direction is made to follow along the electric field direction between the two electrodes 65P, 65Q while being made to follow along the in-plane direction of the substrate plane, as shown in FIG. 10. Next, a portion of the backlight BL that has passed through the active matrix substrate 62 is emitted to the exterior as light that follows along the transmissive axis of the polarization film 64Q due to by the tilt of the liquid crystal molecules 61M.

Figure 11:
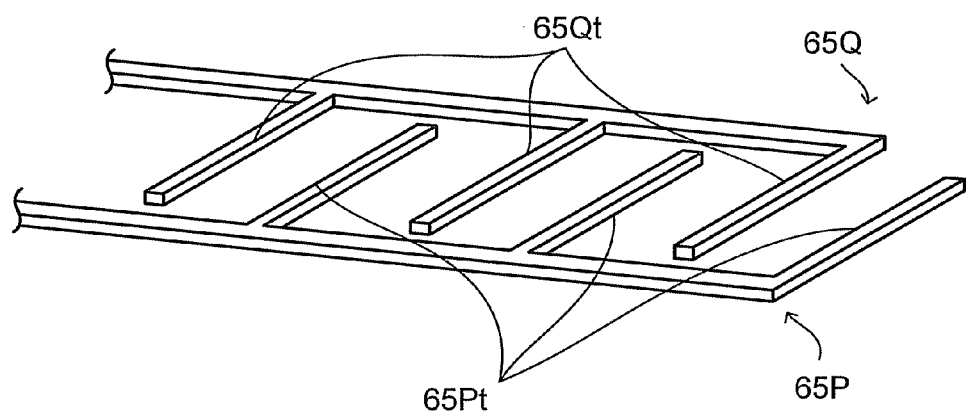
FIG. 11 is a perspective view showing a pectinate pixel electrode and a pectinate opposing electrode.

The pixel electrode 65P and the opposing electrode 65Q in FIGS. 9 and 10 are linear in shape, but no limitation is imposed thereby. For example, a pectinate pixel electrode 65P and a pectinate opposing electrode 65Q may be formed on the active matrix substrate 62 on the surface facing the liquid crystal 61 side, as shown in FIG. 11.

In the case of such a pectinate pixel electrode 65P and opposing electrode 65Q, the two electrodes 65P, 65Q are arranged so that the mutual pectinate forms are made to mesh, whereby tines 65Pt of the pixel electrode 65P and tines 65Qt of the opposing electrode 65Q are arranged in alternating fashion. At this point, an arcuate electric field (an electric field in the horizontal direction) is generated between the tines 65Pt of the pixel electrode 65P and the tines 65Qt of the opposing electrode 65Q, and the liquid crystal molecules 61M tilt in accordance with the electric field.

<<Afterimages and Ghost Outlines>>

Whichever mode in a liquid crystal display panel 60 is used, the liquid crystal molecules 61M tilt from the initial position (e.g., the position of the initial orientation of the liquid crystal molecules 61M in the case that voltage is not applied) in order to display an image. The speed at which the liquid crystal molecules 61M tilt (response speed Vr) is critical. This is due to the fact that "afterimages" or "ghost outlines" are generated in an image on the liquid crystal display panel 60 because of the relationship between the response speed Vr of the liquid crystal molecules 61M and the incidence of backlight BL on the liquid crystal display panel 60.

Ordinarily, in the case that the human eye (retina) senses light, the amount of light is sensed as an integral value. Accordingly, in the case that a human has visually perceived light, the light viewed up to the point that it disappears appears to remain, which causes an afterimage. In the particular case that a moving object is being displayed on the liquid crystal display panel 60 of a "hold"-type display, the line of sight follows the moving object, a frame image is continuously displayed, and an afterimage is even more readily perceived.

Figure 12A:
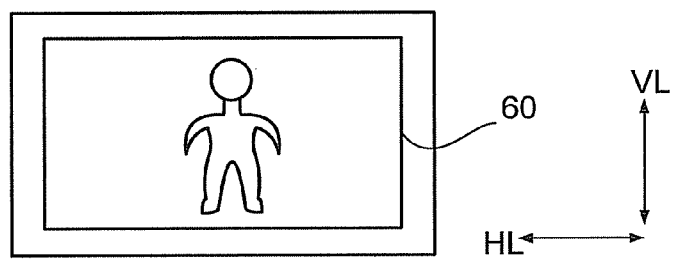
FIG. 12A is a plan view showing a screen of a liquid crystal display panel on which a human figure is displayed.
Figure 12B:
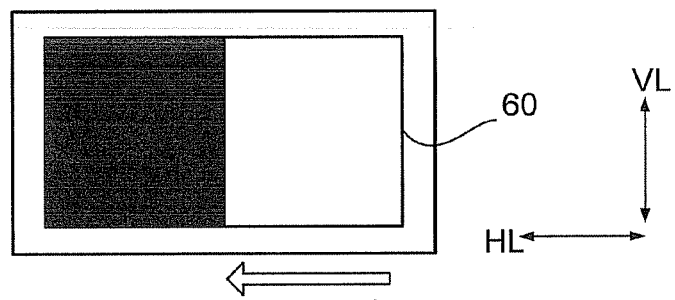
FIG. 12B is a plan view showing a screen of a liquid crystal display panel on which a black image and a white image are displayed.
Figure 12C:
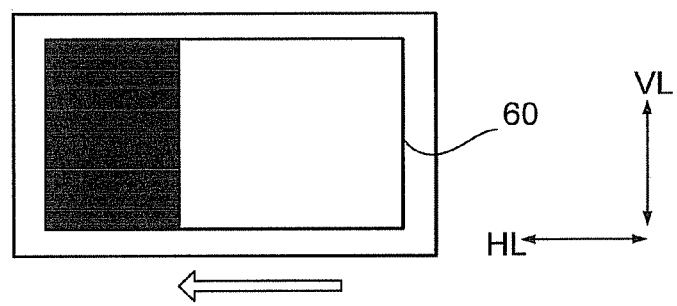
FIG. 12C is a plan view showing a screen of a liquid crystal display panel on which a black image and a white image are displayed.
Figure 12D:
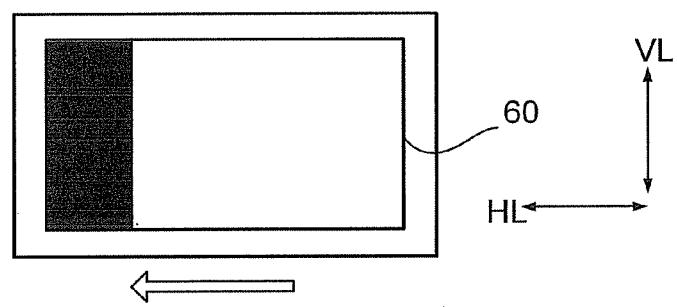
FIG. 12D is a plan view showing a screen of a liquid crystal display panel on which a black image and a white image are displayed.
Figure 12E:
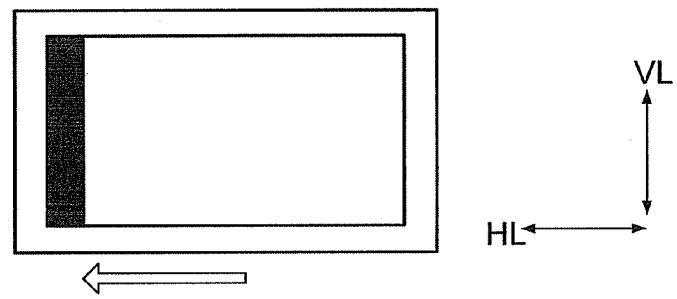
FIG. 12E is a plan view showing a screen of a liquid crystal display panel on which a black image and a white image are displayed.

At this point, a state in which an afterimage is readily perceived may occur in the case that an image having a black image and a white image arranged side-by-side is displayed as shown in FIG. 12B, on a liquid crystal display panel 60 such as that shown in FIG. 12A (HL refers to the horizontal direction of the liquid crystal display panel 60 and VL refers to the vertical direction of the liquid crystal display panel 60). More specifically, in the case that the boundary between the black image and the white image moves in the manner shown in FIGS. 12B to 12E, an afterimage readily occurs in the vicinity of the boundary. The liquid crystal molecules 61M must tilt in the liquid crystal 61 that corresponds to the boundary between the black image and the white image.

For example, the position of the liquid crystal molecules 61M for displaying a black image is set in the initial position in the liquid crystal display panel 60 of the normally black mode (see FIGS. 5, 7, and 9). At this point, in order to display a white image, the liquid crystal molecules 61M tilt from the initial position (FIGS. 6, 8, and 10). In view whereof, the upper graph of FIGS. 13A to 13D show examples of the relationship between time and the amount of tilt of the liquid crystal molecules 61M in the form of a graph. In these graphs, "Min" refers to the initial position of the liquid crystal molecules 61M in the case that a black image is displayed, and "Max" refers to a state of maximum tilt of the liquid crystal molecules 61M in the case that a white image is displayed.

The time required for the liquid crystal molecules 61M to achieve maximum tilt is different in FIGS. 13A, 13B and FIGS. 13C, 13D. Specifically, the time (response time) required for the liquid crystal molecules 61M to achieve maximum tilt is about 16.7 ms in the case of FIGS. 13A, 13B, and is about 8.3 ms in the case of FIGS. 13C, 13D (the greater the data value of the response time is, such as about 16.7 ms, the smaller the data value of the response speed Vr is; and the smaller the data value showing the response time is, such as about 8.3 ms, the greater the data value of the response speed Vr is).

Here, the liquid crystal molecules 61M shown in FIGS. 13A and 13B can be said to tilt at a relatively low response speed Vr (LOW) (i.e., the liquid crystal molecules 61M tilt at a speed by which the data value of the response speed Vr is reduced). On the other hand, the liquid crystal molecules 61M shown in FIGS. 13C and 13D can be said to tilt at a relatively high response speed Vr (HIGH) (i.e., the liquid crystal molecules 61M tilt at a speed by which the data value of the response speed Vr is increased).

The backlight BL is irradiated onto the liquid crystal display panel 60. Therefore, the PWM light modulation signal of the LEDs 71 which generate the backlight BL is also shown in the middle graph of FIGS. 13A to 13D. Light at 100% duty is supplied to the liquid crystal display panel 60 shown in FIGS. 13A and 13C, and light at 50% duty is supplied to the liquid crystal display panel 60 shown in FIGS. 13B and 13D. The drive frequency of the PWM light modulation signal is 120 Hz, and the frame frequency of the liquid crystal display panel 60 (the drive frequency of the liquid crystal display panel 60) is also 120 Hz. A single division between the dotted lines along the time axis in the drawing is a single frame.

The lower graphs in FIGS. 13A to 13D show the case in which the backlight BL is supplied to the liquid crystal display panel 60 on the basis of the PWM light modulation signal, where the luminance of the light transmitted through the liquid crystal display panel 60 is varied.

FIGS. 14 to 17 show the case in which the boundary between the black image and the white image moves (scrolls) in the manner shown in FIGS. 12B to 12E under the conditions shown in FIGS. 13A to 13D (the scroll speed is 32 pixels/16.7 ms). In the graphs shown in FIGS. 14 to 17, the horizontal axis shows the pixel position of the horizontal direction HL on the liquid crystal display panel 60, and the vertical axis is the standardization luminance of the integral luminance standardized in terms of the highest value. An image diagram of the vicinity of the boundary between the black image and the white image is shown below the graphs.

Described first is the case in which the liquid crystal molecules 61M tilt at a relatively low response speed Vr (LOW). In the case that the liquid crystal molecules 61M maximally tilt from the initial position, a time span CW is produced in which the liquid crystal molecules 61M gradually tilt, as shown in upper graph FIG. 13A. The time span CW is a time span (the response process time span CW) in which only a portion of the light is transmitted when it is normally expected that all of the light be transmitted.

When the light of the LEDs 71 based on the PWM light modulation signal at 100% duty is supplied to the liquid crystal molecules 61M in the response process time span CW, as shown in the middle graph of FIG. 13A, the change in luminance in the response process time span CW reflects the time characteristics of the slope of the liquid crystal molecules 61M shown in the upper graph of FIG. 13A. In other words, the light transmitted in proportion to the amount of slope is emitted from the liquid crystal display panel 60 (see the lower graph of FIG. 13A). More specifically, in the case of 100% duty, gradually increasing (monotonic increase) light is emitted from the liquid crystal display panel 60 in the entire time range from start to end of the response process time span CW.

At this point, the light emitted from the liquid crystal display panel 60 corresponding to the response process time span CW moves in the case that the boundary between the black image and the white image moves, as shown in FIGS. 12B to 12E. Therefore, the integral luminance that corresponds to the vicinity of the boundary is represented in the graph in FIG. 14. In other words, there are pixels in the vicinity of the boundary that receive insufficient light for forming a perfectly white image.

Such pixels, which appear in a continuous manner in the pixel range PA [100L-120], are recognized to be problematic pixels (see image diagram). More specifically, switching from the black image to the white image is not carried out at high speed (switching from the black image to the white image is not carried out with sharpness), and afterimages occur because of continuous pixels in which the amount of variation (i.e., the slope of the graph line of FIG. 14) in the integral luminance is substantially the same in the pixel range PA [100L-120].

On the other hand, light of the LEDs 71 based on PWM light modulation signal at 50% duty is supplied to the liquid crystal molecules 61M in the response process time span CW, as shown in the middle graph of FIG. 13B, in the case that liquid crystal molecules with a relatively low response speed Vr tilt (see the upper graph of FIG. 13B).

In the case of 50% duty, there is an off time span and an on time span of the LEDs 71 in a single frame interval (the final timing in a single frame interval and the final timing of a high interval in the PWM light modulation signal are synchronized). Accordingly, light is not emitted from the liquid crystal display panel 60 for the entire time range from start to end of the response process time span CW.

Specifically, light is not supplied to the liquid crystal molecules 61M in the initial interval (the first interval) in the case that the response process time span CW is divided into four intervals, and light is supplied to the liquid crystal molecules 61M in the second interval. As a result, the first interval becomes a time span that shows the lowest luminance value, as shown in the lower graph of FIG. 13B.

On the other hand, the amount of tilt by the liquid crystal molecules 61M is relatively low in the second interval, and all of the light is normally expected to be transmitted, but the time span is one in which only a portion of the light is transmitted. The luminance value that corresponds to the second interval is less than the maximum luminance value.

In the third interval in the case that the response process time span CW is divided into four intervals, light is not supplied to the liquid crystal molecules 61M, and light is supplied to the liquid crystal molecules 61M in the fourth interval. Consequently, the third interval is a time span showing the lowest luminance value in similar fashion to the first interval.

On the other hand, in the fourth interval, although the amount of tilt of the liquid crystal molecules 61M is relatively high, the amount of tilt (the angle required to form a white image) is not perfect. Accordingly, in the fourth interval, all of the light is normally expected to be transmitted, but the time span is one in which only a portion of the light is transmitted in the same manner as the second interval. The luminance value that corresponds to the fourth interval is less than the maximum luminance value (however, this luminance value is greater than the luminance that corresponds to the second interval).

In other words, in the case that the response speed Vr of the liquid crystal molecules 61M is relatively low (the case in which the response process time span CW is equal to or greater than the time of several cycles in the drive frequency of the PWM light modulation signal), as shown in FIG. 13B, light is supplied to the liquid crystal display panel 60 in continuous fashion so as to include fixed gaps in the response process time span CW when the LEDs 71 emit light with a PWM light modulation signal at a duty of other than 100%. The luminance value of the light thus supplied is less than the maximum luminance value.

Figure 15:
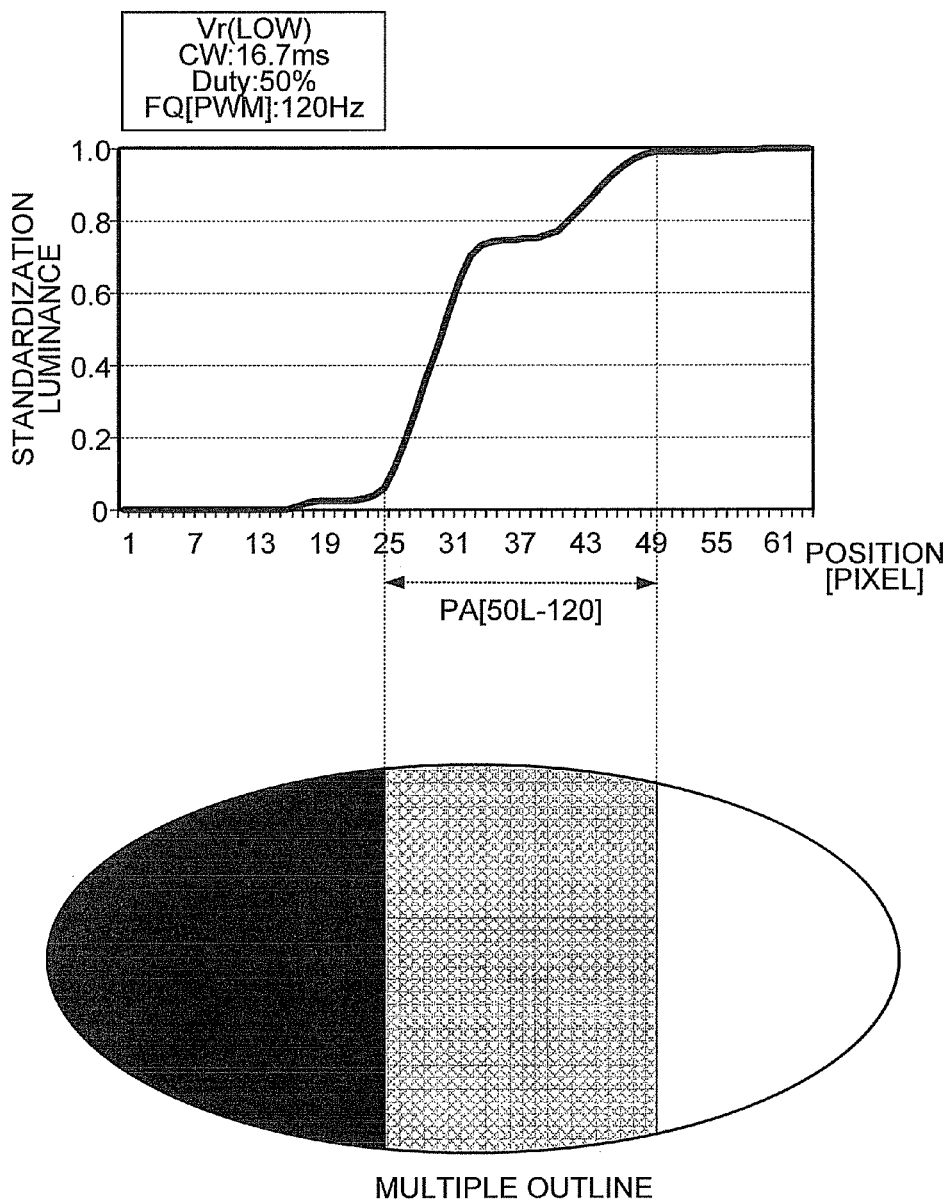
FIG. 15 is a graph showing the integral luminance in the vicinity of the boundary between the black image and the white image, and an image diagram of the boundary image (where the response speed of the liquid crystal is relatively low and the PWM light modulation signal is at 50% duty)

At this point, when the boundary between the black image and the white image moves as shown in FIGS. 12B to 12E, the integral luminance that corresponds to the vicinity of the boundary is shown in the graph of FIG. 15. In other words, there are pixels in the vicinity of the boundary that receive insufficient light for forming a perfectly white image.

Such pixels, which appear in a continuous manner in the pixel range PA [50L-120], are recognized to be problematic pixels (see image diagram). More specifically, switching from the black image to the white image is not carried out at high speed, and ghost outlines occur because pixels in which the amount of variation of the integral luminance is different are included in the pixel range PA [50L-120] (ghost outlines reduce the level of image quality of the liquid crystal display panel 60 more so than afterimages.).

Described next is the case in which the liquid crystal molecules 61M tilt at a relatively high response speed Vr (HIGH). In the case that the liquid crystal molecules 61M tilt at a relatively high response speed Vr, as shown in the upper graph of FIG. 13C, light of the LEDs 71 based on the PWM light modulation signal at 100% duty is supplied, as shown in the middle graph of FIG. 13C. Consequently, gradually increasing (monotonically increasing) light is emitted from the liquid crystal display panel 60 for the entire time range from start to end of the response process time span CW, as shown in the lower graph of FIG. 13C.

Figure 16:
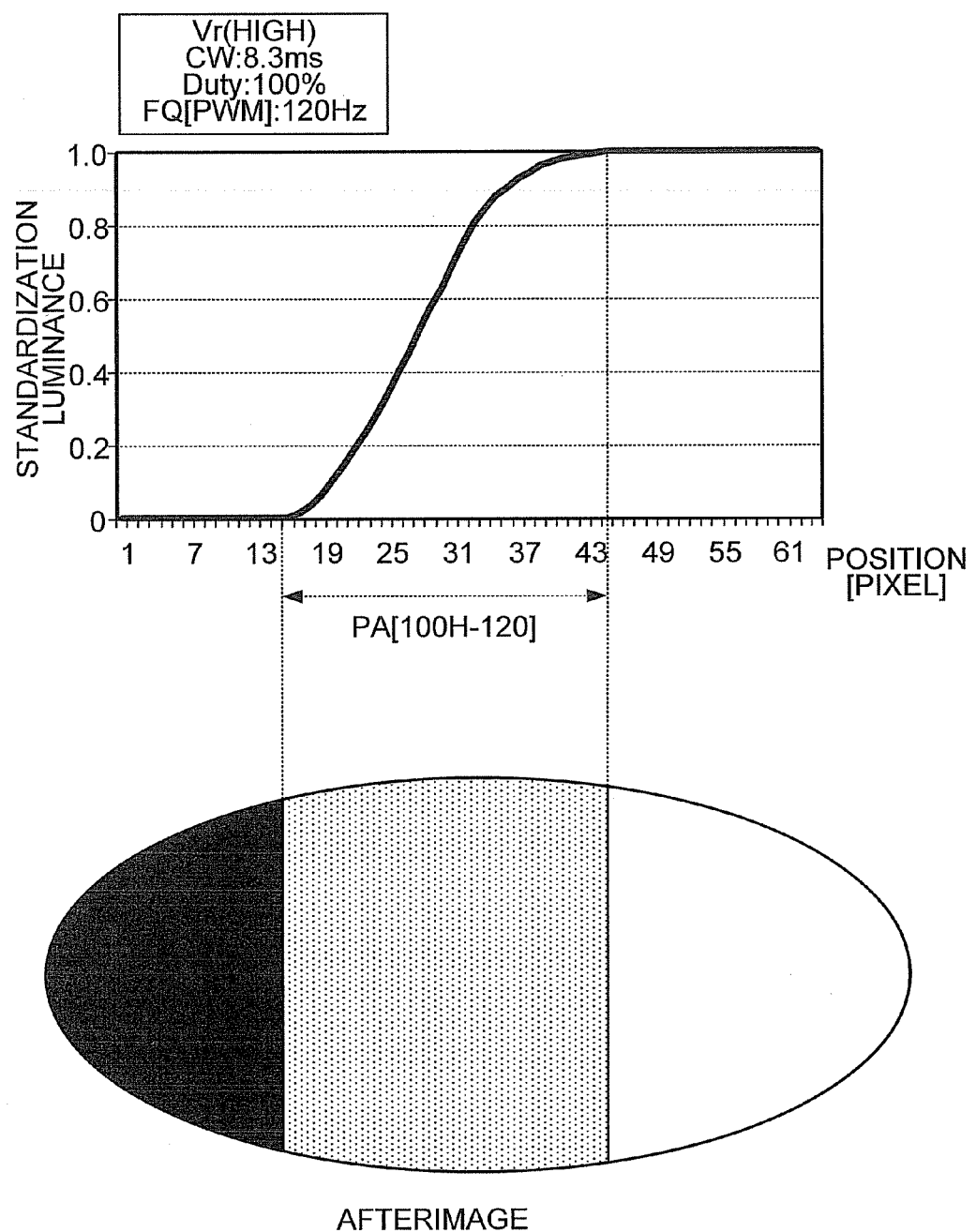
FIG. 16 is a graph showing the integral luminance in the vicinity of the boundary between the black image and the white image, and an image diagram of the boundary image (where the response speed of the liquid crystal is relatively high and the PWM light modulation signal is at 100% duty)

At this point, when the boundary between the black image and the white image moves as shown in FIGS. 12B to 12E, the integral luminance that corresponds to the vicinity of the boundary is shown in the graph of FIG. 16. In other words, there are pixels in the vicinity of the boundary that receive insufficient light for forming a perfectly white image, in the same manner as FIGS. 13A and 14. Therefore, the pixels in the pixel range [100H-120] are recognized to be problematic pixels (afterimage).

Figure 14:
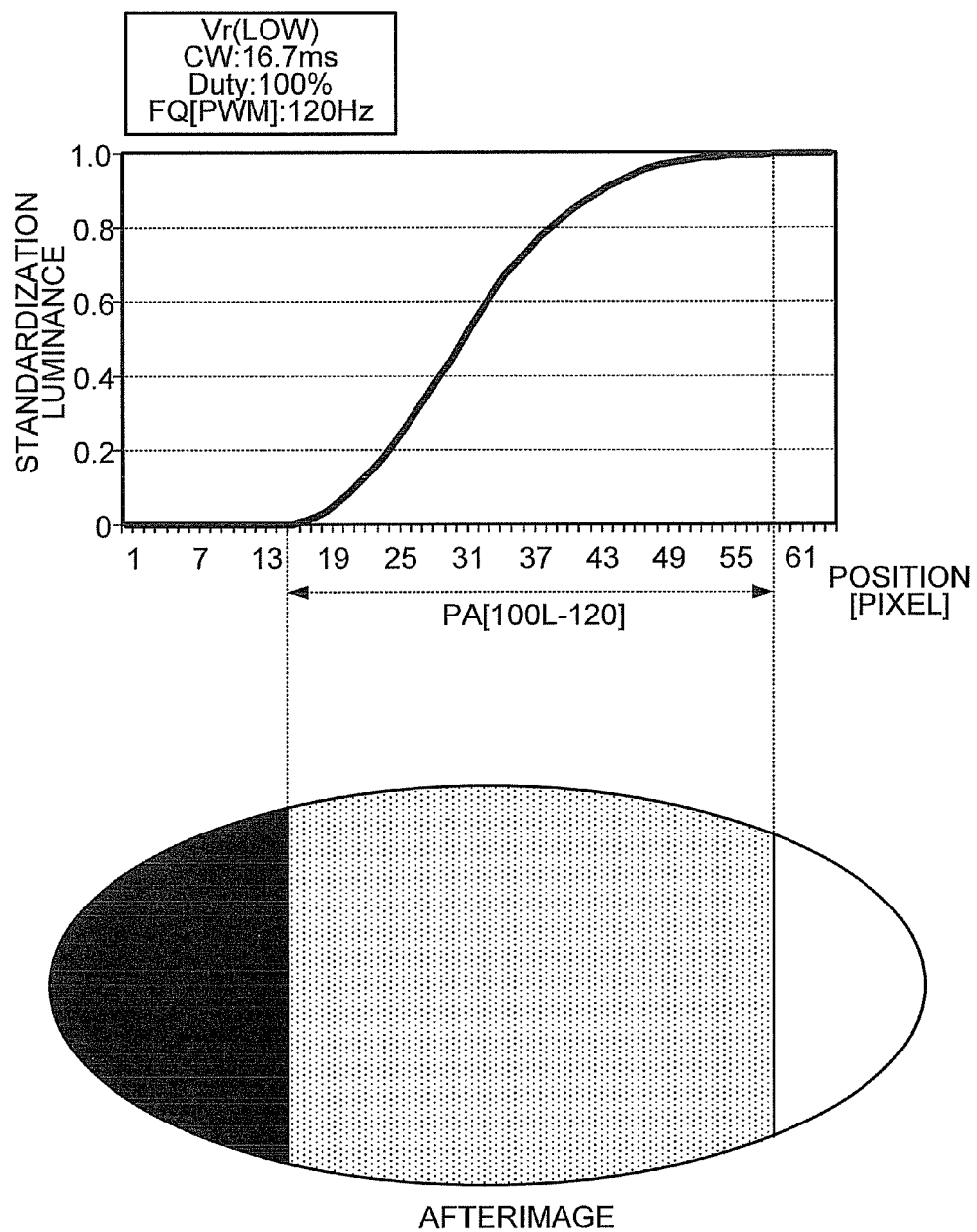
FIG. 14 is a graph showing the integral luminance in the vicinity of the boundary between the black image and the white image, and an image diagram of the boundary image (where the response speed of the liquid crystal is relatively low and the PWM light modulation signal is at 100% duty)

However, the pixel range PA [100H-120] in FIG. 16 is narrower than the pixel range PA [100L-120] in FIG. 14. Accordingly, the amount of deterioration of the image quality due to an afterimage in the case of a response speed Vr (LOW) and a duty of 100% can be said to be greater than the case of a response speed Vr (HIGH) and a duty of 100% (see the image diagram).

On the other hand, in the case that the liquid crystal molecules 61M having a relatively high response speed Vr tilt (see the upper graph of FIG. 13D), light of the LEDs 71 based on a PWM light modulation signal at 50% duty is supplied to the liquid crystal molecules 61M in the response process time span CW, as shown in the middle graph of FIG. 13D.

At this point, light is not emitted from the liquid crystal display panel 60 for the entire time range from start to end of the response process time span CW, in the same manner the middle graph of FIG. 13B. However, the response process time span CW is shorter than the response process time span CW shown in the upper graph of FIG. 13B (the final timing in a single frame interval and the final timing of a high interval in the PWM light modulation signal are synchronized, and a single cycle of the PWM light modulation signal and the response process time span CW are synchronized).

Specifically, light is not supplied to the liquid crystal molecules 61M in the initial interval (the first interval) in the case that the response process time span CW is divided into two intervals, and light is supplied to the liquid crystal molecules 61M in the second interval. As a result, the first interval becomes a time span that shows the lowest luminance value, as shown in the lower graph of FIG. 13D.

On the other hand, in the second interval, although the amount of tilt of the liquid crystal molecules 61M is relatively high, the amount of tilt (the angle required to form a white image) is not perfect. Accordingly, all of the light is normally expected to be transmitted, but the time span is one in which only a portion of the light is transmitted. The luminance value that corresponds to the second interval is less than the maximum luminance value.

Therefore, in the case that the response speed Vr of the liquid crystal molecules 61M is relatively high (the case in which the response process time span CW is the time of a single cycle in the drive frequency of the PWM light modulation signal), as shown in FIG. 13D, light is supplied to the liquid crystal display panel 60 in continuous fashion so as to include fixed gaps in the response process time span CW when the LEDs 71 emit light with a PWM light modulation signal at a duty of other than 100% (the luminance value of the light thus supplied is less than the maximum luminance value).

Figure 17:
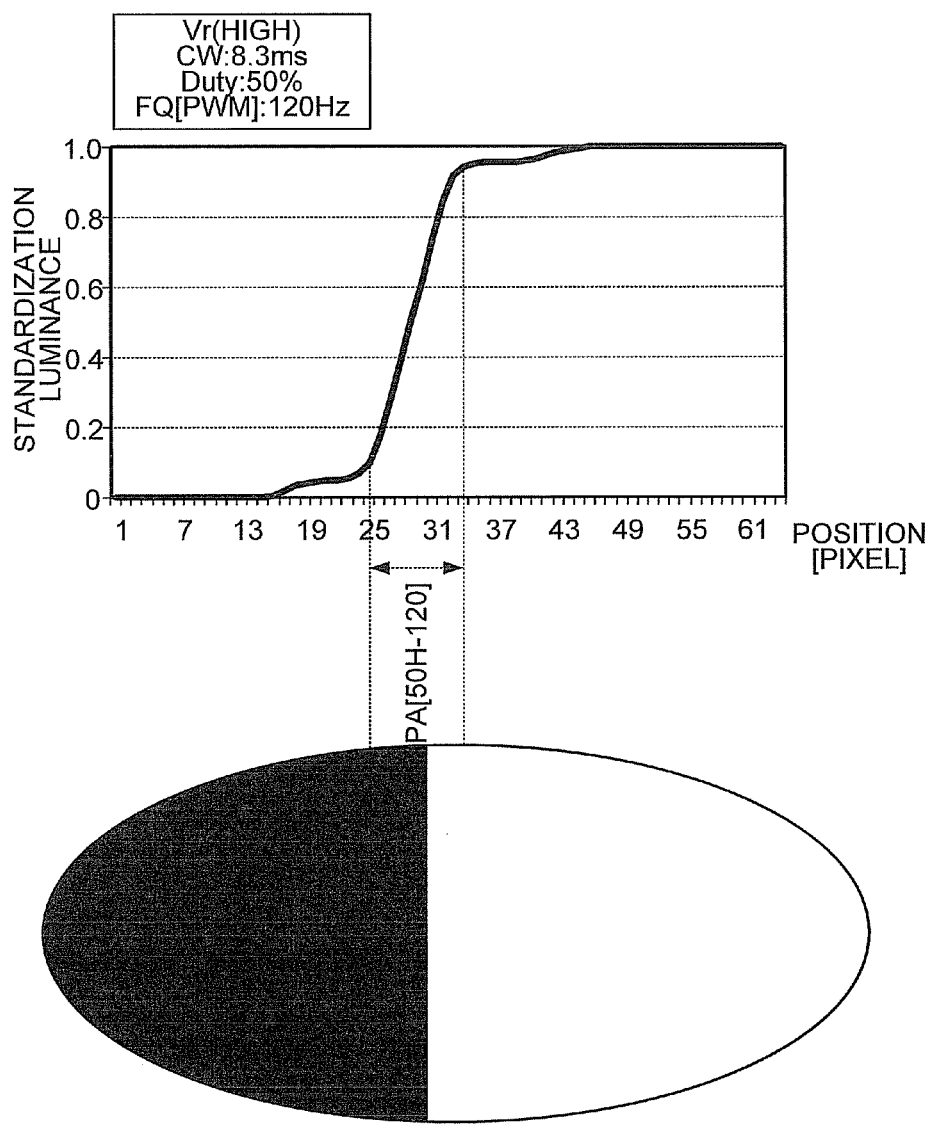
FIG. 17 is a graph showing the integral luminance in the vicinity of the boundary between the black image and the white image, and an image diagram of the boundary image (where the response speed of the liquid crystal is relatively high and the PWM light modulation signal is at 50% duty)

However, since the response speed Vr of the liquid crystal molecules 61M is high, there are only a small number of pixels in the vicinity of the boundary that receive insufficient light for forming a perfectly white image in the case that the boundary between the black image and the white image moves, as shown in FIGS. 12B to 12E, because the response process time span CW is short (see FIG. 17).

Such pixels, which appear in a continuous manner in the pixel range PA [50H-120], are not readily recognized to be problematic pixels (see the image diagram). Therefore, when the response speed Vr is relatively high and the duty is other than 100% (e.g., a duty of 50% or less), the switching from the black image to the white image is carried out at high speed, and pixels with substantially the same amount of variation in integral luminance are continuous in only a small pixel range PA [50H-120]. Accordingly, in this case, afterimages and ghost outlines do not occur in the liquid crystal display panel 60.

<Concerning Improvement in Image Quality Using the Duty of the PWM Light Modulation Signal for Controlling Light Emission of the LED>

Figures 18, 19:
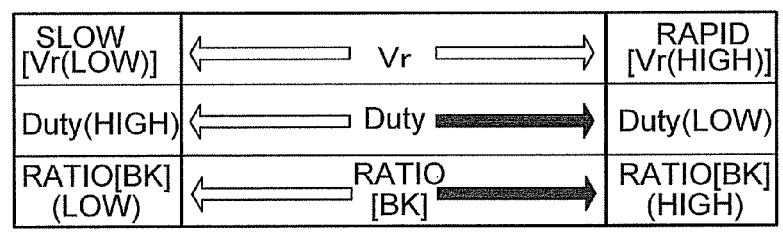
FIG. 18 is a chart summarizing image quality evaluation derivable from FIGS. 14 to 17.
FIG. 19 is a chart showing the relationship between the response speed of the liquid crystal molecules and the duty (black insertion ratio) of the PWM light modulation signal.

Here, when the results which can be derived from FIGS. 14 to 17 are made into a chart, a chart such as that shown in FIG. 18 is obtained (evaluation of the image quality in the liquid crystal display panel 60).

The black insertion ratio (RATIO [BK]) in this chart is the ratio of intervals in which the LEDs 71 are turned off in a single cycle in the PWM light modulation signal (locations with a high black insertion ratio are colored in order to facilitate understanding). The chart shows three items that are evaluated with four levels (excellent>good>fair>poor), the three items being whether the image is sharply (distinctly) displayed on the liquid crystal display panel 60, whether ghost outlines have occurred, and whether the image is generally acceptable.

<<Variation of the Duty in the PWM Light Modulation Signal>>

The following can be said from the chart of FIG. 18. First, the case in which the response speed Vr of the liquid crystal molecules 61M is high has relatively better image quality in comparison with the case in which the response speed Vr is low. In the particular case that the response speed Vr of the liquid crystal molecules 61M is relatively high and the duty in the PWM light modulation signal is 50% or less, the results are "excellent" in all three items for evaluating image quality (driving the LEDs 71 at a duty of 50% or less in this manner is referred to as "black insertion").

However, even when the LEDs 71 are driven using a PWM light modulation signal at 50%) duty or less, ghost outlines occur and the overall image quality is most inferior in the case that the response speed Vr of the liquid crystal molecules 61M is low. It is apparent from FIG. 18 that the LEDs 71 are preferably driven at a PWM light modulation signal in excess of 50% duty in the case that the response speed Vr of the liquid crystal molecules 61M is low.

In light of the above results of FIG. 18, the duty of the PWM light modulation signal can be varied in accordance with the response speed Vr of the liquid crystal molecules 61M in the liquid crystal display device 90, thereby making it possible to reflect the response characteristics of the liquid crystal molecules 61M and to improve image quality shown in the liquid crystal display panel 60 (e.g., improve the level of sharpness and the like while reducing the occurrence of ghost outlines).

In other words, the LEDs 71 can be driven at a relatively low duty to carry out black insertion in the case that the response speed Vr of the liquid crystal molecules 61M is relatively high, as shown in the chart of FIG. 19. On the other hand, the LEDs 71 can be driven at a relatively high duty without carrying out black insertion in the case that the response speed Vr of the liquid crystal molecules 61M is relatively low (the colored arrows in FIG. 19 refer to the tendency for black insertion to be carried out).

With this configuration, light is supplied for a short time to liquid crystal 61 having a relatively high response speed Vr in continuous fashion so as to include fixed gaps in response to a relatively low duty. Consequently, in this case, the liquid crystal display device 90 displays an image in similar fashion to an impulse-type display device and has increased image quality. On the other hand, when light is supplied for a short time in continuous fashion so as to include fixed gaps to liquid crystal 61 having a relatively low response speed Vr, light is supplied to liquid crystal molecules 61M which have not reached a predetermined angle, and defects in image quality (ghost outlines and the like) occur as a result.

Nevertheless, the LEDs 71 are driven at a relatively high duty in order to prevent defects in image quality in liquid crystal 61 having such relatively low response speed Vr. Therefore, an improvement in image quality is ensured in accordance with the response speed Vr of the liquid crystal 61 in the liquid crystal display device 90.

The response speed Vr of the liquid crystal molecules 61M varies depending not only on the temperature, but the material. Therefore, the threshold value (response speed data threshold value) for determining whether the response speed Vr is high or low is set in arbitrary fashion.

For example, the arrows representing the magnitude relationship between the response speed Vr, the duty, and the data value of the black insertion ratio are described below with reference to FIG. 20 in which, more specifically, the base side of the arrow is a smaller data value and the tip of the arrow is a larger data value (the grayscale shading of the arrows in FIG. 20 indicates the tendency of black insertion to be carried out).

Figure 20:
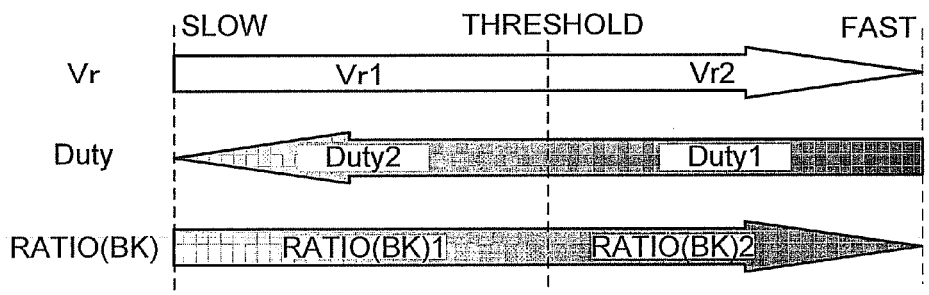
FIG. 20 is a chart showing arrows that indicate the relationship between data values of the response speed of the liquid crystal molecules and data values of the duty of the PWM light modulation signal (black insertion ratio)
Figure 21:
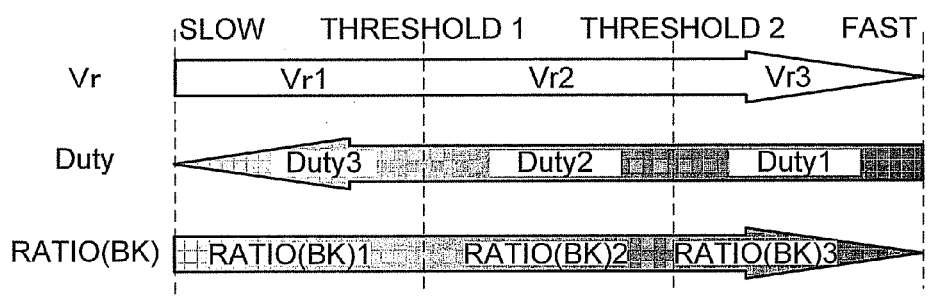
FIG. 21 is a chart showing arrows that indicate the relationship between data values of the response speed of the liquid crystal molecules and data values of the duty of the PWM light modulation signal (black insertion ratio)

In other words, the ranges of the two response speeds Vr are set using a single arbitrary threshold value as a boundary in the entire range of envisioned response speeds Vr, and the threshold value can be any response speed Vr in the entire range of the response speeds Vr as long as the liquid crystal molecules 61M tilt at a low response speed Vr (Vr1) in a range of the response speeds Vr that is less than the threshold value, and the liquid crystal molecules 61M tilt at a high response speed Vr (Vr2) in a range of the response speeds Vr that is equal to or greater than the threshold value, as shown in FIG. 20. The number of threshold values that can be set is not limited to a single threshold value as shown in FIG. 20. In other words, it is possible to set two or more threshold values to obtain three or more response speed Vr ranges (response speed data ranges) using the threshold values as boundaries, as shown in FIG. 21.

Essentially, at least one arbitrary threshold value is provided, a plurality of arbitrary ranges of response speeds Vr using the threshold value(s) as a boundary can be set, and the duty can be varied for each range. With this configuration, the response speed Vr of the liquid crystal molecules 61M is divided into stages, and improvement in image quality is ensured in accordance with the stages.

In particular, the duty can be varied for each range of the plurality of response speeds Vr so that an inverse relationship is formed with the magnitude relationship related to the range of the plurality of response speeds Vr. For example, in the case that the numerical value of the response speed Vr is Vr1, which is a small value, the duty becomes a duty 2, which is a large value; and in the case that the numerical value of the response speed Vr is Vr2, which is a large value, the duty becomes a duty 1, which is a small value, as shown in FIG. 20 (the magnitude relationship of the data values of the response speeds Vr is Vr1<Vr2, and the magnitude relationship of the duty data values is duty 1<duty 2).

Figure 22:
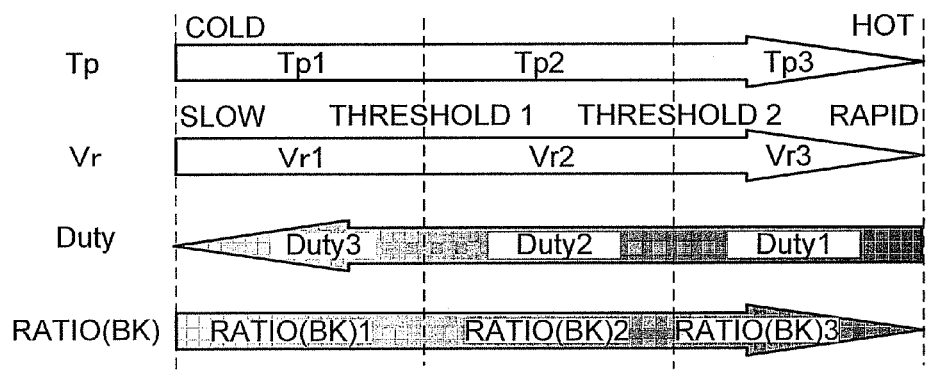
FIG. 22 is a chart showing arrows that indicate the relationship between data values of the liquid crystal temperature, data values of the response speed of the liquid crystal molecules, and data values of the duty of the PWM light modulation signal (black insertion ratio)

One reason for fluctuations in the response speed Vr in the liquid crystal molecules 61M in a single liquid crystal display device 90 is the temperature Tp of the liquid crystal molecules 61M. In view of this fact, the chart of FIG. 22 shows the case in which the magnitude relationship of the data values of the temperature Tp is added to the chart of FIG. 21 (essentially, the response speed Vr of the liquid crystal molecules 61M increases as the temperature increases). In the liquid crystal display device 90, the control unit 1 operates, e.g., in the following manner in order to acquire the data value of the response speed Vr from the temperature Tp of the liquid crystal molecules 61M.

More specifically, the duty setting section 14 of the picture signal processing section 10 included in the control unit 1 acquires the temperature measurement data (temperature data) from the panel thermistor 83, as shown in FIG. 2. The duty setting section 14 acquires one memory data DM stored in the memory 17.

Specifically, the memory data DM is a data table (lookup table) of the response speeds Vr of the liquid crystal molecules 61M that depend on the temperature of the liquid crystal 61 (liquid crystal temperature Tp). In other words, the duty setting section 14 acquires the response speed Vr by correlating the temperature data of the panel thermistor 83 and the liquid crystal temperature Tp of the data table.

The duty setting section 14 sets the duty of the PWM light modulation signal that corresponds to the acquired response speed Vr. The method for setting the duty is not particularly limited; a possible configuration in one in which, e.g., a data table of the duty having dependence on the response speed Vr is stored in the memory 17, and the duty setting section 14 sets the duty using the data table.

<<Variation in the Electric Current in the PWM Light Modulation Signal>>

In the case that the duty of the PWM light modulation signal is set in accordance with the response speed Vr of the liquid crystal molecules 61M, it is preferred that the electric current value AM of the PWM light modulation signal also vary in accordance with the duty (essentially, the PWM light modulation signal VD-Sd[W] can be corrected so as to become the PWM light modulation signal Vd-Sd[W·A]). The reason for this is described below.

Figure 23A:
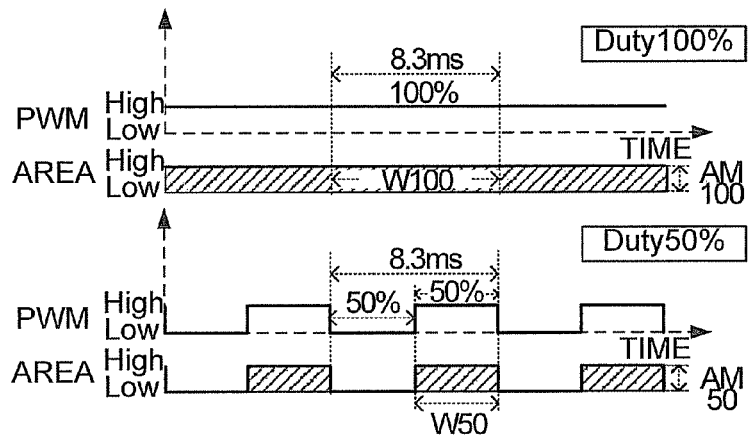
FIG. 23A is an explanatory drawing showing the relationship between the luminance and the waveform of the PWM light modulation signal of the same electric current value (where the duty is 100% and 50%)

For example, FIG. 23A shows the PWM light modulation signal at 100% duty and the PWM light modulation signal at 50% duty (where the PWM light modulation signal is at 120 Hz and the dotted-line divisions indicate a single frame interval). The luminance produced by such PWM light modulation signals can be roughly compared in terms of the magnitude of the shaded area directly below the graphs of the PWM light modulation signal. Essentially, the luminance can be roughly compared using the area obtained by multiplying the electric current value and the ON-time of the PWM light modulation signal.

In the case of FIG. 23A, the duty varies at 100% and 50%, but the electric current value AM is the same. In view whereof, in a comparison of the luminance in a single cycle of the PWM light modulation signal, the case of 100% duty is brighter than the case of 50% duty (W100×AM100>W50× AM50), where W100 is the ON interval at 100% duly, AM100 is the electric current value at 100% duty, W50 is the ON interval at 50% duty, and AM50 is the electric current value at 50% duty.

Figure 23B:
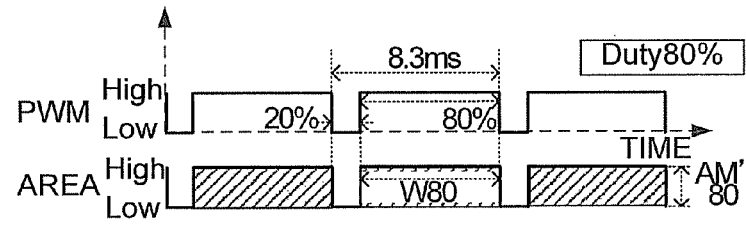
FIG. 23B is an explanatory drawing showing the relationship between the luminance and the waveform of the PWM light modulation signal having an electric current value adjusted so as to obtain the same luminance as the luminance at 100% duty in FIG. 23A (where the duty is 80%)
Figure 23C:
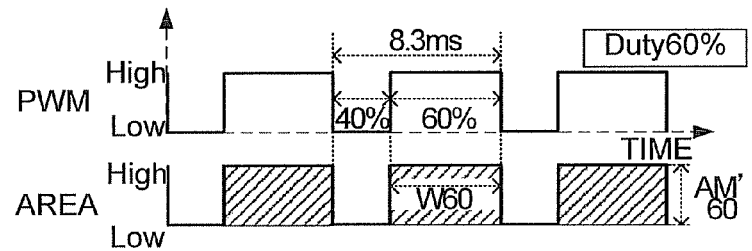
FIG. 23C is an explanatory drawing showing the relationship between the luminance and the waveform of the PWM light modulation signal having an electric current value adjusted so as to obtain the same luminance as the luminance at 100% duty in FIG. 23A (where the duty is 60%)
Figure 23D:
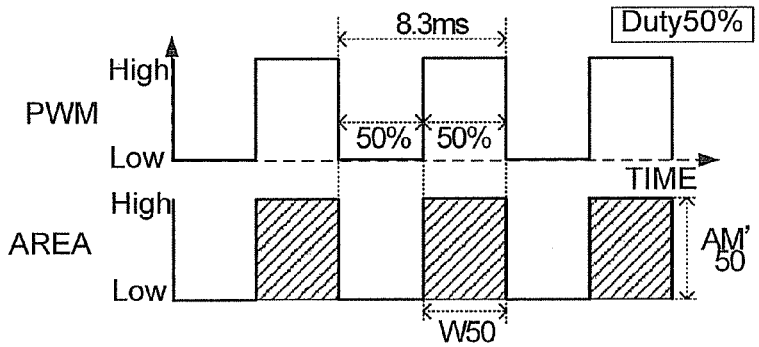
FIG. 23D is an explanatory drawing showing the relationship between the luminance and the waveform of the PWM light modulation signal having an electric current value adjusted so as to obtain the same luminance as the luminance at 100% duty in FIG. 23A (where the duty is 50%)

Consequently, a difference in luminance is produced in accordance with the duty, which causes degradation in image quality when the duty of the PWM light modulation signal is varied in correspondence with the response speed Vr. In view thereof, the electric current value of the PWM light modulation signal varies in accordance with the duty. For example, the shaded areas of the graphs for describing the luminance are made equal (W100×AM100=W80×AM'80=W60× AM'60=W50×AM'50), as shown in FIG. 23B for the case of 80% duty, FIG. 23C for the case of 60% duty, and FIG. 23D for the case of 50% duty, where the luminance at 100% duty in FIG. 23A is used as a reference.

In other words, the electric current value setting section 15 of the computation processing section 13 varies the electric current value AM of the PWM light modulation signal when driven at a duty other than 100%, so as to cause a match between the integral amount of light emitted at the interval of a single cycle of the PWM light modulation signal and the integral amount of light emitted at 100% duty in a time that corresponds to the interval a single cycle. With this configuration, the luminance no longer varies due to duty, even when the duty has been varied in accordance with the response speed Vr of the liquid crystal molecules 61M (essentially, the liquid crystal display device 90 can vary the duty when maintaining high luminance).

Figure 24:
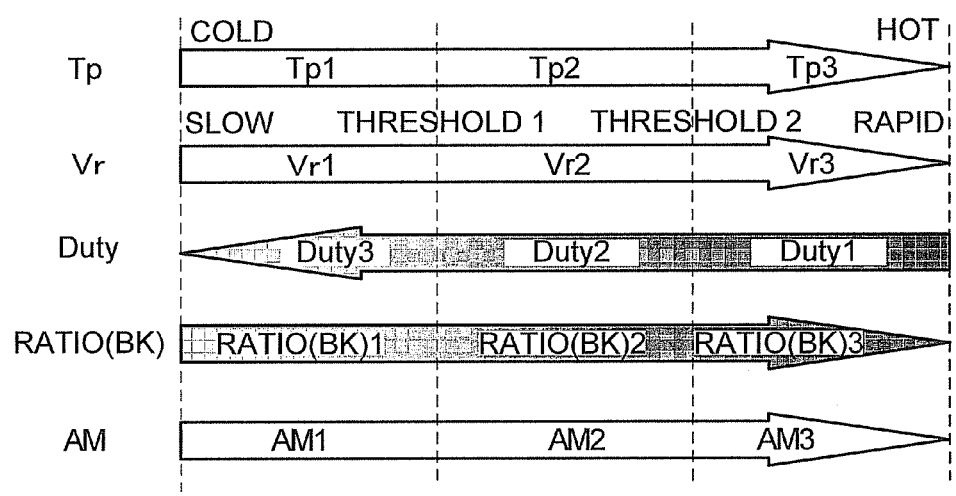
FIG. 24 is a chart showing arrows that indicate the relationship between data values of the liquid crystal temperature, the data values of the response speed of the liquid crystal molecules, data values of the duty of the PWM light modulation signal (black insertion ratio), and data values of the current value of the PWM modulation signal.

The chart of FIG. 24 shows the case in which the electric current value of the PWM light modulation signal is varied in accordance with the duty as an addition to the chart of FIG. 22. In other words, the higher the amount of black insertion there is (the lower the duty is), the higher the electric current value AM is (AM1<AM2<AM3).

The method by which the electric current value setting section 15 sets the electric current value AM is not particularly limited; e.g., the electric current value setting section 15 may receive the duty data signal, and then compute and set the electric current value AM itself, or may store within itself a data table of electric current values AM having dependence on the duty and set the electric current value AM using the data table.

<<Other Factors>>

Various functions are installed in the liquid crystal display device 90 in order to improve image quality. Examples include an FRC processing function, and a viewing mode setting function for varying the display format of an image in accordance with viewer preference. Another example is an environment adaptation function for adjusting the brightness of the liquid crystal display panel 60 in accordance with the light level of the environment in which the liquid crystal display device 90 is placed. Yet another example is a picture signal adaptation function for adjusting the brightness of the liquid crystal display panel 60 in accordance with the brightness or the like (the average signal level ASL or the like) of the picture signal.

Figure 25:
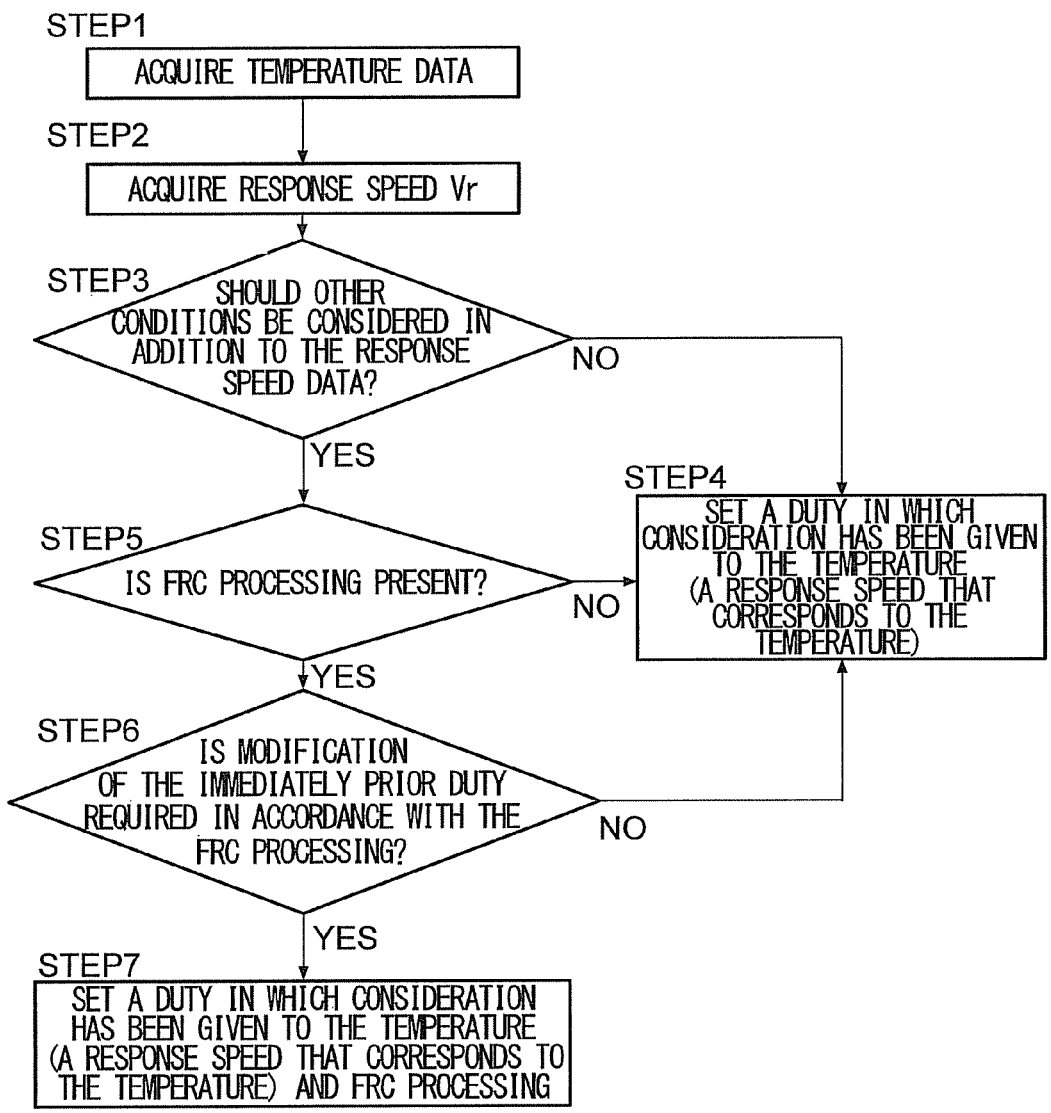
FIG. 25 is a flowchart of a case where the duty of the PWM light modulation signal is set with consideration given to FRC processing.

There are also cases in which it is preferred that the duty of the PWM light modulation signal be varied in accordance with these various functions. For example, the duty setting section 14 of the computation processing unit 13 acquires temperature data of the panel thermistor 83 (STEP 1) and acquires the response speed Vr of the liquid crystal molecules 61M (STEP 2), as shown in the flowchart of FIG. 25.

In view thereof, the duty setting section 14 judges the response speed Vr (response speed data). Specifically, the duty setting section 14 judges whether to vary the duty setting according to whether various functions are operating (STEP 3). For example, when the response speed Vr is set excessively low and the duty has been set high regardless of whether various functions are operating, the duty setting section 14 sets the duty to, e.g., 100% with consideration given to the response speed Vr that corresponds to the liquid crystal temperature Tp (STEP 4) in the case that ghost outlines occur (No in STEP 3). With this configuration, the occurrence of ghost outlines is prevented.

However, in the case that the duty setting section 14 has determined that it is preferable to vary the duty setting due to the presence of various functions (Yes in STEP 43), the duty setting section 14 sets the duty with consideration given to various functions. This configuration is provided in order to reliably ensure improvement in image quality.

(FRC Processing Function)

For example, the duty setting section 14 judges whether FRC processing is present (STEP 5). Specifically, the duty setting section 14 receives a signal (ON/OFF signal) which shows the presence of FRC processing from the FRC processing section 21 of the liquid crystal display panel controller 20, as shown in FIG. 2. In the case that FRC processing is not being carried out (No in STEP 5), i.e., since the number of frames of the picture signal is less than a predetermined number, the duty setting section 14 sets the duty to the same duty in which consideration has been given to the response speed Vr that corresponds to the liquid crystal temperature Tp, i.e., a relatively high duty (STEP 4).

Conversely, in the case FRC processing is being carried out (Yes in STEP 5), the duty setting section 14 judges whether modification of the immediately prior duty is required in accordance with the FRC processing (STEP 6). This is due to the fact that there are cases in which the immediately prior duty, i.e., the duty set in STEP 4 may not vary from the duty of the case in which FRC processing has been carried out.

Figure 26:
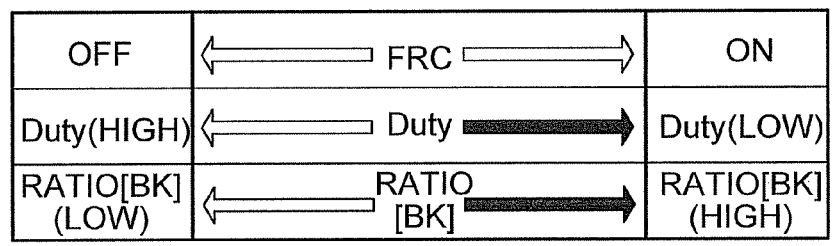
FIG. 26 is a chart showing the relationship between the presence of FRC processing and the duty of the PWM light modulation signal (black insertion ratio)

In the case that the duty setting section 14 has judged that modification of the immediately prior duty is required (Yes in STEP 6), the duty is set with consideration given to FRC processing and the response speed Vr that corresponds to the liquid crystal temperature Tp (STEP 7). For example, the duty setting section 14 reduces the duty in the case that FRC processing is present (the chart of FIG. 26 shows how the magnitude of the duty tends to correspond to the presence of FRC processing). With this configuration, the level of sharpness and the like of the image quality is improved.

Conversely, in the case that the duty setting section 14 has judged that modification of the immediately prior duty is not required (No in STEP 6), the duty is set with consideration given only to the response speed Vr that corresponds to the liquid crystal temperature Tp (STEP 4).

In other words, the control unit 1 shown in FIG. 1 includes an FRC processing section 21 for carrying out frame rate control processing, and the control unit 1 (more specifically, the duty setting section 14) varies the duty in accordance with the presence of FRC processing by the FRC processing section 21 (the electric current value AM may be varied in accordance with the variation of the duty). The duty in the case that FRC processing is present is less than the duty of the case in which FRC processing is not present (see FIG. 26).

(Viewing Mode Setting Function)

The duty setting section 14 may make judgments that correspond to the setting of the viewing mode. Specifically, the duty setting section 14 receives a mode description signal MD that shows the type of viewing mode, e.g., a sports mode having a relatively high video level, from the viewing mode setting section 16 of the picture signal processing section 10, as shown in FIG. 2.

The duty setting section 14 judges whether the immediately prior duty requires modification in accordance with the video level (STEP 15), as shown in the flowchart of FIG. 27 (STEPS 1 to 4 are the same as described above). This is due to the fact that there are cases in which the immediately prior duty, i.e., the duty set in STEP 4, does not vary from the duty in the case that the video level is high.

In the case that the duty setting section 14 has judged that the immediately prior duty requires modification (Yes in STEP 15), the duty setting section 14 sets a duty in which consideration has been given to the video level and the response speed Vr that corresponds to the liquid crystal temperature Tp (STEP 16). For example, the duty setting section 14 reduces the duty in the case that the sports mode has been set (the chart of FIG. 28 shows how the magnitude of the duty tends to correspond to the magnitude relationship of the video level). With this configuration, the level of sharpness and the like of the image quality is improved.

Conversely, in the case that the duty setting section 14 has judged that the immediately prior duty does not require modification (No in STEP 15), a duty is set in which consideration is given only to the response speed Vr that corresponds to the liquid crystal temperature Tp (STEP 4).

In other words, the control unit 1 shown in FIG. 1 includes a viewing mode setting section 16 for switching the viewing mode of the liquid crystal display panel 60, and in the case that the viewing mode setting section 16 has switched the viewing mode, the control unit 1 (more specifically, the duty setting section 14) varies the duty in accordance with the selected viewing mode (the electric current value AM may be varied in accordance with the variation of the duty).

An example of such variation of duty is one in which the duty is varied for each selected viewing mode (see FIG. 28) so as to be in an inverse relationship with the high-low relationship (the magnitude relationship) of the video level in a plurality of viewing modes, in the case that the viewing mode setting section 16 has set a high video level viewing mode and a low video level viewing mode in accordance with the video level of the picture data.

The duty setting section 14 may make a judgment that corresponds to the setting of the viewing mode in which the contrast ratio is different. Specifically, the duty setting section 14 receives a mode description signal MD that shows the type of viewing mode from the viewing mode setting section 16, e.g., a signal indicating a dynamic mode having a relatively high contrast ratio.

Figure 29:
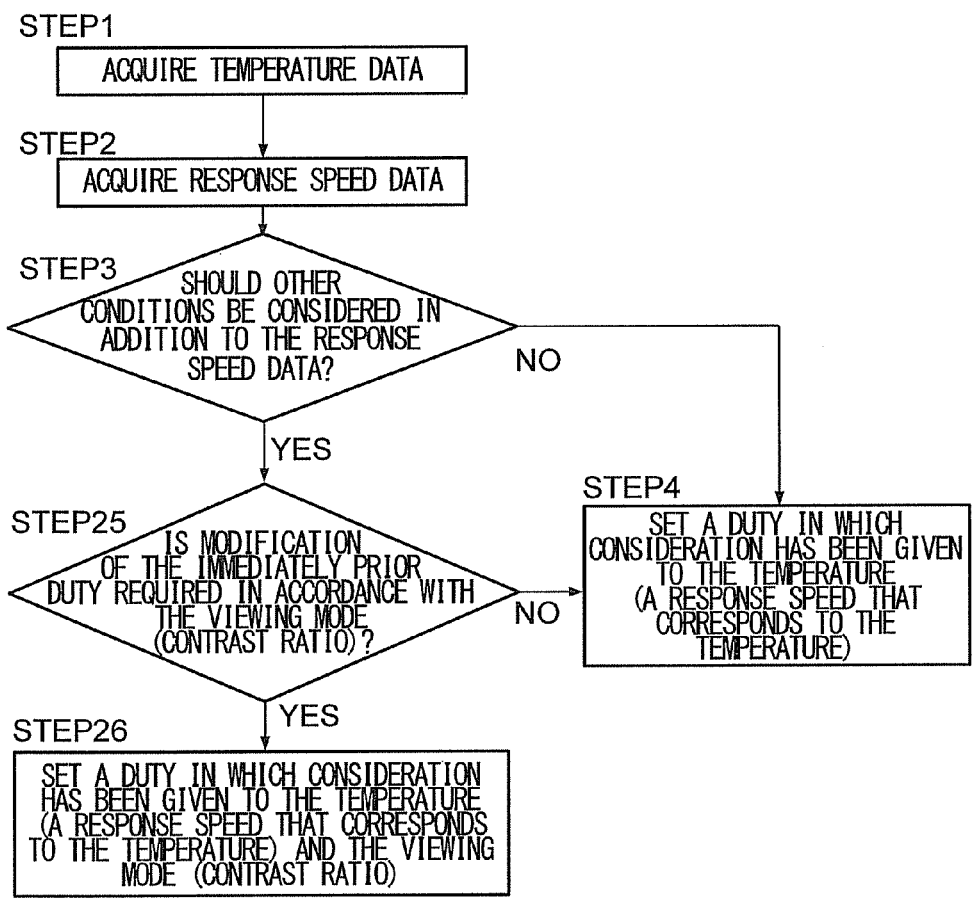
FIG. 29 is a flowchart of a case where the duty of the PWM light modulation signal is set with consideration given to the viewing mode (modification of the contrast ratio)

The duty setting section 14 judges whether the immediately prior duty requires modification in accordance with the contrast ratio (STEP 25), as shown in the flowchart of FIG. 29 (STEPS 1 to 4 are the same as described above). This is due to the fact that there are cases in which the immediately prior duty, i.e., the duty set in STEP 4, does not vary from the duty in the case that the contrast ratio is high.

Figure 30:
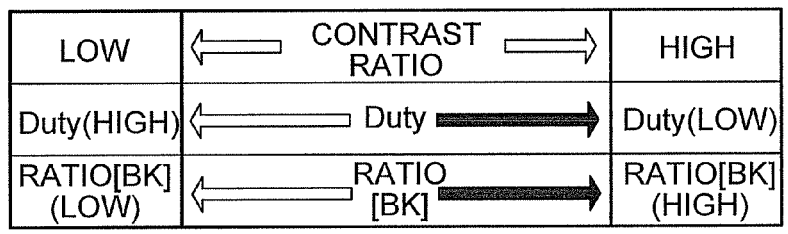
FIG. 30 is a chart showing the relationship between the contrast ratio and the duty of the PWM light modulation signal (black insertion ratio)

In the case that the duty setting section 14 has judged that the immediately prior duty requires modification (Yes in STEP 25), the duty setting section 14 sets a duty in which consideration has been given to the contrast ratio and the response speed Vr that corresponds to the liquid crystal temperature Tp (STEP 26). For example, the duty setting section 14 reduces the duty in the case that the dynamic mode has been set (the chart of FIG. 30 shows how the magnitude of the duty tends to correspond to the magnitude relationship of the contrast ratio). With this configuration, the level of sharpness and the like of the image quality is improved.

Conversely, in the case that the duty setting section 14 has judged that the immediately prior duty does not require modification (No in STEP 25), a duty is set in which consideration is given only to the response speed Vr that corresponds to the liquid crystal temperature Tp (STEP 4).

In other words, in the case that the viewing mode setting section 16 has set a high contrast level viewing mode and a low contrast level viewing mode in accordance with the contrast level of the picture data, the duty is varied for each selected viewing mode (see FIG. 30) so as to be in an inverse relationship with the high-low relationship (the magnitude relationship) of the contrast level in a plurality of viewing modes.

There are many types of viewing modes, and the duty setting section 14 may set the duty by combining various modes. For example, the duty setting section 14 receives a mode description signal MD that shows the type of viewing mode, e.g., a sports mode having a relatively high video level and a dynamic mode having a relatively high contrast ratio, from the viewing mode setting section 16.

Figure 31:
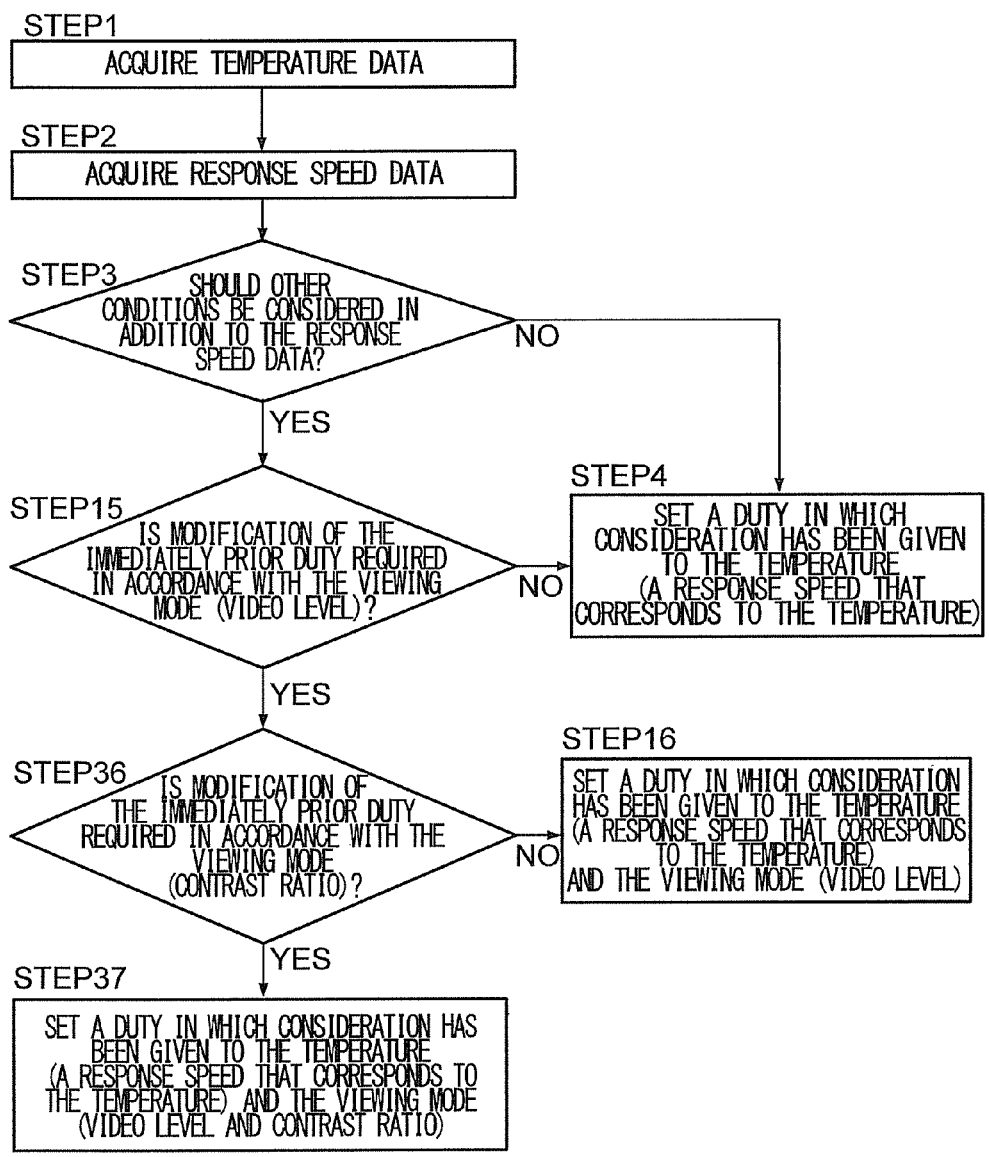
FIG. 31 is a flowchart of a case where the duty of the PWM light modulation signal is set with consideration given to the viewing mode (modification of the video level and the contrast ratio)

The duty setting section 14 judges whether the immediately prior duty requires modification (STEP 15) in accordance with, e.g., the video level, as shown in the flowchart of FIG. 31 (STEPS 1 to 4 are the same as described above). In the case that it has been determined that modification of the immediately prior duty is not required (No in STEP 15), the duty setting section 14 sets a duty in which consideration has been given only to the response speed Vr that corresponds to the liquid crystal temperature Tp (STEP 4).

Conversely, in the case that the that the duty setting section 14 has judged that modification of the immediately prior duty is required (Yes in STEP 15), the duty setting section 14 furthermore judges whether modification of the immediately prior duty is required in accordance with the contrast ratio (STEP 36). In the case that the duty setting section 14 has judged that modification of the immediately prior duty is required (Yes in STEP 36), the duty setting section 14 sets a duty in which consideration has been given to the video level, the contrast ratio, and the response speed Vr that corresponds to the liquid crystal temperature Tp (STEP 37).

Conversely, in the case that the duty setting section 14 has judged that modification of the immediately prior duty is not required (No in STEP 36), the duty setting section 14 sets a duty in which consideration has been given to the video level and the response speed Vr that corresponds to the liquid crystal temperature Tp (STEP 16).

In the flowchart of FIG. 31, the video level is considered first, and the contrast ratio is considered thereafter, but the order may be different.

(Environment Adaptation Function)

The duty setting section 14 may make judgments that correspond to the light level of the environment in which the liquid crystal molecules 61M are placed. Specifically, the duty setting section 14 receives the illumination intensity data of the environment illumination intensity sensor 84, as shown in FIG. 2 (essentially, the information used by the duty setting section 14 to judge the light level of the location in which the liquid crystal display device 90 is placed is the illumination intensity measured by the environment illumination intensity sensor 84 for measuring the external illumination intensity).

The duty setting section 14 judges whether the immediately prior duty requires modification (STEP 45) in accordance with the illumination intensity data, as shown in the flowchart of FIG. 32 (STEPS 1 to 4 are the same as described above). This is due to the fact that the immediately prior duty, i.e., the duty set in STEP 4 does not vary from the duty in the case that the illumination intensity data is high (essentially, the case that the environment is relatively bright).

In the case that the duty setting section 14 has judged that the immediately prior duty requires modification (Yes in STEP 45), the duty setting section 14 sets a duty in which consideration has been given to the illumination intensity data and the response speed Vr that corresponds to the liquid crystal temperature Tp (STEP 46). For example, the duty setting section 14 reduces the duty in the case that the liquid crystal display device 90 has been placed in a relatively bright environment (the chart of FIG. 33 shows how the magnitude of the duty tends to correspond to the magnitude relationship of the illumination intensity data). With this configuration, the level of sharpness and the like of the image quality is improved.

Conversely, in the case that the duty setting section 14 has judged that the immediately prior duty does not require modification (No in STEP 45), a duty is set in which consideration is given only to the response speed Vr that corresponds to the liquid crystal temperature Tp (STEP 4).

In other words, the control unit 1 shown in FIG. 1 acquires the external illumination intensity data and varies the duty in accordance with the illumination intensity data (the electric current value AM may be varied in accordance with the variation of the duty). The duty is varied for each illumination intensity data range so as to form an inverse relationship with the magnitude relationship of the data values in the plurality of illumination intensity data ranges (FIG. 33).

(Picture Signal Adaptation Function)

The duty setting section 14 may make judgments that correspond to the luminance or the like of the picture signal (the average signal level ASL or the like). Specifically, the duty setting section 14 receives the histogram data HGM of the histogram processing section 12 via the computation processing section 13, as shown in FIG. 2. The duty is varied using the histogram data HGM.

Figure 34:
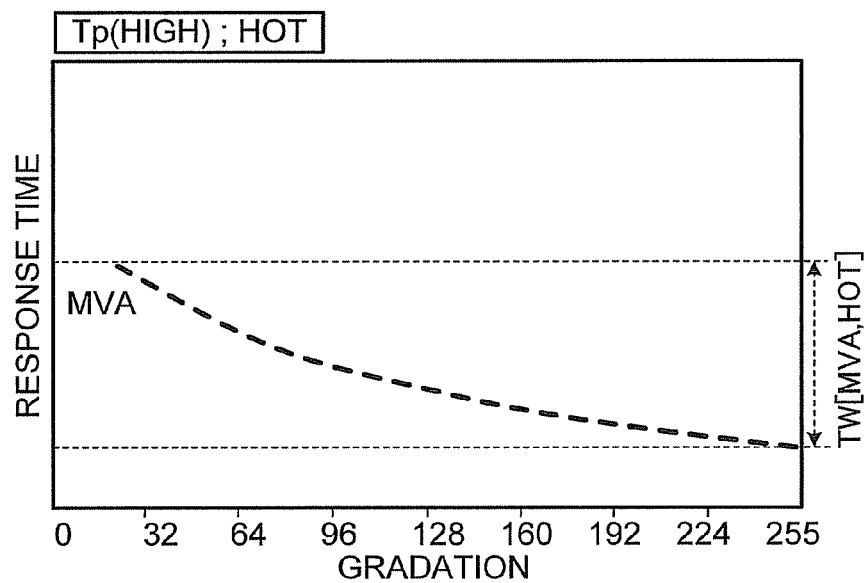
FIG. 34 is a graph showing the relationship between the gradation value and the response time of the liquid crystal molecules (where the liquid crystal temperature is a relatively high temperature with MVA mode liquid crystal)
Figure 35:
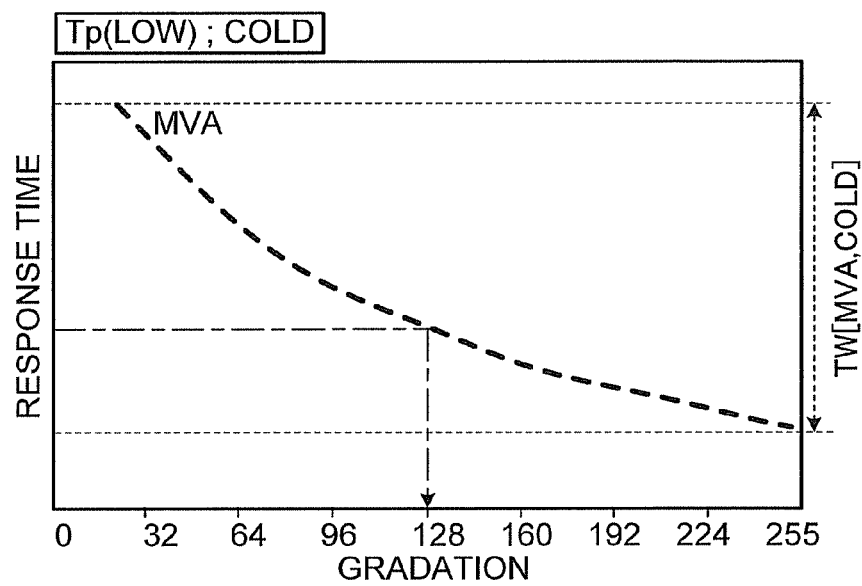
FIG. 35 is a graph showing the relationship between the gradation value and the response time of the liquid crystal molecules (where the liquid crystal temperature is a relatively low temperature with MVA mode liquid crystal)

The response speed Vr of the liquid crystal molecules 61M has dependency on temperature, and also has dependency on variation between gradations. An example of such dependency is shown in FIGS. 34 and 35. These graphs show the response time for the liquid crystal molecules 61M to tilt when gradation is varied from a $0^{th}$ gradation to another gradation. FIG. 34 corresponds to a relatively high liquid crystal temperature Tp and FIG. 35 corresponds to a relatively low liquid crystal temperature Tp (the liquid crystal 61 is MVA mode liquid crystal).

It is apparent from a comparison of the graph of FIG. 34 and the graph of FIG. 35 that the difference TW between the maximum and minimum values of the response time varies depending on the liquid crystal temperature Tp (the difference TW [MVA, HOT] with a high liquid crystal temperature Tp is less than the difference TW [MVA, COLD] with a low liquid crystal temperature Tp). In the graph of FIG. 34 and the graph of FIG. 35, the response time gradually decreases from the $0^{th}$ gradation toward the $255^{th}$ gradation (the graph line decreases monotonically across a wide gradation range).

In the case that the difference TW is large in such a graph line, the image quality is degraded depending on the characteristics of the backlight BL when there is a difference between the occupancy ratio of a low gradation range and the occupancy ratio of a high gradation range in the image (single frame image).

For example, the response speed Vr of the liquid crystal molecules 61M is relatively low in the case that the occupancy ratio of the low gradation range is high in a low liquid crystal temperature Tp of about 20° C. (essentially, the case of an image having relatively low gradation). Ghost outlines may occur when the duty of the PWM light modulation signal to such liquid crystal molecules 61M is set to a low level, as shown in FIG. 15. In view of this fact, the duty of the PWM light modulation signal is set high in order to prevent ghost outlines.

Conversely, in the case of a high occupancy ratio in a high gradation range (essentially, the case of an image having relatively high gradation), the response speed Vr of the liquid crystal molecules 61M becomes relatively high. Accordingly, in such a case, the duty of the PWM light modulation signal can be set to a low level in order to improve the sharpness or the like of the image quality (essentially, the effect of black insertion of the PWM light modulation signal is dramatically exhibited).

Figure 36:
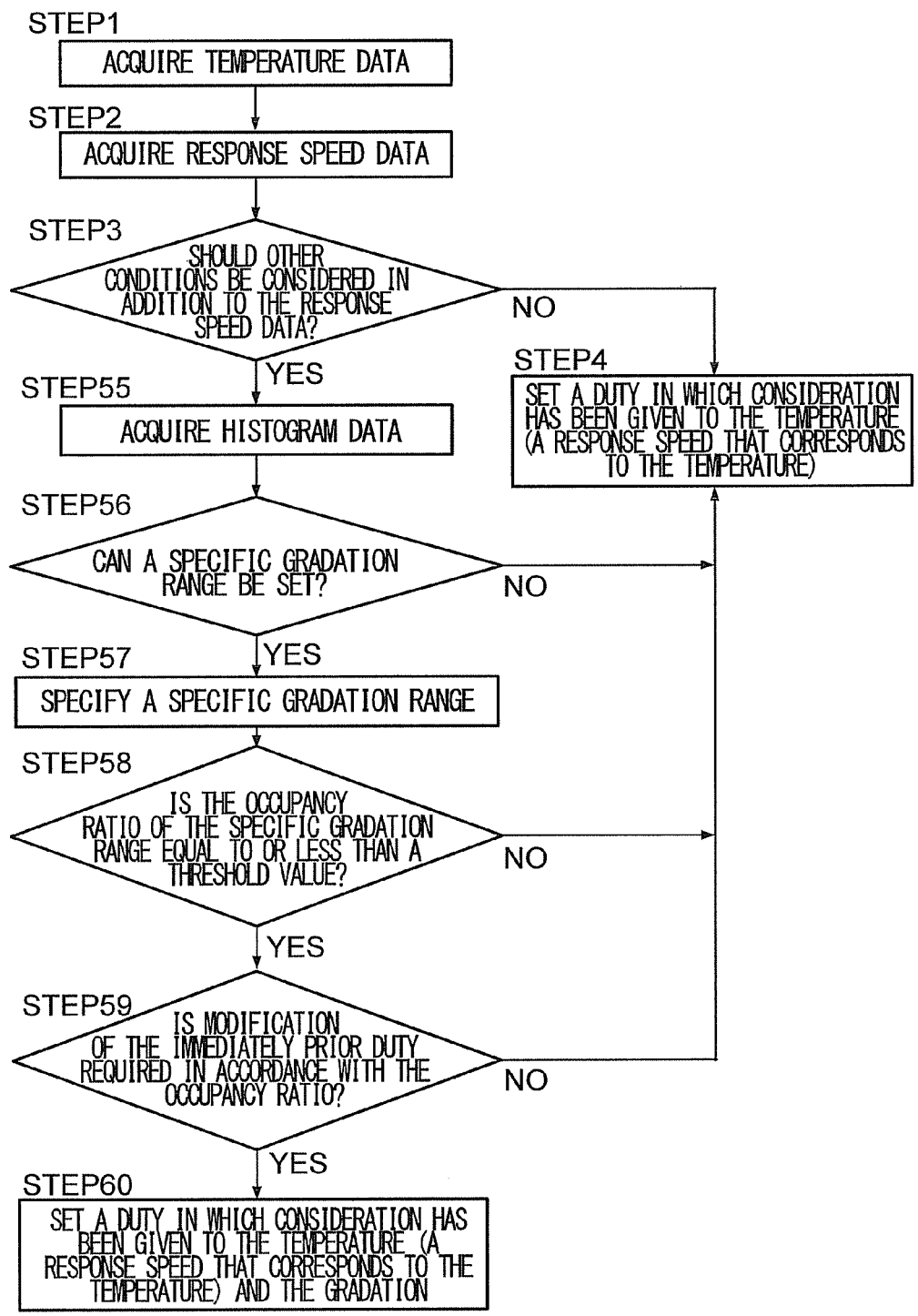
FIG. 36 is a flowchart of a case where the duty of the PWM light modulation signal is set with consideration given to a picture signal adaptation function.

In the case that the duty is varied in this manner in accordance with the occupancy ratio of the gradation range of an image, the duty setting section 14 acquires the histogram data HGM from the computation processing section 13 (STEP 55), as shown in the flowchart of FIG. 36 (STEPS 1 to 4 are the same as described above). Next, the duty setting section 14 acquires the gradation threshold value (gradation threshold value data) set in accordance with the liquid crystal temperature Tp stored in advance in the memory 17, and judges whether a specific gradation range can be set (STEP 56).

For example, in the case that the liquid crystal temperature Tp is high, the difference TW [MVA, HOT] is relatively small, as shown in FIG. 34. Consequently, the difference in response time that accompanies gradation variation at the high liquid crystal temperature Tp is less than the difference in response time that accompanies gradation variation at the low liquid crystal temperature Tp.

Accordingly, a specific gradation range (e.g., low gradation range) in which the duty is preferably varied is not required to be set using the histogram data HGM in the case that the liquid crystal temperature Tp is high (No in STEP 56), as long as the difference in response time that accompanies gradation variation in the case of a high liquid crystal temperature Tp is set within a tolerance range. For this reason, in such a case, the duty setting section 14 sets a duty in which consideration has been given only to the response speed Vr that corresponds to the liquid crystal temperature Tp (STEP 4).

Conversely, the duty setting section 14 attempts to vary the duty using the histogram data HGM when the difference in the response time that accompanies gradation variation in the case of a low liquid crystal temperature Tp is set outside a tolerance range, as shown in FIG. 35 (Yes in STEP 56). Specifically, the duty setting section 14 sets a specific gradation range in which it is preferred that the duty be varied (STEP 57) from the histogram data HGM and the gradation threshold value set in accordance with the liquid crystal temperature Tp stored in the memory 17. For example, in the case that the liquid crystal temperature Tp is low (e.g., about 20° C.) in MVA mode liquid crystal 61, the $0^{th}$ gradation to the $128^{th}$ gradation is set as the specific gradation range, as shown in FIG. 35 (essentially, a gradation range of 0 or more and 128 or less among the entire gradation range of 0 or more and 255 or less is used as the specific gradation range).

The duty setting section 14 acquires the occupancy ratio in the image (a single frame image) of the specific gradation range from the histogram data HGM, and compares the occupancy ratio and the threshold value related to the occupancy ratio of the specific gradation range (occupancy ratio threshold value; e.g., 50%) stored in the memory 17 (STEP 58).

In the case that the occupancy ratio is not at a threshold value or less (essentially, the case in which the occupancy ratio has exceeded the occupancy ratio threshold value; No in STEP 58), the image can be said to have low gradation and contain a large quantity of specific gradation ranges from, e.g., the $0^{th}$ gradation to the $128^{th}$ gradation. Consequently, the duty setting section 14 sets a high duty, e.g., 100%), in which consideration has been given only to the response speed Vr that corresponds to the liquid crystal temperature Tp (STEP 4) in order to prevent the occurrence of ghost outlines such as shown in FIG. 15.

Conversely, in the case that the occupancy ratio is at a threshold value or less (Yes in STEP 58), the image can be said to have high gradation that contains only a small quantity of specific gradation ranges from, e.g., the $0^{th}$ gradation to the $128^{th}$ gradation. Consequently, the duty setting section 14 judges whether modification of the immediately prior duty is required in accordance with the occupancy ratio (STEP 59). This is due to the fact that the immediately prior duty, i.e., the duty set in STEP 4, does not vary in the case that the occupancy ratio is high (essentially, the case of an image having low gradation).

In the case that the duty setting section 14 has judged that the immediately prior duty requires modification (Yes in STEP 59), the duty setting section 14 sets a duty that takes into consideration the gradation (essentially, the histogram data HGM) and the response speed Vr that corresponds to the liquid crystal temperature Tp (STEP 60). For example, the duty setting section 14 in an MVA mode liquid crystal display device 90 sets a low duty, e.g., 50% in the case that the image having relatively high gradation is displayed on the liquid crystal display panel 60 (the chart of FIG. 37 shows how the magnitude of the duty tends to correspond to the magnitude relationship of the occupancy ratio). With this configuration, the level of sharpness and the like of the image quality is improved.

On the other hand, in the case that the duty setting section 14 has judged that the immediately prior duty does not require modification (No in STEP 59), the duty setting section 14 sets a duty in which consideration is given only to the response speed Vr that corresponds to the liquid crystal temperature Tp (STEP 4).

In other words, in the control unit 1, the histogram unit 18 generates a histogram data HGM that shows the frequency distribution of the gradation by forming the picture signal into a histogram. The control unit 1 furthermore divides the entire gradation of the histogram data HGM and judges whether the occupancy ratio in at least one specific gradation range among the divided gradation ranges exceeds or is equal to or less than an occupancy ratio threshold value.

The duty of the case in which the occupancy ratio exceeds the occupancy ratio threshold value is made greater than the duty of the case in which the occupancy ratio is equal to or less than the occupancy ratio threshold value; and the duty of the case in which the occupancy ratio is equal to or less than the occupancy ratio threshold value is made less than the duty of the case in which the occupancy ratio exceeds the occupancy ratio threshold value (the electric current value AM may be varied in accordance with the variation of the duty).

The above-described specific gradation range from the $0^{th}$ gradation to the $128^{th}$ gradation and the occupancy ratio threshold value of 50% of the occupancy ratio of the specific gradation range at a liquid crystal temperature Tp of about 20° C. in MVA mode liquid crystal 61 are merely examples (there may be a plurality of specific gradation ranges). For example, at least one among the specific gradation range and the occupancy ratio threshold value may be varied in accordance with the temperature data of the panel thermistor 83, i.e., the liquid crystal temperature Tp. Therefore, the specific gradation range may be set in the case of the liquid crystal temperature Tp such as shown in FIG. 34, for example.

Figure 38:
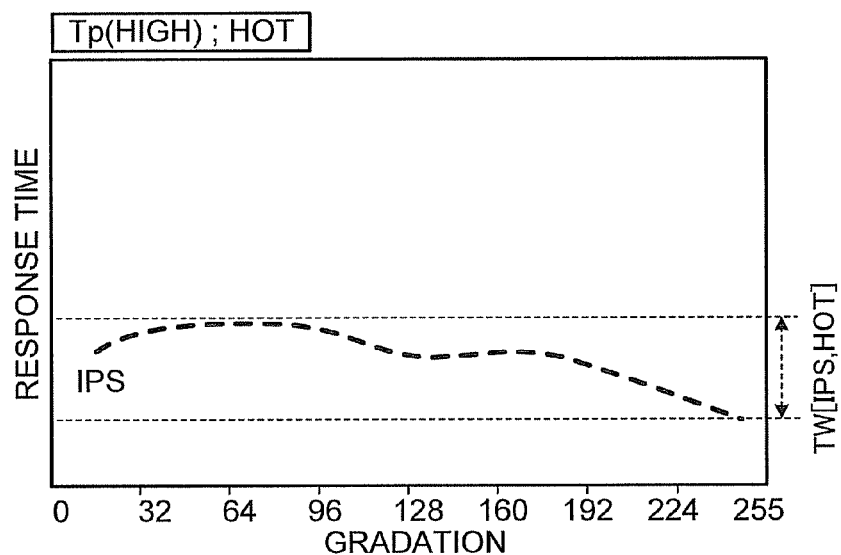
FIG. 38 is a graph showing the relationship between the gradation value and the response time of the liquid crystal molecules (where the liquid crystal temperature is a relatively high temperature with IPS mode liquid crystal)
Figure 39:
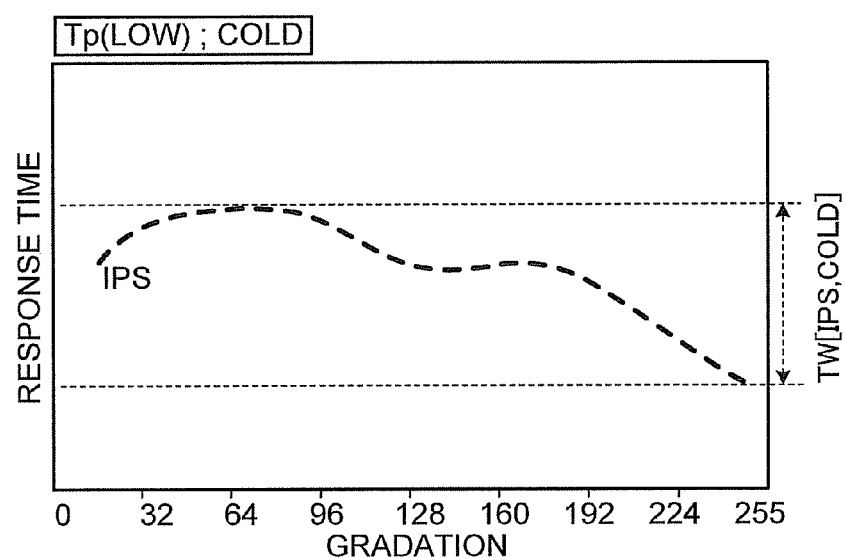
FIG. 39 is a graph showing the relationship between the gradation value and the response time of the liquid crystal molecules (where the liquid crystal temperature is a relatively low temperature with IPS mode liquid crystal)

With IPS mode liquid crystal 61, the difference TW between the maximum and minimum values of the response time is relatively small both when, as shown in FIGS. 38 and 39, the liquid crystal temperature Tp is high (see FIG. 38) and low (see FIG. 39). (FIGS. 38 and 39 show the response time at which the liquid crystal molecules 61M tilt when the gradation is varied from the $0^{th}$ gradation to another gradation in the same manner as FIGS. 34 and 35). Essentially, FIGS. 38 and 39 have flatter graph lines than, e.g., FIG. 35.

In other words, the difference in response time that accompanies gradation variation at the high and low liquid crystal temperature Tp is relatively small. Accordingly, the setting of the specific gradation range in the image may be carried out and the duty is furthermore not required to be varied in accordance with the occupancy ratio of the specific range. However, in some cases, the duty may be varied in order to conform to the picture signal adaptation function.

(Combination of Various Functions)

The above-described FRC processing function, the viewing mode setting function, the environment adaptation function, and the picture signal adaptation function may operate in various combinations. The duty may be varied even in such cases.

Figure 40:
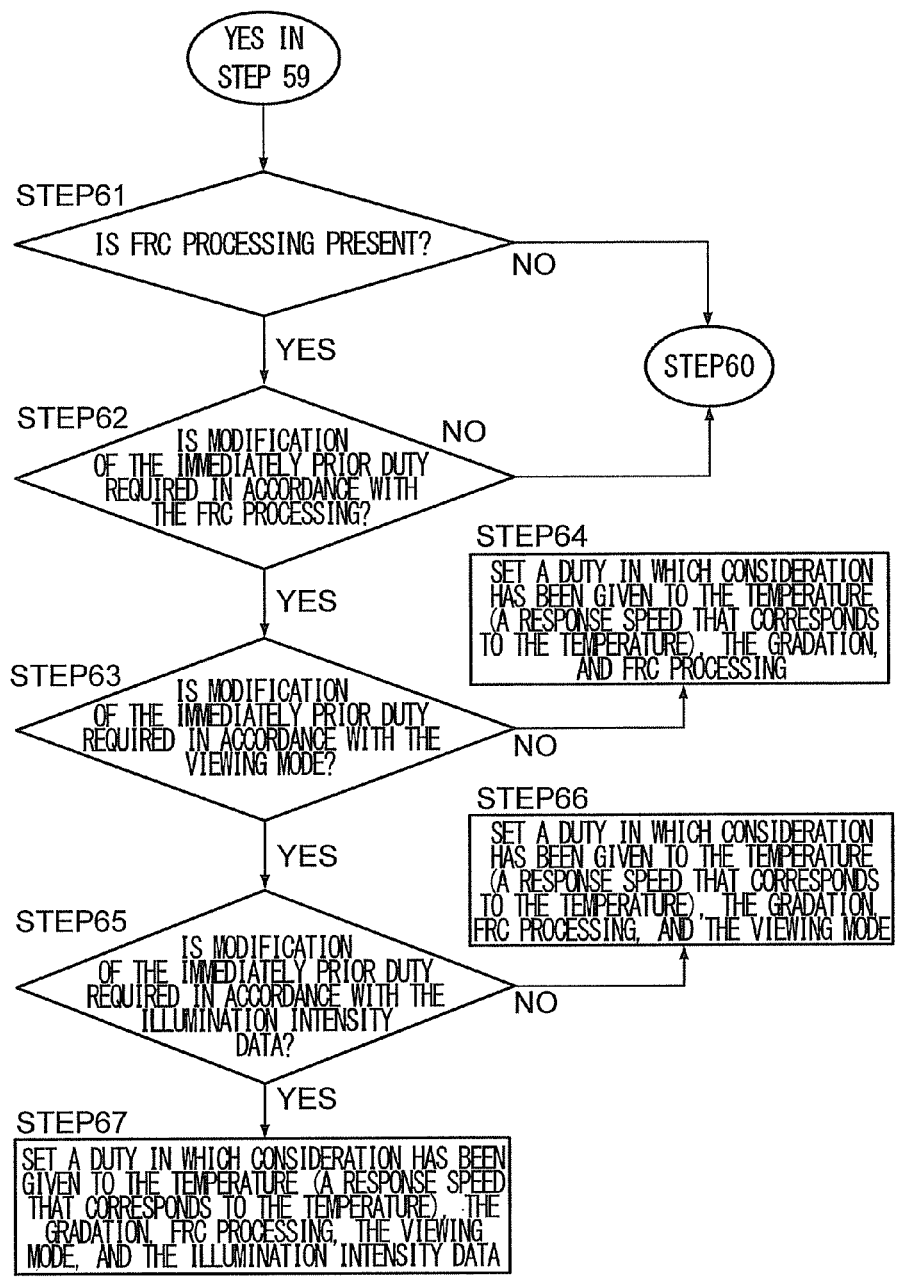
FIG. 40 is a flowchart of a case where the duty of the PWM light modulation signal is set with consideration given to various functions.

For example, the duty setting section 14 may judge the presence of FRC processing (STEP 61), as shown in the flowchart of FIG. 40, after Yes in STEP 59, in the case that the duty is varied so as to adapt to the picture signal adaptation function, as shown in the flowchart of FIG. 36. In the case that FRC processing is not being carried out (No in STEP 61), the duty setting section 14 sets a duty in which consideration has been given to the gradation and the response speed Vr that corresponds to the liquid crystal temperature Tp in STEP 60 (STEP 60).

On the other hand, when FRC processing is present, the duty setting section 14 judges whether the immediately prior duty requires modification in accordance with FRC processing (STEP 62). In the case that the duty setting section 14 has judged that the immediately prior duty does not require modification (No in STEP 62), the duty setting section 14 sets a duty in which consideration has been given to the gradation and the response speed Vr that corresponds to the liquid crystal temperature Tp in STEP 60 (STEP 60).

Conversely, in the case that the duty setting section 14 has judged that the immediately prior duty requires modification (Yes in STEP 62), the duty setting section 14 subsequently judges (STEP 63) whether the immediately prior duty requires modification in accordance with the viewing mode (e.g., the video level). In the case that the duty setting section 14 has judged that the immediately prior duty does not require modification (No in STEP 63), the duty setting section 14 sets a duty in which consideration has been given to the gradation, FRC processing, and the response speed Vr that corresponds to the liquid crystal temperature Tp (STEP 64).

On the other hand, in the case that the duty setting section 14 has judged that the immediately prior duty requires modification (Yes in STEP 63), the duty setting section 14 judges whether the immediately prior duty requires modification in accordance with the illumination intensity data (STEP 65). In the case that the duty setting section 14 has judged that the immediately prior duty does not require modification (No in STEP 65), the duty setting section 14 sets a duty in which consideration has been given to the gradation, FRC processing, the viewing mode, and the response speed Vr that corresponds to the liquid crystal temperature Tp (STEP 66).

Conversely, in the case that the duty setting section 14 has judged that the immediately prior duty requires modification (Yes in STEP 65), the duty setting section 14 sets a duty in which consideration has been given to the gradation, FRC processing, the viewing mode, the illumination intensity data, and the response speed Vr that corresponds to the liquid crystal temperature Tp (STEP 67).

In other words, the duty setting section 14 varies the duty even in the case that the FRC processing function, the viewing mode setting function, the environment adaptation function, and the picture signal adaptation function operate in combination, as shown in the flowchart of FIG. 40 (the electric current value AM may be in accordance with the variation of the duty).

The order of the functions is not limited to the order of the picture signal adaptation function, the FRC processing function, the viewing mode setting function, and the environment adaptation function, as shown in the flowchart of FIGS. 36 and 40; these may be switched around. The number of combinations of functions is not limited to the four functions of the picture signal adaptation function, the FRC processing function, the viewing mode setting function, and the environment adaptation function; three or fewer may be used or five or more may be used if there are various other functions.

<Examples of the Numerical Values Related to the Duty of the PWM Light Modulation Signal>

In the description above, 50% and 100% were mainly given as examples of the numerical values of the duty. However, it is apparent that no limitation is imposed by these numerical values.

Figure 41:
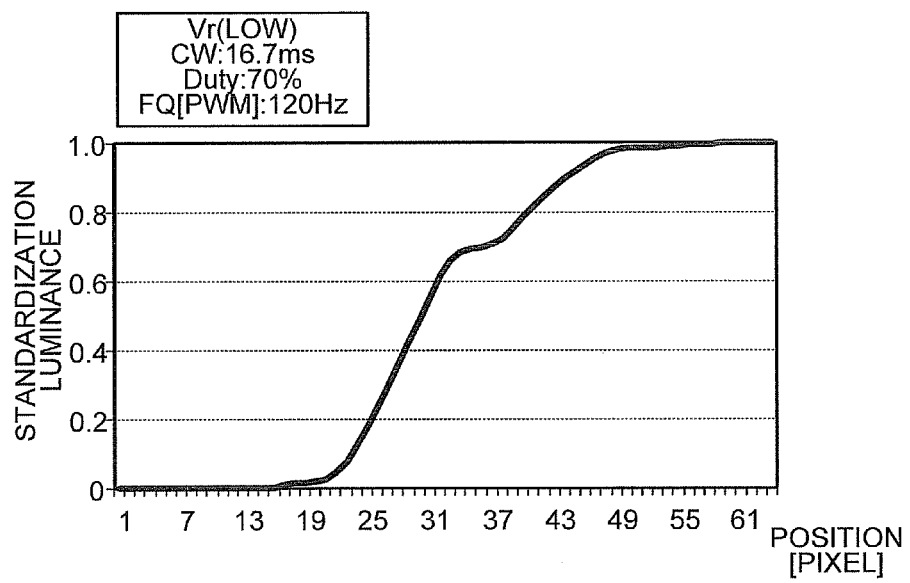
FIG. 41 is a graph showing the integral luminance in the vicinity of the boundary between a black image and a white image (the response speed of the liquid crystal is relatively low and the PWM light modulation signal is at 70% duty)
Figure 42:
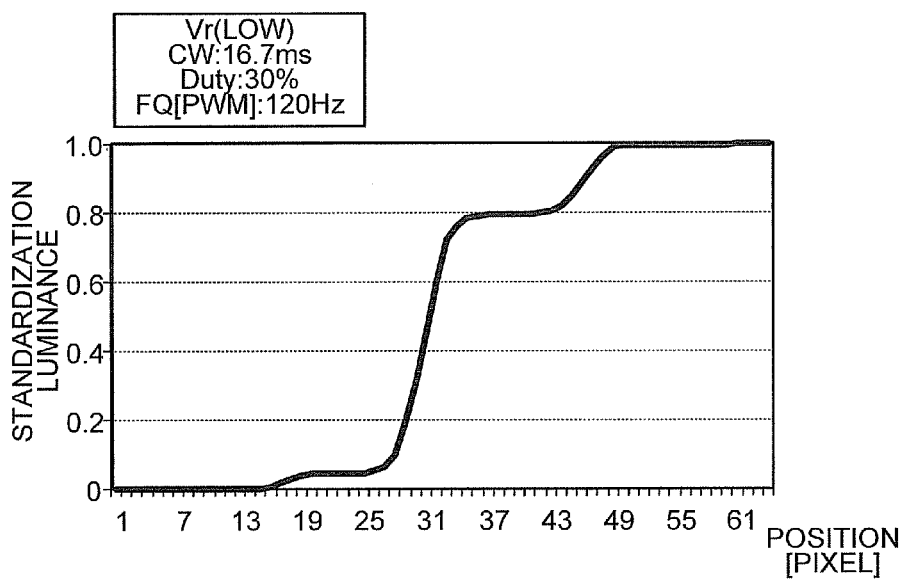
FIG. 42 is a graph showing the integral luminance in the vicinity of the boundary between a black image and a white image (the response speed of the liquid crystal is relatively low and the PWM light modulation signal is at 30% duty)
Figure 43:
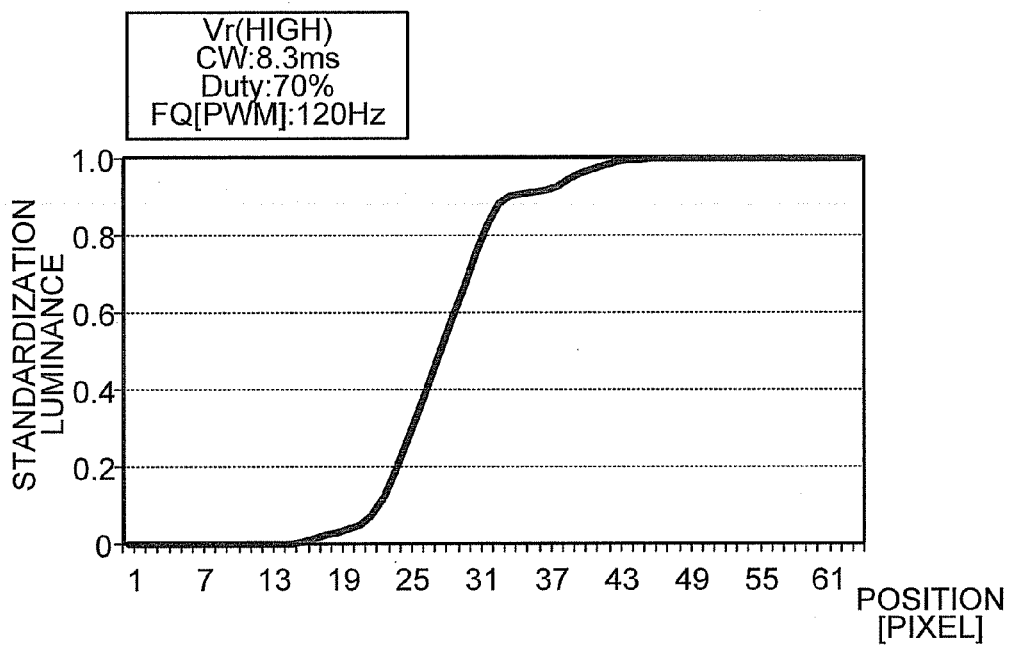
FIG. 43 is a graph showing the integral luminance in the vicinity of the boundary between a black image and a white image (the response speed of the liquid crystal is relatively high and the PWM light modulation signal is at 70% duty)
Figure 44:
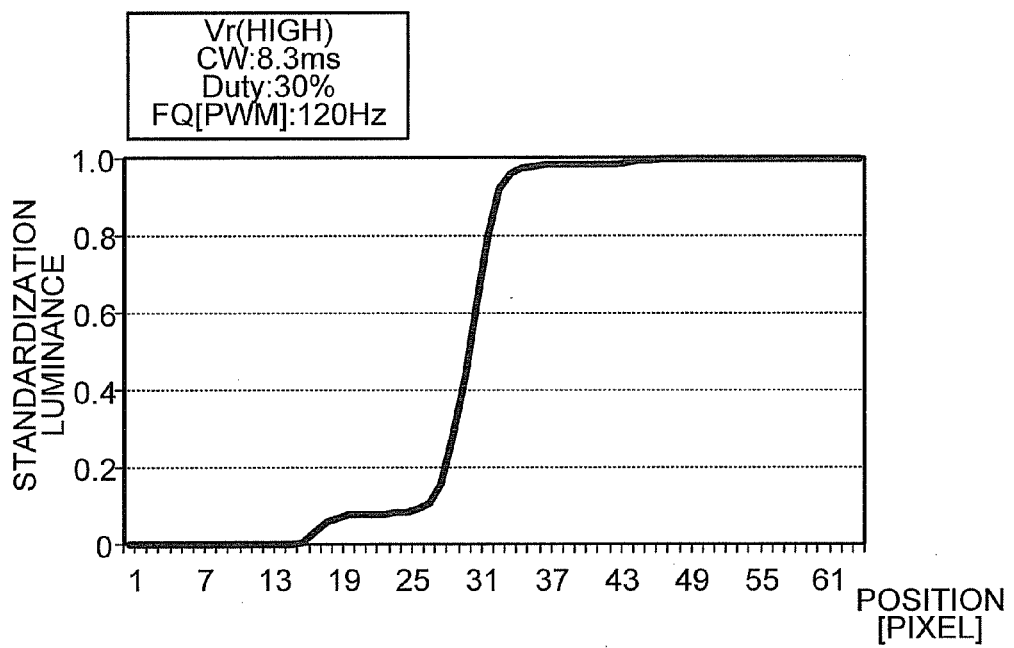
FIG. 44 is a graph showing the integral luminance in the vicinity of the boundary between a black image and a white image (the response speed of the liquid crystal is relatively high and the PWM fight modulation signal is at 30% duty)

For example, FIGS. 41 to 44 are similar diagrams to FIGS. 14 to 17 (therefore, the scroll speed is 32 pixel/16.7 ms). FIG. 41 shows the case in which the response speed Vr is relatively low and the duty is 70%, and FIG. 42 shows the case in which the response speed Vr is relatively low and the duty is 30%. On the other hand, FIG. 43 shows the case in which the response speed Vr is relatively high and the duty is 70%, and FIG. 44 shows the case in which the response speed Vr is relatively high and the duty is 30%. The following can be said in view of these diagrams and FIGS. 14 to 17.

When a comparison is made of FIGS. 41 and 14, a step in the graph line, which is not shown in FIG. 14, can be confirmed in FIG. 41. In other words, in FIG. 41, there are continuous pixels having different amounts of variation in the integral luminance (essentially, the slope of the graph line of FIG. 14). However, the difference in the amount of variation in the integral luminance is not as great as shown in FIG. 15. Therefore, ghost outlines do not occur.

Conversely, in FIG. 42, the difference in the amount of variation of the integral luminance is greater than that of FIG. 15. Therefore, ghost outlines occur to a greater degree than that of FIG. 15. Hence, in the case that the response speed Vr of the liquid crystal molecules 61M is relatively low, the duty is preferably greater than 50%, more preferably 70% or more, and most preferably 100%. With this configuration, ghost outlines are prevented.

When a comparison is made of FIGS. 43 and 16, the slope of the graph line of FIG. 43 is greater than the slope of the graph line in FIG. 16 (however, an afterimage is still visible). Furthermore, when a comparison is made of FIGS. 44 and 17, the slope of the graph line of FIG. 44 is greater than the slope of the graph line in FIG. 17.

In the case that the response speed Vr of the liquid crystal molecules 61M is relatively high, it is apparent from the graphs that the effect of black insertion is dramatically demonstrated as the duty is reduced (e.g., the sharpness or the like of the image quality is improved). In other words, in the case that the response speed Vr of the liquid crystal molecules 61M is relatively high, the duty is preferably 50% or less, and more preferably 30% or less.

Embodiment 2

Embodiment 2 will be described. The same reference numerals are used for the members having the same function as the members used in embodiment 1, and a description thereof is omitted.

In embodiment 1, the duty of the PWM light modulation signal, or the duty and the electric current value of the PWM light modulation signal were modified in various ways to improve image quality. It is possible to improve the image quality using other than such control. For example, the image quality can be improved by making variations in the drive frequency FQ[PWM] of the PWM light modulation signal. In view thereof, a liquid crystal display device 90 for carrying out such control is described below.

<Liquid Crystal Display Device>

Figure 45:
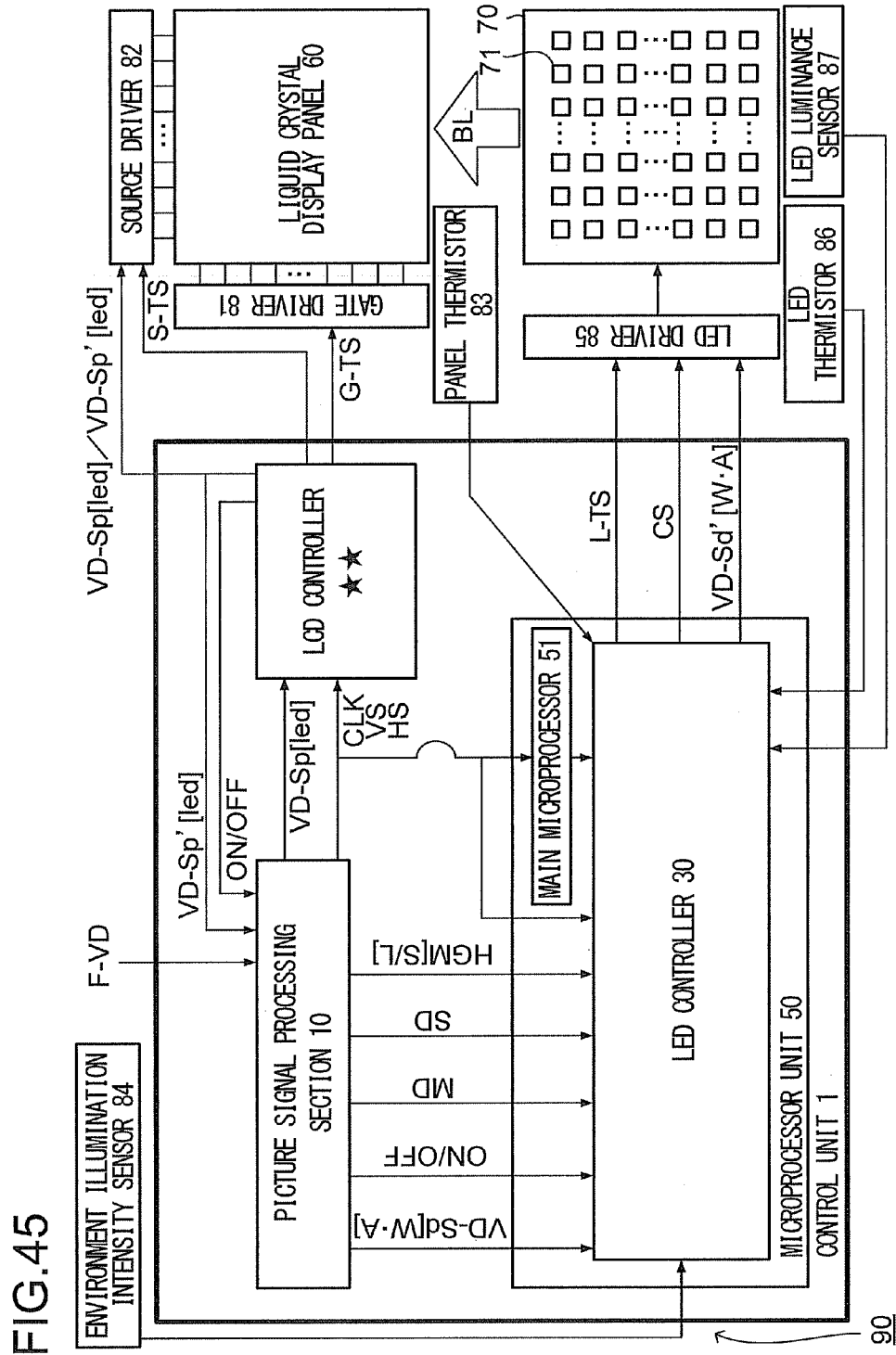
FIG. 45 is a block diagram of the liquid crystal display device.
Figure 46:
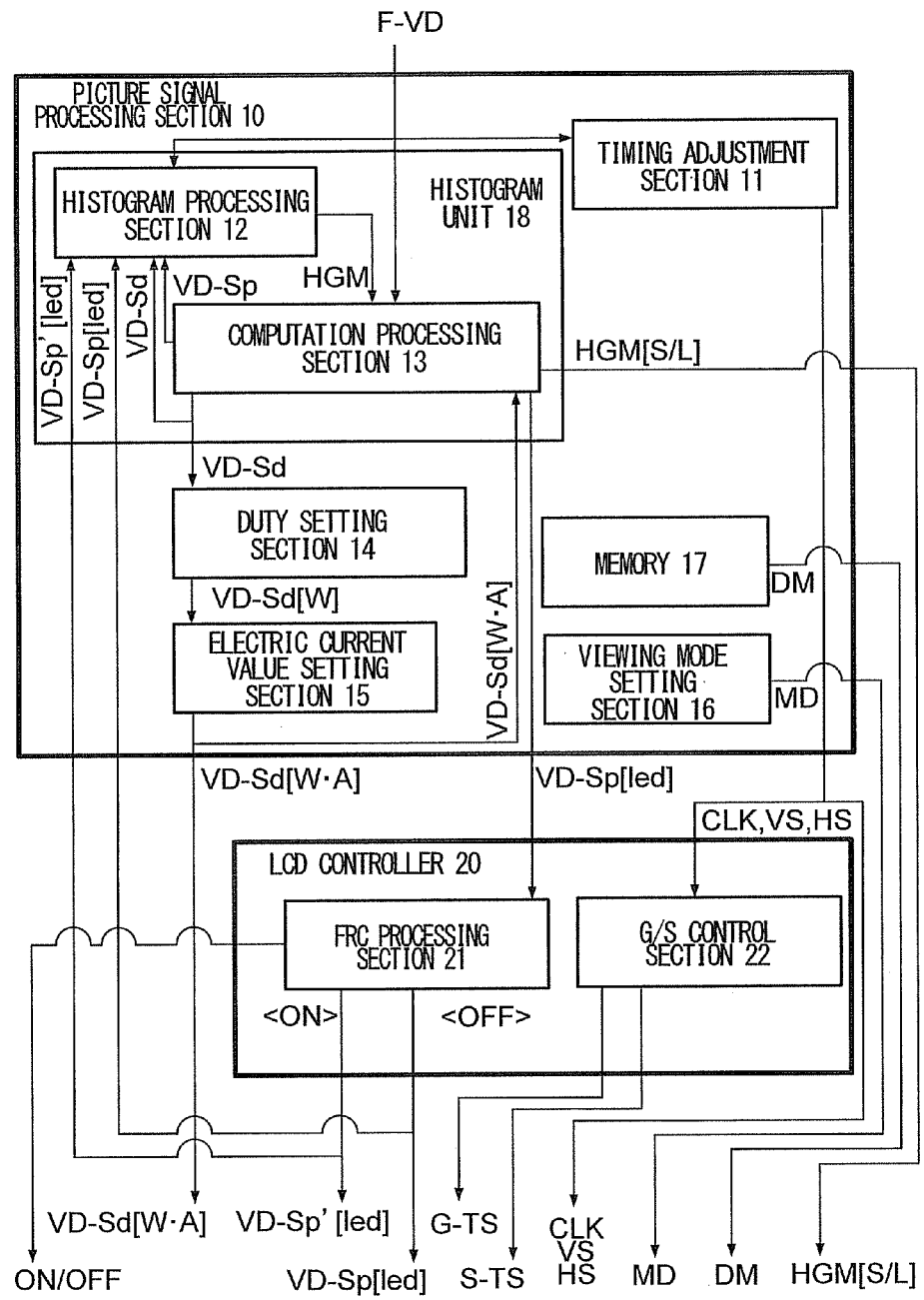
FIG. 46 is a block diagram in which a portion of the block diagram of the liquid crystal display device has been extracted and shown in greater detail.
Figure 47:
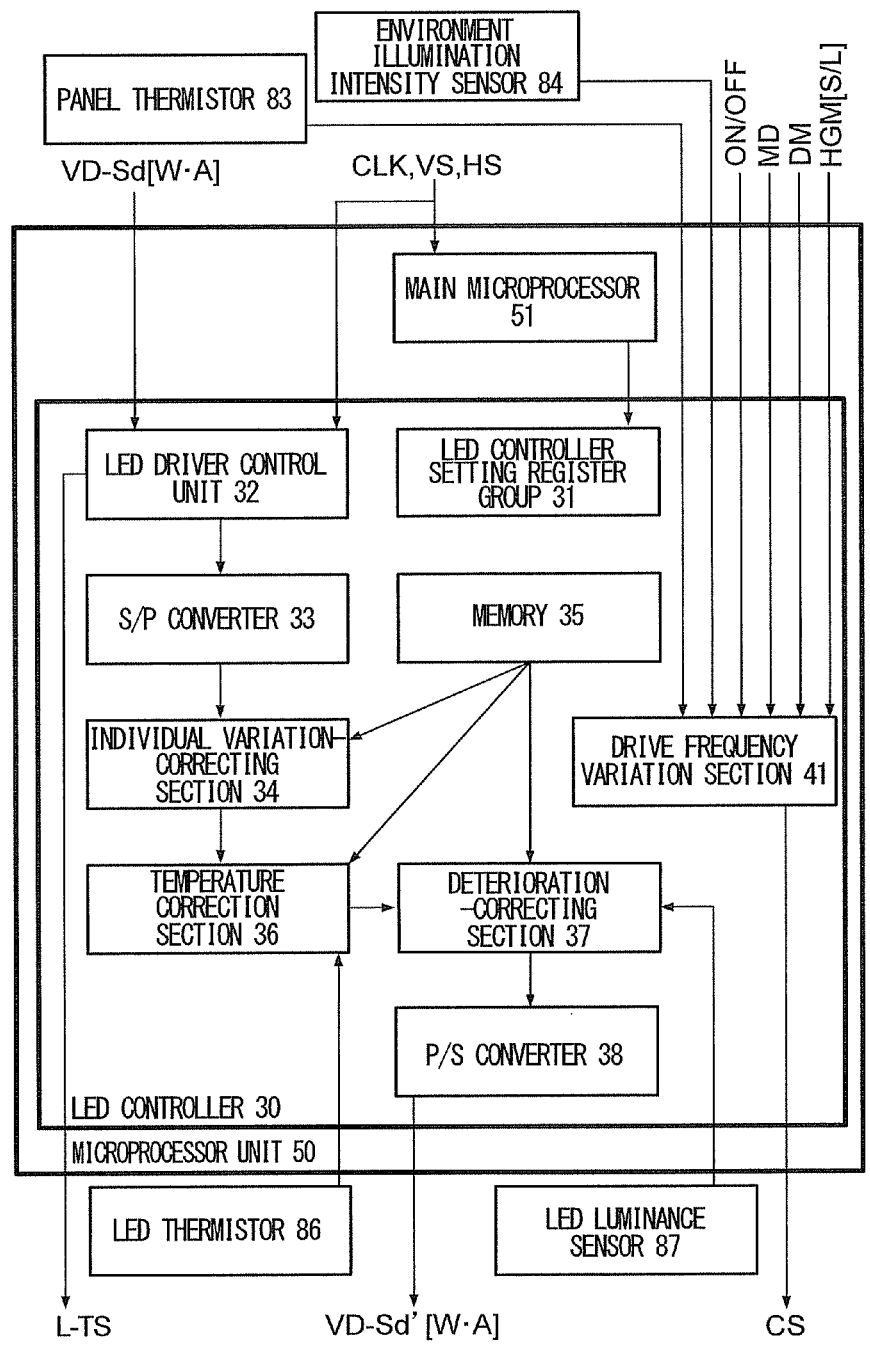
FIG. 47 is a block diagram in which a portion of the block diagram of the liquid crystal display device has been extracted and shown in greater detail.

FIGS. 45 to 47 are block diagrams showing various members related to the liquid crystal display device 90 (FIGS. 46 and 47 are block diagrams in which a portion of the FIG. 45 has been extracted and shown in greater detail). One difference between the liquid crystal display device 90 in embodiment 1 and the liquid crystal display device 90 in embodiment 2 is that a setting signal CS for setting the drive frequency (drive frequency FQ[PWM] of the PWM light modulation signal) of the LEDs 71 is sent from the LED controller 30 to the LED driver 85 (see FIGS. 45 and 47).

The histogram data HGM (HGM[S]/HGM[L]) of the computation processing section 13, the various data stored in the memory 17 (memory data DM), the mode description signal MD that describes the type of viewing mode of the viewing mode setting section 16, the temperature data of the panel thermistor 83, and the illumination intensity data of the environment illumination intensity sensor 84 are not sent to the duty setting section 14, but are rather sent to the control unit 1 (more specifically, the LED controller 30), as shown in FIGS. 46 and 47. The signal (ON/OFF signal) indicating the presence of FRC processing from the FRC processing section 21 is sent to the LED controller 30.

More specifically, the histogram data HGM, the memory data DM, the mode description signal MD, the temperature data, the illumination intensity data, and the ON/OFF signals are sent to a drive frequency variation section 41 included in the LED controller 30. The drive frequency variation section 41 switches the drive frequency FQ[PWM] on the basis of the liquid crystal temperature Tp.

For example, in the case that the frame frequency of the liquid crystal display panel 60 is 120 Hz and the drive frequency FQ[PWM] of the PWM light modulation signal is also 120 Hz (where the duty is 50%), ghost outlines are more likely to occur the lower the liquid crystal temperature Tp is, as shown in FIG. 15. In view of the above, the duty setting section 14 performs control in embodiment 1 so as to increase the duty.

<Improvement in Image Quality Using the Drive Frequency of the PWM Light Modulation Signal for Controlling the Light Emission of the LEDs>

In the case of embodiment 2, the duty is not varied, and the drive frequency variation section 41 changes the drive frequency FQ[PWM] of the PWM light modulation signal to a frequency higher than the 120 Hz, e.g., 480 Hz. Consequently, light is supplied to the liquid crystal display panel 60 in continuous fashion so as to include fixed gaps in the response process time span CW (see FIG. 48B), even with a drive frequency FQ[PWM] of 480 Hz in the same manner as FIG. 48A (the same diagram as FIG. 13B), which corresponds to FIG. 15. The luminance value of the light thus supplied is less than the maximum luminance value.

Figure 48A:
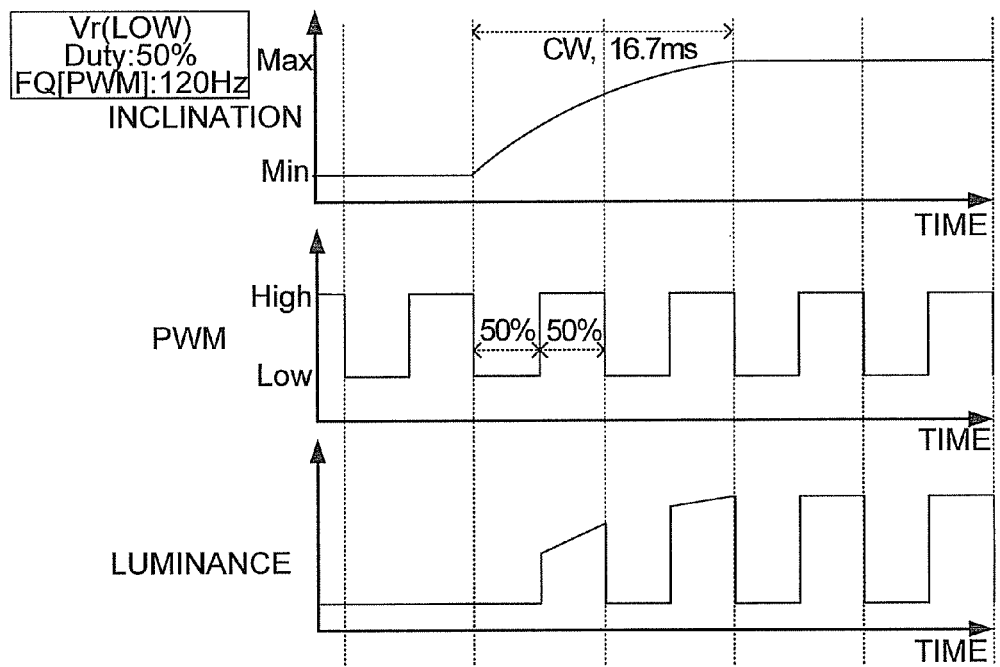
FIG. 48A is a graph showing, in relation to time, the amount of tilt of the liquid crystal molecules, the waveform of the PWM light modulation signal, and variation in the luminance in the case that the light of LEDs driven by a PWM light modulation signal at 50% duty is supplied to liquid crystal having relatively low response speed (where the drive frequency of the PWM light modulation signal is 120 Hz)
Figure 48B:
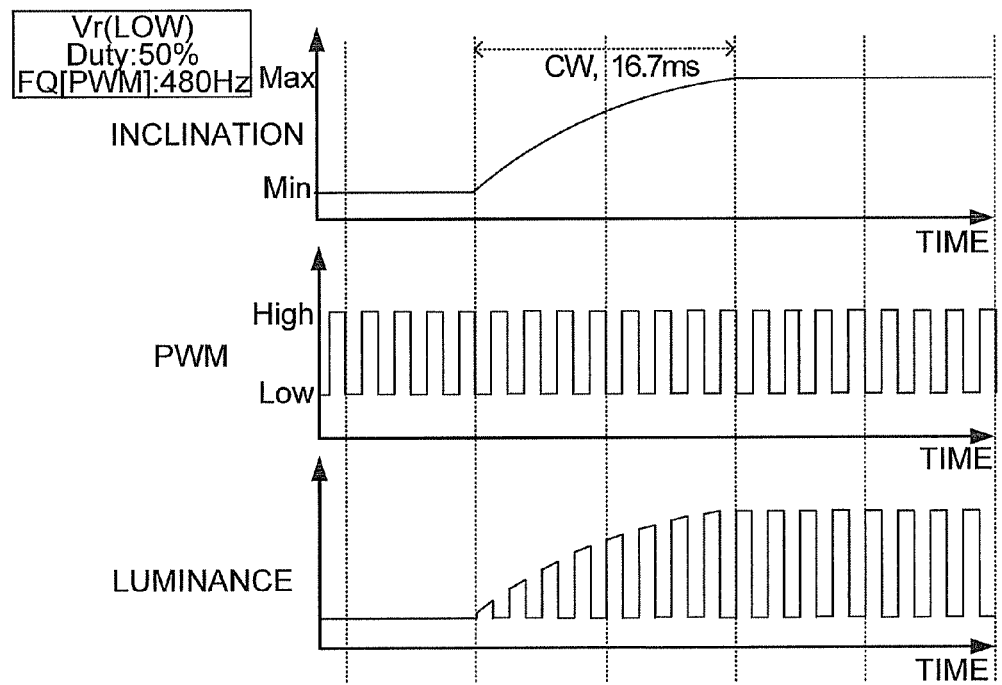
FIG. 48B is a graph showing, in relation to time, the amount of tilt of the liquid crystal molecules, the waveform of the PWM light modulation signal, and variation in the luminance in the case that the light of LEDs driven by a PWM light modulation signal at 50% duty is supplied to liquid crystal having relatively low response speed (where the drive frequency of the PWM light modulation signal is 480 Hz)

However, it is apparent from a comparison of FIGS. 48A and 48B that the number of high intervals of the PWM light modulation signal in the response process time span CW increases in the case of a drive frequency FQ[PWM] of 480 Hz in comparison with a drive frequency FQ[PWM] of 120 Hz.

Figure 49:
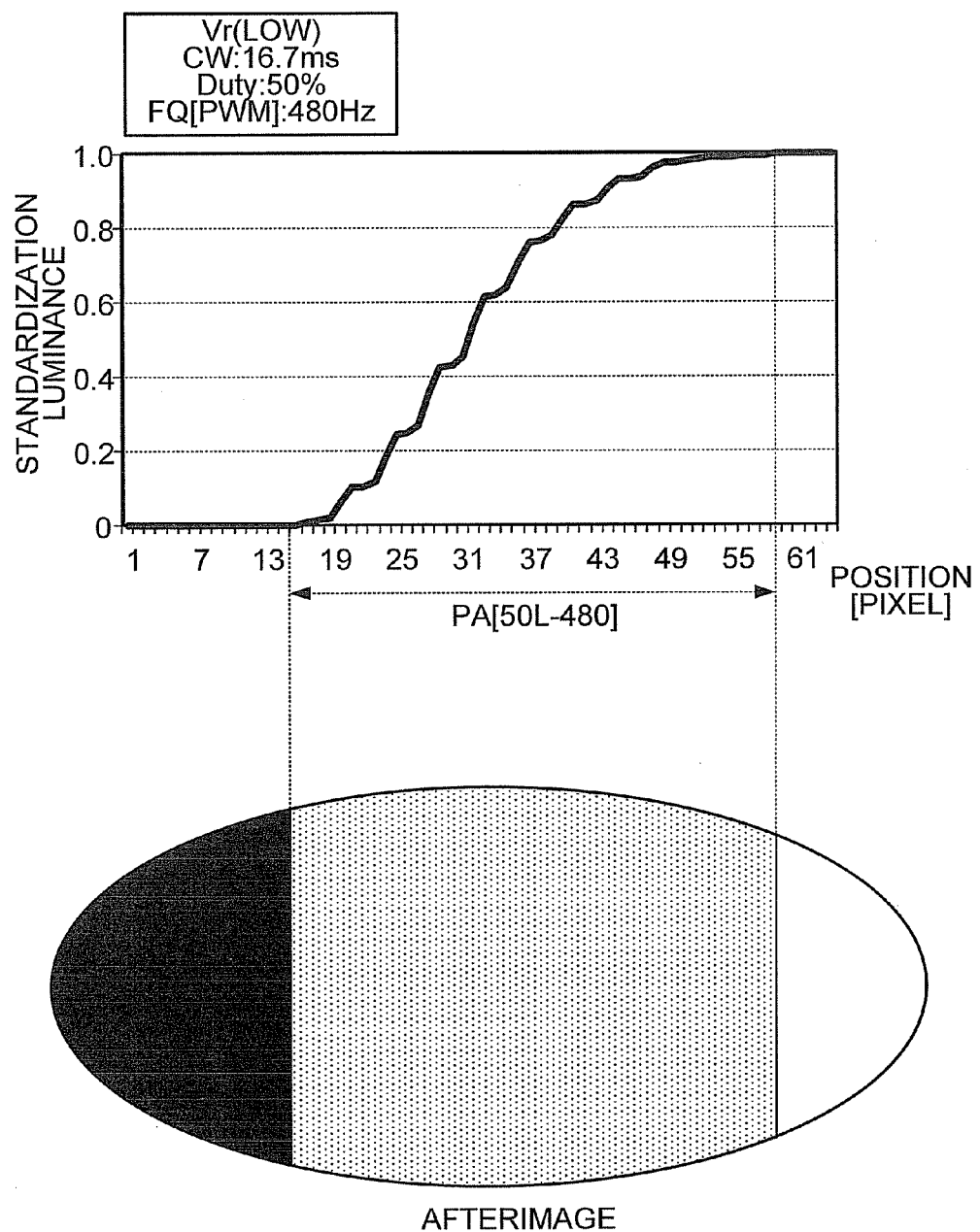
FIG. 49 is a graph showing the integral luminance in the vicinity of the boundary between the black image and the white image, and an image diagram of the boundary image (where the response speed of the liquid crystal is relatively low and the PWM light modulation signal is at 50% duty with a drive frequency of 480 Hz)

When the boundary between the black image and the white image moves as shown in FIGS. 12B to 12E, the integral luminance that corresponds to the vicinity of the boundary is shown in the graph of FIG. 49 (the scroll speed is 32 pixels/16.7 ms). In other words, there are pixels in the vicinity of the boundary that receive insufficient light for forming a perfectly white image.

Such pixels, which appear in a continuous manner in the pixel range PA [50L-480], are recognized to be problematic pixels (see image diagram). More specifically, switching from the black image to the white image is not carried out a high speed, and pixels in which the amount of variation of the integral luminance is different are included in the pixel range PA [50L-480] (essentially, the slope of the graph of FIG. 49).

However, the number of high intervals in the PWM light modulation signal in the response process time span CW is large in the case of FIG. 49, which is different from the case of FIG. 15. Consequently, the number of steps in the graph line of FIG. 49 due to the amount of variation in the integral luminance is greater than the number of steps in the graph line of FIG. 15. With this configuration, the graph line of FIG. 49 is artificially the same as the graph line of FIG. 14. Therefore, only afterimages occur rather than ghost outlines in the case of FIG. 49. In other words, the main source of ghost outlines which produce the most deterioration in image quality are prevented.

<<Variation in the Drive Frequency of the PWM Light Modulation Signal>>

In light of the above result of FIG. 49, the drive frequency FQ[PWM] of the PWM light modulation signal can be varied in accordance with the response speed Vr of the liquid crystal molecules 61M in the liquid crystal display device 90, thereby making it possible to reflect the response characteristics of the liquid crystal molecules 61M and to improve image quality shown in the liquid crystal display panel 60 (e.g., improve the level of sharpness and the like while reducing the occurrence of ghost outlines).

Figure 50:
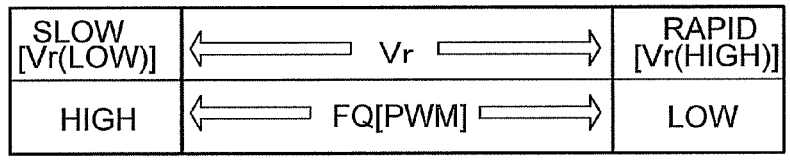
FIG. 50 is a chart showing the relationship between the response speed of the liquid crystal molecules and the drive frequency of the PWM light modulation signal.

In other words, the LEDs 71 can be driven at a relatively low drive frequency FQ[PWM] in the case that the response speed Vr of the liquid crystal molecules 61M is relatively high, as shown in the chart of FIG. 50. On the other hand, the LEDs 71 can be driven at a relatively high drive frequency FQ[PWM] in the case that the response speed Vr of the liquid crystal molecules 61M is relatively low.

As described in embodiment 1, the threshold value (response time data threshold value) that determines whether the response speed Vr is high or low is arbitrarily set. Therefore, the charts appearing in FIGS. 51 and 52 were created using arrows similar to those of FIGS. 20 and 21.

In other words, there is at least one arbitrary threshold value, a plurality of arbitrary ranges of response speeds Vr are set using the threshold value(s) as a boundary, and the drive frequency FQ[PWM] can be varied for each range. With this configuration, the response speed Vr of the liquid crystal molecules 61M is divided into stages, and improvement in image quality is ensured in accordance with the stages.

Figure 51:
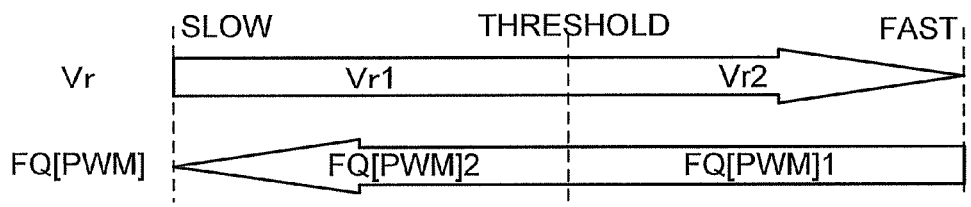
FIG. 51 is a chart showing arrows that indicate the relationship between data values of the response speed of the liquid crystal molecules, and data values of the drive frequency of the PWM light modulation signal.
Figure 52:
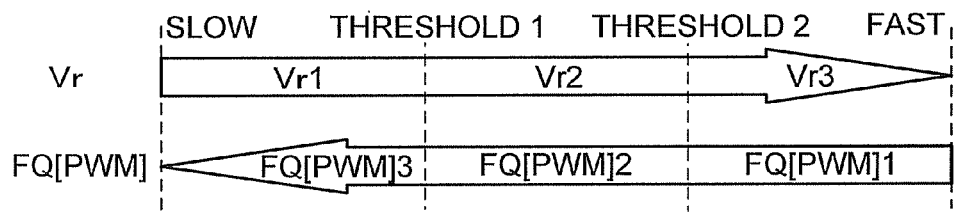
FIG. 52 is a chart showing arrows that indicate the relationship between data values of the response speed of the liquid crystal molecules, and data values of the drive frequency of the PWM light modulation signal.

In particular, the drive frequency FQ[PWM] can be varied for each range of the response speed Vr so that an inverse relationship is formed with the magnitude relationship related to the range of the plurality of response speeds Vr. For example, in the case that the numerical value of the response speed Vr is Vr1, which is a small value, the drive frequency FQ[PWM] becomes a FQ[PWM] 2, which is a large value; and in the case that the numerical value of the response speed Vr is Vr2, which is a large value, the drive frequency FQ[PWM] becomes a FQ[PWM] 1, which is a small value, as shown in FIG. 51 (the magnitude relationship of the data values of the response speeds Vr is Vr1<Vr2, and the magnitude relationship of the data values of the drive frequency FQ[PWM] is FQ[PWM] 1<FQ[PWM] 2).

Figure 53:
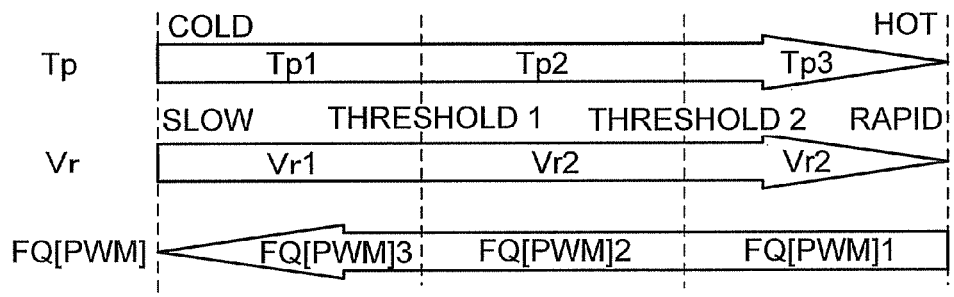
FIG. 53 is a chart showing arrows that indicate the relationship between data values of the liquid crystal temperature, data values of the response speed of the liquid crystal molecules, and data values of the drive frequency of the PWM light modulation signal.

One reason for fluctuations in the response speed Vr in the liquid crystal molecules 61M in a single liquid crystal display device 90 is the temperature Tp of the liquid crystal molecules 61M. In view of this fact, the chart of FIG. 53 shows the case in which the magnitude relationship of the data values of the temperature Tp is added to the chart of FIG. 52. In the liquid crystal display device 90, the control unit 1 operates, e.g., in the following manner in order to acquire the data value of the response speed Vr from the temperature Tp of the liquid crystal molecules 61M.

More specifically, the drive frequency variation section 41 of the LED controller 30 included in the control unit 1 acquires the temperature measurement data (temperature data) from the panel thermistor 83, as shown in FIG. 47. The drive frequency variation section 41 acquires one memory data DM stored in the memory 17.

Specifically, the memory data DM is a data table of the response speeds Vr of the liquid crystal molecules 61M that depend on the temperature of the liquid crystal 61 (liquid crystal temperature Tp). In other words, the drive frequency variation section 41 acquires the response speed Vr by correlating the temperature data of the panel thermistor 83 and the liquid crystal temperature Tp of the data table.

The drive frequency variation section 41 sets the drive frequency FQ[PWM] of the PWM light modulation signal that corresponds to the acquired response speed Vr. The method for setting the drive frequency FQ[PWM] is not particularly limited. A possible configuration is one in which, e.g., the drive frequency variation section 41 acquires the response speed Vr, then carries out internal processing to generate a setting signal CS, and sets the drive frequency FQ[PWM]; and, in another example, internally stores the data table of the drive frequency FQ[PWM] which has dependence on the response speed Vr, generates a setting signal CS using the data table, and sets the drive frequency FQ[PWM].

<<Other Factors>>

As described in embodiment 1, the liquid crystal display device 90 may include a picture signal adaptation function, an FRC processing function, a viewing mode setting function, and an environment adaptation function.

Figure 54:
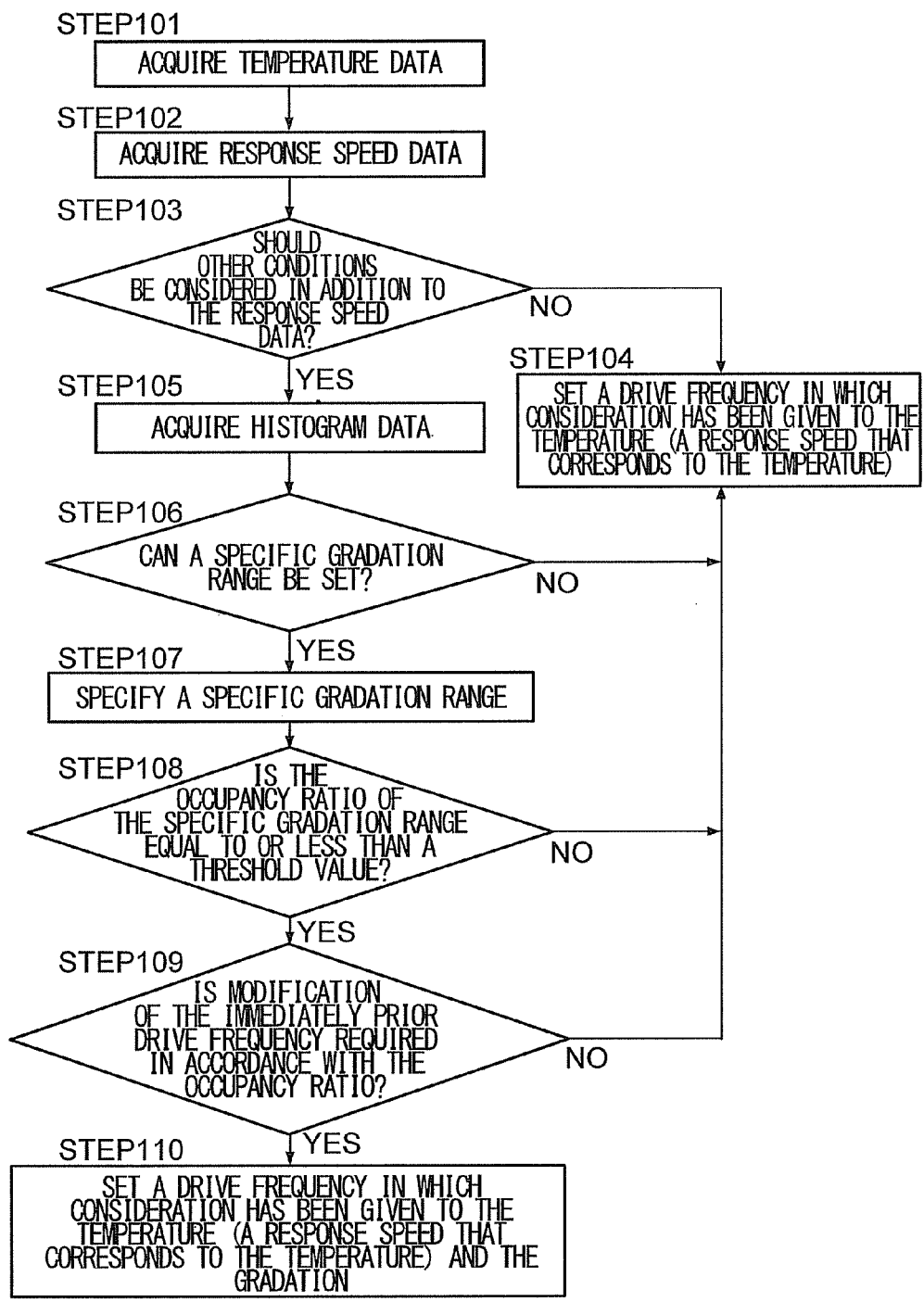
FIG. 54 flowchart of a case where the drive frequency of the PWM light modulation signal is set with consideration given to picture signal adaptation functions.

There are cases in which the drive frequency FQ[PWM] of the PWM light modulation signal is preferably varied in accordance with these various functions. For example, the drive frequency variation section 41 of the LED controller 30 acquires the temperature data of the panel thermistor 83 (STEP 101) and acquires the response speed Vr of the liquid crystal molecules 61M (STEP 102), as shown in the flowchart of FIG. 54.

In view of the above, the drive frequency variation section 41 judges the response speed Vr (response time data). Specifically, the drive frequency variation section 41 judges whether the drive frequency FQ[PWM] setting should be varied or not in accordance with whether various functions are in effect (STEP 103). For example, in the case that a black insertion effect can be obtained (No in STEP 103) when the response speed Vr is high and drive frequency FQ[PWM] is set to be low regardless of whether various functions are in effect, the drive frequency variation section 41 sets the drive frequency FQ[PWM] to, e.g., 120 Hz with consideration given to the response speed Vr that corresponds to the liquid crystal temperature Tp (STEP 104). With this configuration, the video performance and the like related to image quality is improved.

However, in the case that the drive frequency variation section 41 has judged that the setting of the drive frequency FQ[PWM] is preferably varied because various functions are in effect (Yes in STEP 103), the drive frequency variation section 41 sets the drive frequency FQ[PWM] with consideration given to the various functions. With this configuration, improvement in the image quality can be reliably ensured.

(Picture Signal Adaptation Function)

For example, the drive frequency variation section 41 may make judgments that correspond to the luminance or the like of the picture signal (the average signal level ASL or the like). Ordinarily, the on-time of the LEDs 71 is set to be short (essentially, a low duty) in the case that, e.g., the occupancy ratio of a low gradation range is high (essentially, the case of an image having relatively low gradation) in a single frame of an image. Conversely, the on-time of the LEDs 71 is set to be long (essentially, a high duty) in the case that, e.g., the occupancy ratio of a low gradation range is low (essentially, the case of an image having relatively high gradation) in a single frame of an image.

Consequently, in the case that the image has relatively high gradation, the liquid crystal molecules 61M of the response process time span CW are more prominent in terms of the light from the LEDs 71 (i.e., the backlight BL), and ghost outlines and afterimages or the like may occur as a result.

In view thereof, the drive frequency FQ[PWM] is varied in accordance with the occupancy ratio of the gradation range of the image, as shown in the flowchart of FIG. 54. More specifically, the drive frequency variation section 41 acquires the histogram data HGM from the computation processing section 13 (STEP 105). Next, the drive frequency variation section 41 acquires the gradation threshold value (gradation threshold value data) set in accordance with the liquid crystal temperature Tp stored in advance in the memory 17, and judges whether a specific gradation range can be set (STEP 106).

This is due to the fact that, as described in embodiment 1, there are cases in which the difference in response times accompanying gradation variation when the liquid crystal temperature Tp is at a high temperature is set to be the tolerance range; e.g., as shown in FIG. 34.

Thus, in the case that the liquid crystal temperature Tp is high, there is no requirement to set a specific gradation range in which the drive frequency FQ[PWM] is preferably varied using the histogram data HGM (No in STEP 106). Accordingly, in such a case, the drive frequency variation section 41 sets the drive frequency FQ[PWM] with consideration given only to the response speed Vr that corresponds to the liquid crystal temperature Tp (STEP 104).

Conversely, when the difference in the response times accompanying gradation variation when the liquid crystal temperature Tp is at a low temperature is set to be outside the tolerance range, the drive frequency variation section 41 varies the drive frequency FQ[PWM] using the histogram data HGM (Yes in STEP 106).

Specifically, the drive frequency variation section 41 sets a specific gradation range in which the drive frequency FQ[PWM] is preferably varied, from the histogram data HGM and the gradation threshold value set in accordance with the liquid crystal temperature Tp stored in the memory 17 (STEP 107). For example, in the case that the liquid crystal temperature Tp is low (e.g., about 20° C.) with MVA mode liquid crystal 61, the $0^{th}$ gradation to the $128^{th}$ gradation is set as the specific gradation range, as shown in FIG. 35.

The drive frequency variation section 41 furthermore acquires the occupancy ratio in the image having the specific gradation range (a single-frame image), and makes a comparison of the occupancy ratio and the threshold value related to the occupancy ratio (occupancy ratio threshold value; e.g., 50%) of the specific gradation range stored in the memory 17 (STEP 108).

In the case that the occupancy ratio is not at or less than the threshold value (essentially, the case in which the occupancy ratio is greater than the occupancy ratio threshold value; No in STEP 108), the image can be said to have low gradation and contain a large quantity of specific gradation ranges from, e.g., the $0^{th}$ gradation to the $128^{th}$ gradation. Consequently, the duty of the PWM light modulation signal in relation to the low-gradation image is less than the duty of the PWM light modulation signal in relation to a high-gradation image.

Accordingly, the liquid crystal molecules 61M in the response process time span CW are less likely to become more prominent in terms of the light from the LEDs 71, and ghost outlines and afterimages or the like are less likely to occur as a result. In view thereof, the drive frequency FQ[PWM], in which consideration has been given only to the response speed Vr that corresponds to the liquid crystal temperature Tp, is set, e.g., to 120 Hz by the drive frequency variation section 41 (STEP 104).

Conversely, in the case that the occupancy ratio is at or less than the threshold value (Yes in STEP 108), the image can be said to have high gradation and contain only a small quantity of specific gradation ranges from, e.g., the $0^{th}$ gradation to the $128^{th}$ gradation. Hence, the drive frequency variation section 41 judges whether the immediately prior drive frequency FQ[PWM] requires modification in accordance with the occupancy ratio (STEP 109). This is due to the fact that there are cases in which the immediately prior drive frequency FQ[PWM], i.e., the drive frequency FQ[PWM] set in STEP 104 does not vary from the drive frequency FQ[PWM] in the case that the occupancy ratio is high (essentially, the case of an image having low gradation).

In the case that the drive frequency variation section 41 judges that the immediately prior drive frequency FQ[PWM] requires modification (Yes in STEP 109), the drive frequency variation section 41 sets a drive frequency FQ[PWM] in which consideration has been given to the gradation (essentially, the histogram data HGM) and the response speed Vr that corresponds to the liquid crystal temperature Tp (STEP 110).

For example, the drive frequency variation section 41 in an MVA mode liquid crystal display device 90 sets the drive frequency FQ[PWM] to, e.g., 480 Hz in the case that an image having relatively high gradation is displayed on the liquid crystal display panel 60 (the chart of FIG. 55 shows how the magnitude of the drive frequency FQ[PWM] tends to correspond to the magnitude relationship of the occupancy ratio). With this configuration, the occurrence of ghost outlines is prevented even if the duty is higher than in a low-gradation image because the image is of high gradation.

On the other hand, in the case that the drive frequency variation section 41 has judged that the immediately prior drive frequency FQ[PWM] does not require modification (No in STEP 109), the drive frequency variation section 41 sets a drive frequency FQ[PWM] in which consideration has been given only to the response speed Vr that corresponds to the liquid crystal temperature Tp (STEP 104).

In other words, in the control unit 1, the histogram unit 18 generates a histogram data HGM that shows the frequency distribution of the gradation by forming the picture signal into a histogram. The control unit 1 furthermore divides the entire gradation of the histogram data HGM and judges whether the occupancy ratio in at least one specific gradation range among the divided gradation ranges exceeds or is equal to or less than an occupancy ratio threshold value.

The drive frequency FQ[PWM] in a case where the occupancy ratio exceeds the occupancy ratio threshold value is made less than the drive frequency FQ[PWM] in a case where the occupancy ratio is equal to or less than the occupancy ratio threshold value; and the drive frequency FQ[PWM] in a case where the occupancy ratio is equal to or less than the occupancy ratio threshold value is made greater than the drive frequency FQ[PWM] in a case where the occupancy ratio exceeds the occupancy ratio threshold value.

The above-described specific gradation range from the 0$^{th}$ gradation to the 128$^{th}$ gradation and the occupancy ratio threshold value of 50% of the occupancy ratio of the specific gradation range at a liquid crystal temperature Tp of about 20° C. in MVA mode liquid crystal 61 are merely examples, in the same manner as embodiment 1 (there may be a plurality of specific gradation ranges). The drive frequencies FQ[PWM] 480 Hz and 120 Hz described above are merely examples.

In the case of IPS mode liquid crystal 61, the specific gradation range in the image may be carried out and the drive frequency FQ[PWM] may be varied in accordance with the occupancy ratio of the specific gradation range in the same manner as embodiment 1, as shown in FIGS. 38 and 39. However, depending on the case, the drive frequency FQ[PWM] may be varied so as to conform to the picture signal adaptation function.

(FRC Processing Function)

For example, the drive frequency variation section 41 may judge whether FRC processing is present (STEP 125), as shown in the flowchart of FIG. 56 (STEPS 101 to 104 are the same as described above). Specifically, the drive frequency variation section 41 receives a signal (ON/OFF signal) which shows the presence of FRC processing from the FRC processing section 21 of the LCD controller 20.

In the case that FRC processing is being carried out (No in STEP 125), the picture variation between frames becomes relatively more detailed, and the tilt of the liquid crystal molecules 61M in the response process time span CW is less likely to be prominent. Accordingly, the drive frequency variation section 41 sets the same drive frequency FQ[PWM] as the drive frequency FQ[PWM] in which consideration has been given to response speed Vr that corresponds to the liquid crystal temperature Tp in order to enhance video performance (STEP 104).

Conversely, in the case that FRC processing is not being carried out (Yes in STEP 125), the drive frequency variation section 41 judges whether the immediately prior drive frequency FQ[PWM] requires modification in accordance with the FRC processing (STEP 126). This is due to the fact that there are cases in which the immediately prior drive frequency FQ[PWM], i.e., the drive frequency FQ[PWM] set in STEP 104, does not vary from the drive frequency FQ[PWM] in the case that FRC processing has been carried out.

In the case that the drive frequency variation section 41 has judged that the immediately prior drive frequency FQ[PWM] requires modification (Yes in STEP 126), the drive frequency variation section 41 sets a drive frequency FQ[PWM] in which consideration has been given to FRC processing and the response speed Vr that corresponds to the liquid crystal temperature Tp (STEP 127). For example, the drive frequency variation section 41 increases the drive frequency FQ[PWM] in the case that FRC processing is not present (the chart of FIG. 57 shows how the magnitude of the drive frequency FQ[PWM] tends to correspond to the presence of FRC processing). With this configuration, the occurrence of ghost outlines is prevented.

On the other hand, in the case that the drive frequency variation section 41 has judged that the immediately prior drive frequency FQ[PWM] does not require modification (No in STEP 126), the drive frequency variation section 41 sets a drive frequency FQ[PWM] in which consideration has been given only to the response speed Vr that corresponds to the liquid crystal temperature Tp (STEP 104).

In other words, the control unit 1 shown in FIG. 45 includes an FRC processing section 21 for carrying out frame rate control processing and the control unit 1 (more specifically, the drive frequency variation section 41) varies the drive frequency FQ[PWM] in accordance with the presence of FRC processing by the FRC processing section 21. The drive frequency FQ[PWM] in the case that FRC processing is present is less than the drive frequency FQ[PWM] of the case in which FRC processing is not present (see FIG. 57).

(Viewing Mode Setting Function)

The drive frequency variation section 41 may make judgments that correspond to the setting of the viewing mode. Specifically, the drive frequency variation section 41 receives a mode description signal MD that shows the type of viewing mode, e.g., a natural mode having a relatively low video level, from the viewing mode setting section 16 of the picture signal processing section 10.

Figure 58:
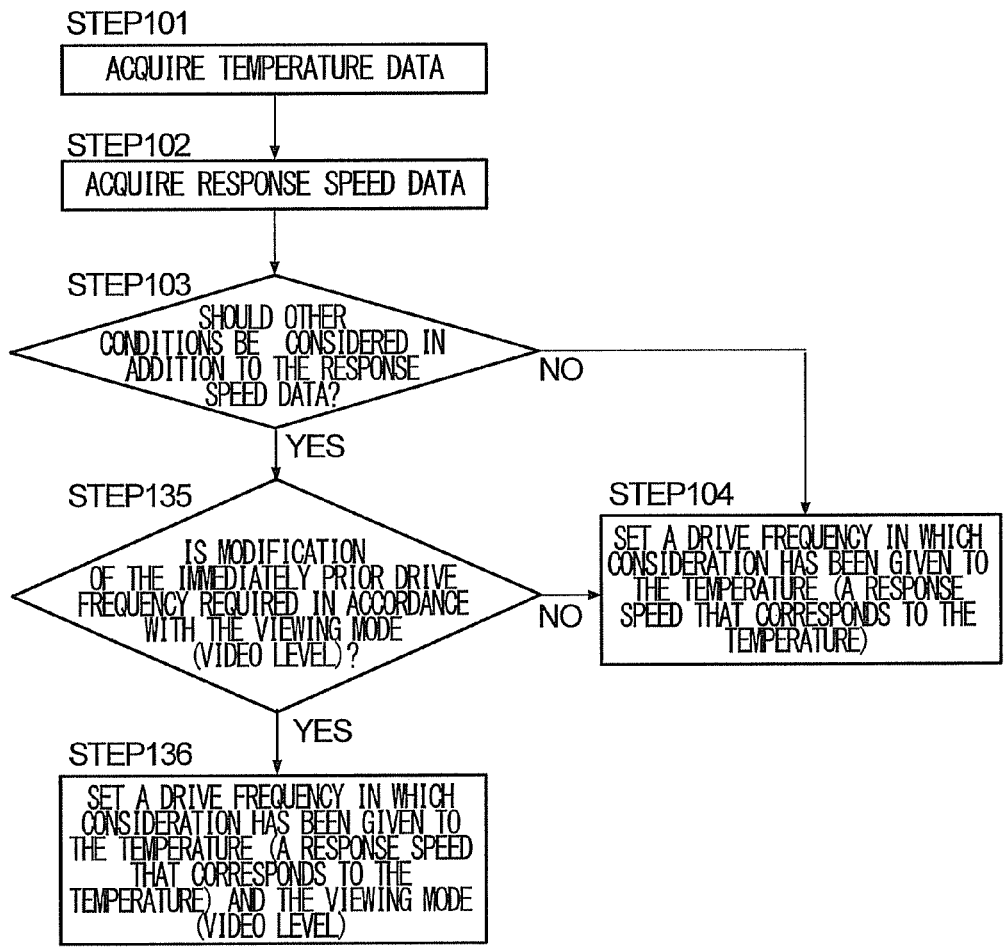
FIG. 58 is a flowchart of a case where the drive frequency of the PWM light modulation signal is set with consideration given to the viewing mode (modification of the video level)

The drive frequency variation section 41 judges whether the immediately prior drive frequency FQ[PWM] requires modification (STEP 135) in accordance with the video level, as shown in the flowchart of FIG. 58 (STEPS 101 to 104 are the same as described above). This due to the fact that there are cases in which the immediately prior drive frequency FQ[PWM], i.e., the drive frequency FQ[PWM] set in STEP 104, does not vary from the drive frequency FQ[PWM] in the case that the video level is low.

Figure 59:
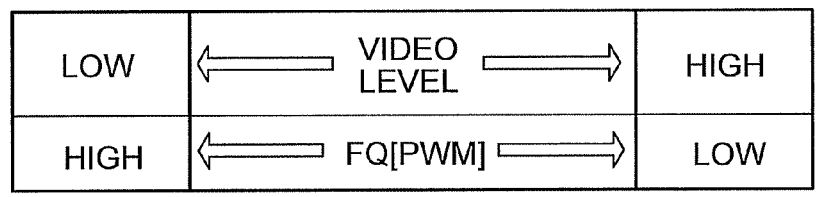
FIG. 59 is a chart showing the relationship between the video level and the drive frequency of the PWM light modulation signal.

In the case that the drive frequency variation section 41 has judged that the immediately prior drive frequency FQ[PWM] requires modification (Yes in STEP 135), the drive frequency variation section 41 sets a drive frequency FQ[PWM] in which consideration has been given to the video level and the response speed Vr that corresponds to the liquid crystal temperature Tp (STEP 136). For example, the drive frequency variation section 41 increases the drive frequency FQ[PWM] in the case that the natural mode has been set (the chart of FIG. 59 shows how the magnitude of the drive frequency FQ[PWM] tends to correspond to the magnitude relationship of the video level). With this configuration, the occurrence of ghost outlines is prevented.

On the other hand, in the case that the drive frequency variation section 41 has judged that the immediately prior drive frequency FQ[PWM] does not require modification (No in STEP 135), the drive frequency variation section 41 sets a drive frequency FQ[PWM] in which consideration has been given only to the response speed Vr that corresponds to the liquid crystal temperature Tp (STEP 104).

In other words, the control unit 1 includes a viewing mode setting section 16 for switching the viewing mode of the liquid crystal display panel 60, and in the case that the viewing mode setting section 16 has switched the viewing mode, the control unit 1 (more specifically, the drive frequency variation section 41) varies the drive frequency FQ[PWM] in accordance with the selected viewing mode.

An example of such variation of drive frequency FQ[PWM] is one in which the drive frequency FQ[PWM] is varied for each selected viewing mode (see FIG. 59) so as to be in an inverse relationship with the high-low relationship (the magnitude relationship) of the video level in a plurality of viewing modes, in the case that the viewing mode setting section 16 has set a high video level viewing mode and a low video level viewing mode in accordance with the video level of the picture data.

The drive frequency variation section 41 may make a judgment that corresponds to the setting of the viewing mode in which the contrast ratio is different. Specifically, the drive frequency variation section 41 receives a mode description signal MD that shows the type of viewing mode from the viewing mode setting section 16, e.g., a signal indicating a cinema mode having a relatively low contrast ratio.

The drive frequency variation section 41 judges whether the immediately prior drive frequency FQ[PWM] requires modification in accordance with the contrast ratio (STEP 145), as shown in the flowchart of FIG. 60 (STEPS 101 to 104 are the same as described above). This is due to the fact that there are cases in which the immediately prior drive frequency FQ[PWM]; i.e., the drive frequency FQ[PWM] set in STEP 104, does not vary from the drive frequency FQ[PWM] in the case that the contrast ratio is low.

In the case that the drive frequency variation section 41 has judged that the immediately prior drive frequency FQ[PWM] requires modification (Yes in STEP 145), the drive frequency variation section 41 sets a drive frequency FQ[PWM] in which consideration has been given to the contrast ratio and the response speed Vr that corresponds to the liquid crystal temperature Tp (STEP 146). For example, the drive frequency variation section 41 increases the drive frequency FQ[PWM] in the case that the cinema mode has been set (the chart of FIG. 61 shows how the magnitude of the drive frequency FQ[PWM] tends to correspond to the magnitude relationship of the contrast ratio). With this configuration, the occurrence of ghost outlines is prevented.

On the other hand, in the case that the drive frequency variation section 41 has judged that the immediately prior drive frequency FQ[PWM] does not require modification (No in STEP 145), the drive frequency variation section 41 sets a drive frequency FQ[PWM] in which consideration has been given only to the response speed Vr that corresponds to the liquid crystal temperature Tp (STEP 104).

In other words, in the case that the viewing mode setting section 16 has set a high contrast level viewing mode and a low contrast level viewing mode in accordance with the contrast level of the picture data, the drive frequency FQ[PWM] is varied for each selected viewing mode (see FIG. 61) so as to be in an inverse relationship with the high-low relationship (the magnitude relationship) of the contrast level in a plurality of viewing modes.

There are many types of viewing modes, and the drive frequency variation section 41 may set the drive frequency FQ[PWM] by combining various modes. For example, the drive frequency variation section 41 receives a mode description signal MD that shows the type of viewing mode, e.g., a signal indicating a natural mode having a relatively low video level and a cinema mode having a relatively low contrast ratio, from the viewing mode setting section 16.

Figure 62:
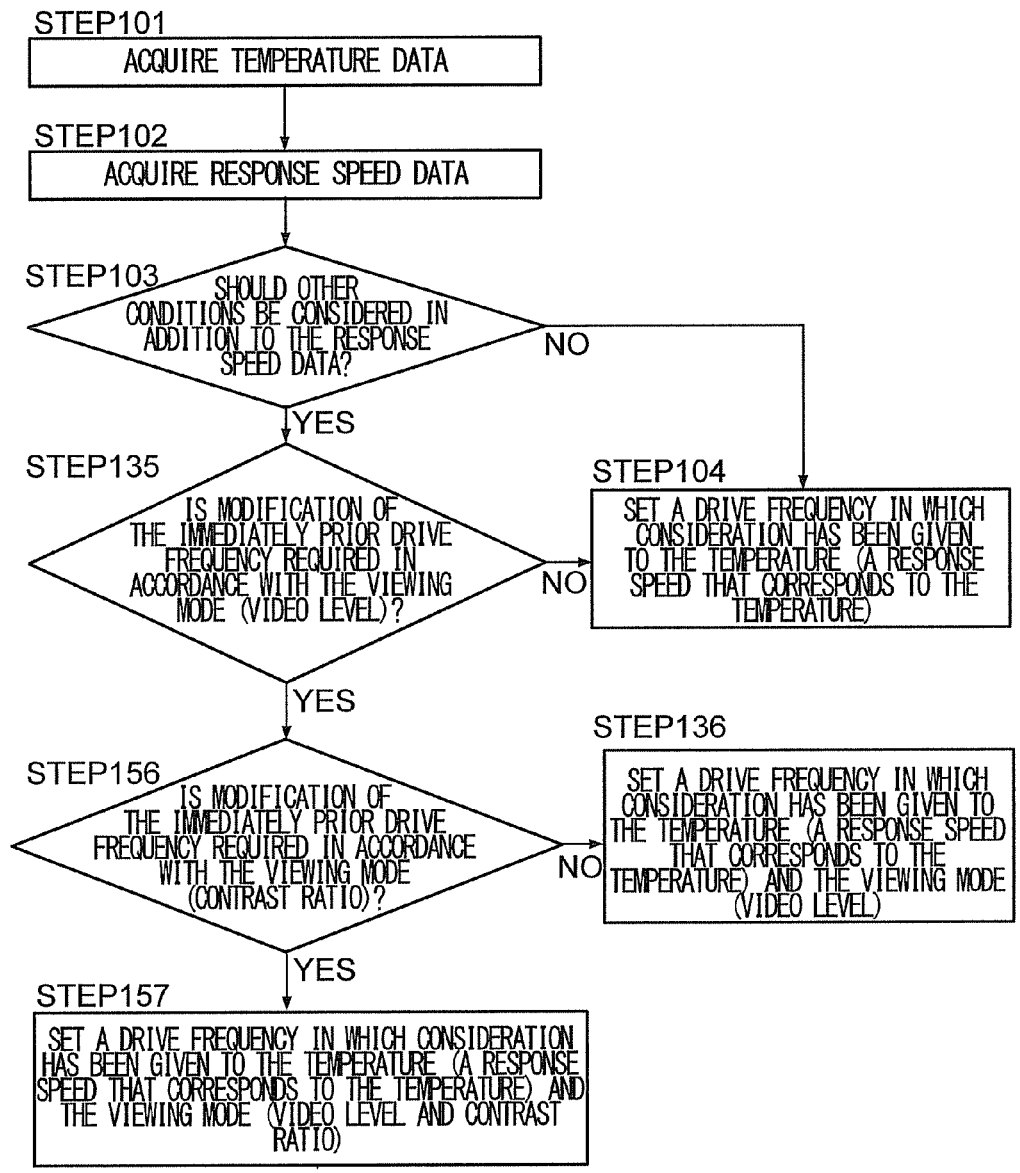
FIG. 62 is a flowchart of a case where the drive frequency of the PWM light modulation signal is set with consideration given to the viewing mode (the video level as well as the contrast ratio)

The drive frequency variation section 41 judges whether the immediately prior drive frequency FQ[PWM] requires modification in accordance with, e.g., the video level (STEP 135), as shown in the flowchart of FIG. 62 (STEPS 1 to 4 are the same as described above). In the case that the drive frequency variation section 41 has judged that the immediately prior drive frequency FQ[PWM] does not require modification (No in STEP 135), the drive frequency variation section 41 sets a drive frequency FQ[PWM] in which consideration is given only to the response speed Vr that corresponds to the liquid crystal temperature Tp (STEP 104).

On the other hand, in the case that the drive frequency variation section 41 has judged that the immediately prior drive frequency FQ[PWM] requires modification (Yes in STEP 135), the drive frequency variation section 41 then judges whether the immediately prior drive frequency FQ[PWM] requires modification in accordance with the contrast ratio (STEP 156). In the case that the drive frequency variation section 41 has judged that the immediately prior drive frequency FQ[PWM] requires modification (Yes in STEP 156), the drive frequency variation section 41 sets a drive frequency FQ[PWM] in which consideration has been given to the video level, the contrast ratio, and the response speed Vr that corresponds to the liquid crystal temperature Tp (STEP 157).

Conversely, in the case that the drive frequency variation section 41 has judged that the immediately prior drive frequency FQ[PWM] does not require modification (No in STEP 156), the drive frequency variation section 41 sets a drive frequency FQ[PWM] in which consideration has been given to the video level and the response speed Vr that corresponds to the liquid crystal temperature Tp (STEP 136).

In the flowchart of FIG. 62, consideration is given first to the video level and then to the contrast ratio, but this order may be different.

(Environment Adaptation Function)

The drive frequency variation section 41 may make judgments that correspond to the light level of the environment in which the liquid crystal molecules 61M are placed. Specifically, the drive frequency variation section 41 receives the illumination intensity data of the environment illumination intensity sensor 84 (essentially, the information used by the drive frequency variation section 41 to judge the light level of the location in which the liquid crystal display device 90 is placed is the illumination intensity measured by the environment illumination intensity sensor 84 for measuring the external illumination intensity).

Figures 63, 64:
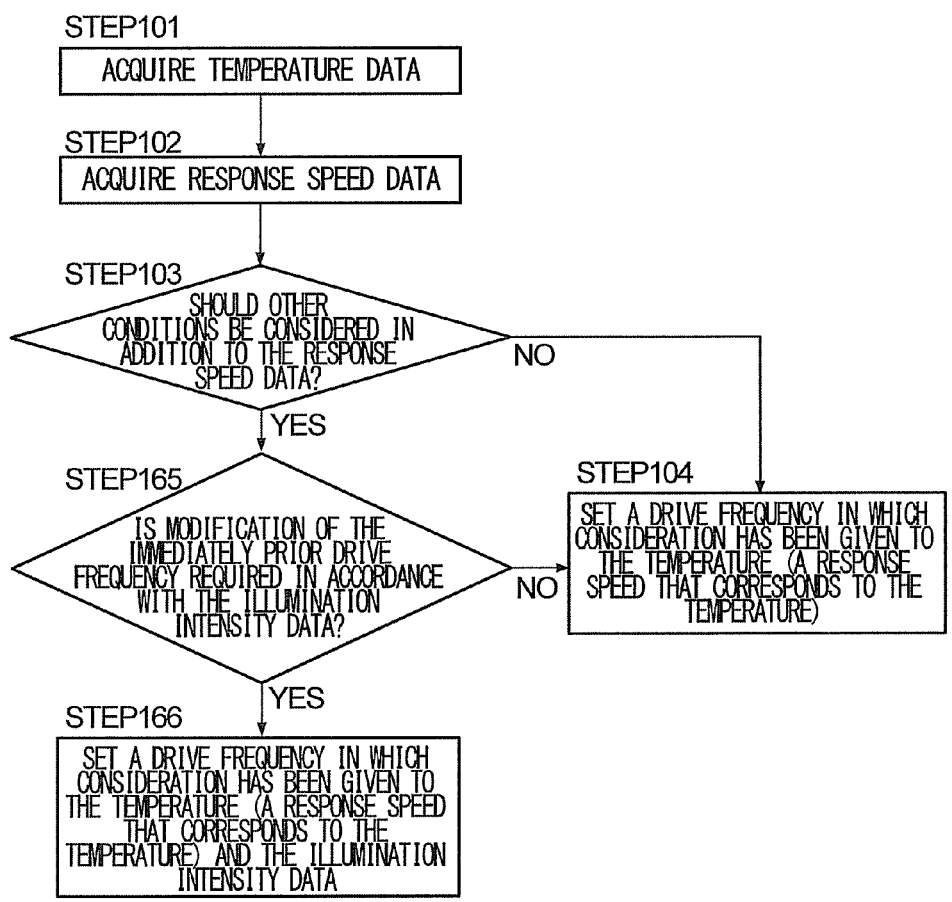
FIG. 63 is a flowchart of a case where the drive frequency of the PWM light modulation signal is set with consideration given to the environment adaptation function.
FIG. 64 is a chart showing the relationship between the illumination intensity data used by the environment adaptation function, and the drive frequency of the PWM light modulation signal.

The drive frequency variation section 41 judges whether the immediately prior drive frequency FQ[PWM] requires modification (STEP 165) in accordance with the illumination intensity data, as shown in the flowchart of FIG. 63 (STEPS 1 to 4 are the same as described above). This is due to the fact that the immediately prior drive frequency FQ[PWM], i.e., the drive frequency FQ[PWM] set in STEP 104 does not vary from the drive frequency FQ[PWM] in the case that the illumination intensity data is high (essentially, the case that the environment is relatively bright).

In the case that the drive frequency variation section 41 has judged that the immediately prior drive frequency FQ[PWM] requires modification (Yes in STEP 165), the drive frequency variation section 41 sets a drive frequency FQ[PWM] in which consideration has been given to the illumination intensity data and the response speed Vr that corresponds to the liquid crystal temperature Tp (STEP 166). For example, the drive frequency variation section 41 increases the drive frequency FQ[PWM] in the case that the liquid crystal display device 90 is placed in a relatively dark environment (the chart of FIG. 64 shows how the magnitude of the drive frequency FQ[PWM] tends to correspond to the magnitude relationship of the illumination intensity data). With this configuration, the occurrence of ghost outlines is prevented.

Conversely, in the case that the drive frequency variation section 41 has judged that the immediately prior drive frequency FQ[PWM] does not require modification (No in STEP 165), the drive frequency variation section 41 sets a drive frequency FQ[PWM] in which consideration has been given only to the response speed Vr that corresponds to the liquid crystal temperature Tp (STEP 104).

In other words, the control unit 1 shown in FIG. 45 acquires the external illumination intensity data, and varies the drive frequency FQ[PWM] in accordance with the illumination intensity data. The drive frequency FQ[PWM] is varied for each illumination intensity data range so as to form an inverse relationship with the magnitude relationship of the data values in a plurality of illumination intensity data ranges (see FIG. 64).

(Combination of Various Functions)

The above-described picture signal adaptation function, the FRC processing function, the viewing mode setting function, and the environment adaptation function may operate in various combinations. The drive frequency FQ[PWM] may be varied even in such cases.

Figure 65:
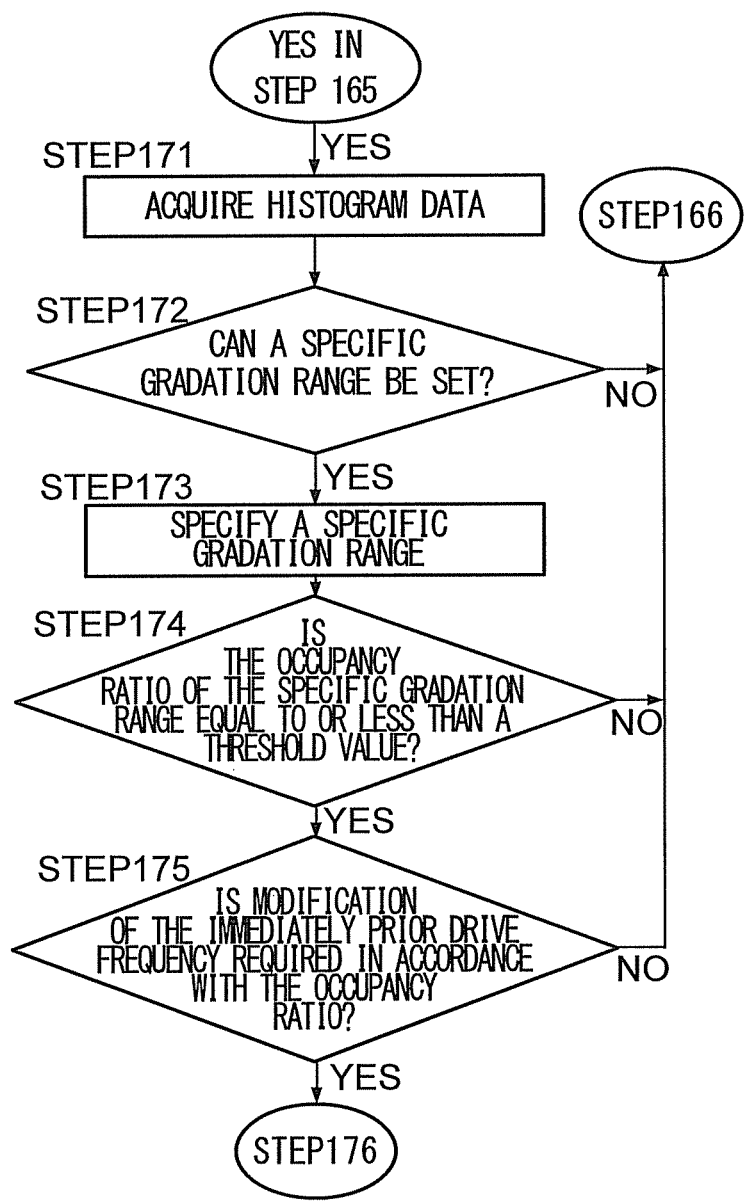
FIG. 65 is a flowchart of a case where the drive frequency of the PWM light modulation signal is set with consideration given to various functions.

For example, the drive frequency variation section 41 may judge the presence of a picture signal adaptation function, as shown in the flowchart of FIG. 65, after Yes in STEP 165, in the case that the drive frequency FQ[PWM] is varied so as to adapt to the environment adaptation function, as shown in the flowchart of FIG. 63. In other words, the drive frequency variation section 41 acquires the histogram data HGM from the computation processing section 13 (STEP 171), furthermore acquires the gradation threshold value (gradation threshold value data) set in accordance with the liquid crystal temperature Tp stored in advance in the memory 17, and judges whether a specific gradation range can be set (STEP 172).

In the case that it has been judged that a specific gradation range is not required to be set (No in STEP 172), the drive frequency variation section 41 sets a drive frequency FQ[PWM] in which consideration has been given to the illumination intensity data and the response speed Vr that corresponds to the liquid crystal temperature Tp (STEP 166).

On the other hand, in the case that a specific gradation range can be set (Yes in STEP 172), the drive frequency variation section 41 sets the specific gradation range (STEP 173), and furthermore acquires the occupancy ratio in the image (single-frame image) of the specific gradation range. A comparison is made of the occupancy ratio and the threshold value related to the occupancy ratio of the specific gradation range stored in the memory 17 (STEP 174).

In the case that the occupancy ratio is not equal to or less a threshold value (No in STEP 174), the image can be said to have low gradation and contain a large quantity of specific gradation ranges from, e.g., the $0^{th}$ gradation to the $128^{th}$ gradation. The liquid crystal molecules 61M in the response process lime span CW are less likely to become more prominent in terms of the light from the LEDs 71, and ghost outlines and afterimages or the like are less likely to occur as a result. In view thereof, the drive frequency variation section 41 sets a drive frequency FQ[PWM] in which consideration has been given to the illumination intensity data and the response speed Vr that corresponds to the liquid crystal temperature Tp (STEP 166).

Conversely, in the case that the occupancy ratio is at or less than the threshold value (Yes in STEP 174), the image can be said to have high gradation and contain only a small quantity of specific gradation ranges from, e.g., the $0^{th}$ gradation to the $128^{th}$ gradation. Hence, the drive frequency variation section 41 judges whether the immediately prior drive frequency FQ[PWM] requires modification in accordance with the occupancy ratio (STEP 175).

In the case that the drive frequency variation section 41 has judged that the immediately prior drive frequency FQ[PWM] requires modification (Yes in STEP 175; continuing from the flowchart of FIG. 66), the drive frequency variation section 41 judges the presence of FRC processing (STEP 176). In the case that FRC processing is not being carried out (No in STEP 176), the drive frequency variation section 41 sets the drive frequency FQ[PWM] in which consideration has been given to the illumination intensity data, the gradation, and the response speed Vr that corresponds to the liquid crystal temperature Tp (STEP 177).

On the other hand, the drive frequency variation section 41 judges whether the immediately prior drive frequency FQ[PWM] requires modification in the case that FRC processing is being carried out (STEP 178). In the case that the drive frequency variation section 41 has judged that the immediately prior drive frequency FQ[PWM] does not require modification (No in STEP 178), the drive frequency variation section 41 sets a drive frequency FQ[PWM] in which consideration has been given to the illumination intensity data, the gradation, and the response speed Vr that corresponds to the liquid crystal temperature Tp (STEP 177).

On the other hand, in the case that the drive frequency variation section 41 has judged that the immediately prior drive frequency FQ[PWM] requires modification (Yes in STEP 178), the drive frequency variation section 41 subsequently judges (STEP 179) whether the immediately prior duty requires modification in accordance with the viewing mode (e.g., the video level). In the case that the drive frequency variation section 41 has judged that the immediately prior drive frequency FQ[PWM] does not require modification (No in STEP 179), the drive frequency variation section 41 sets a drive frequency FQ[PWM] in which consideration has been given to the illumination intensity data, the gradation, FRC processing, and the response speed Vr that corresponds to the liquid crystal temperature Tp (STEP 180).

Conversely, in the case that the drive frequency variation section 41 has judged that the immediately prior drive frequency FQ[PWM] requires modification (Yes in STEP 179), the drive frequency variation section 41 sets a drive frequency FQ[PWM] in which consideration has been given to the illumination intensity data, the gradation, FRC processing, the viewing mode, the illumination intensity data, and the response speed Vr that corresponds to the liquid crystal temperature Tp (STEP 181).

Figure 66:
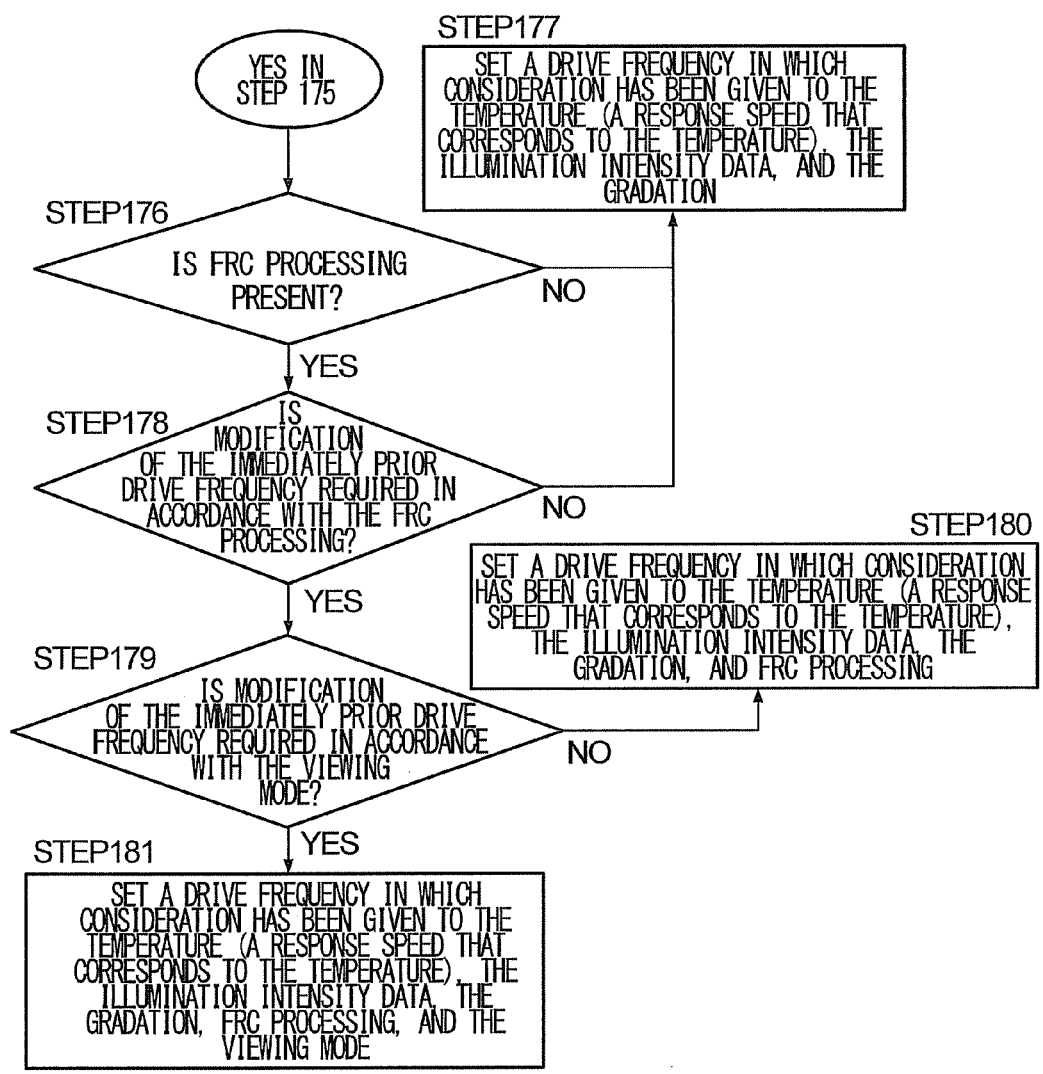
FIG. 66 is a flowchart of a case where the drive frequency of the PWM light modulation signal is set with consideration given to various functions.

The drive frequency variation section 41 varies the drive frequency FQ[PWM] even in the case that the environment adaptation function, the picture signal adaptation function, the FRC processing function, and the viewing mode setting function operate in combination, as shown in the flowcharts of FIGS. 63, 65, and 66.

The order of the functions is not limited to the order of the environment adaptation function, the picture signal adaptation function, the FRC processing function, and the viewing mode setting function, as shown in the flowchart of FIGS. 63, 65, and 66; these may be switched around. The number of combinations of functions is also not limited to the four functions of the environment adaptation function, the picture signal adaptation function, the FRC processing function, and the viewing mode setting function; three or fewer may be used or five or more may be used if there are various other functions.

<<Numerical Values of Drive Frequency of PWM Light Modulation Signal>>

Figure 67:
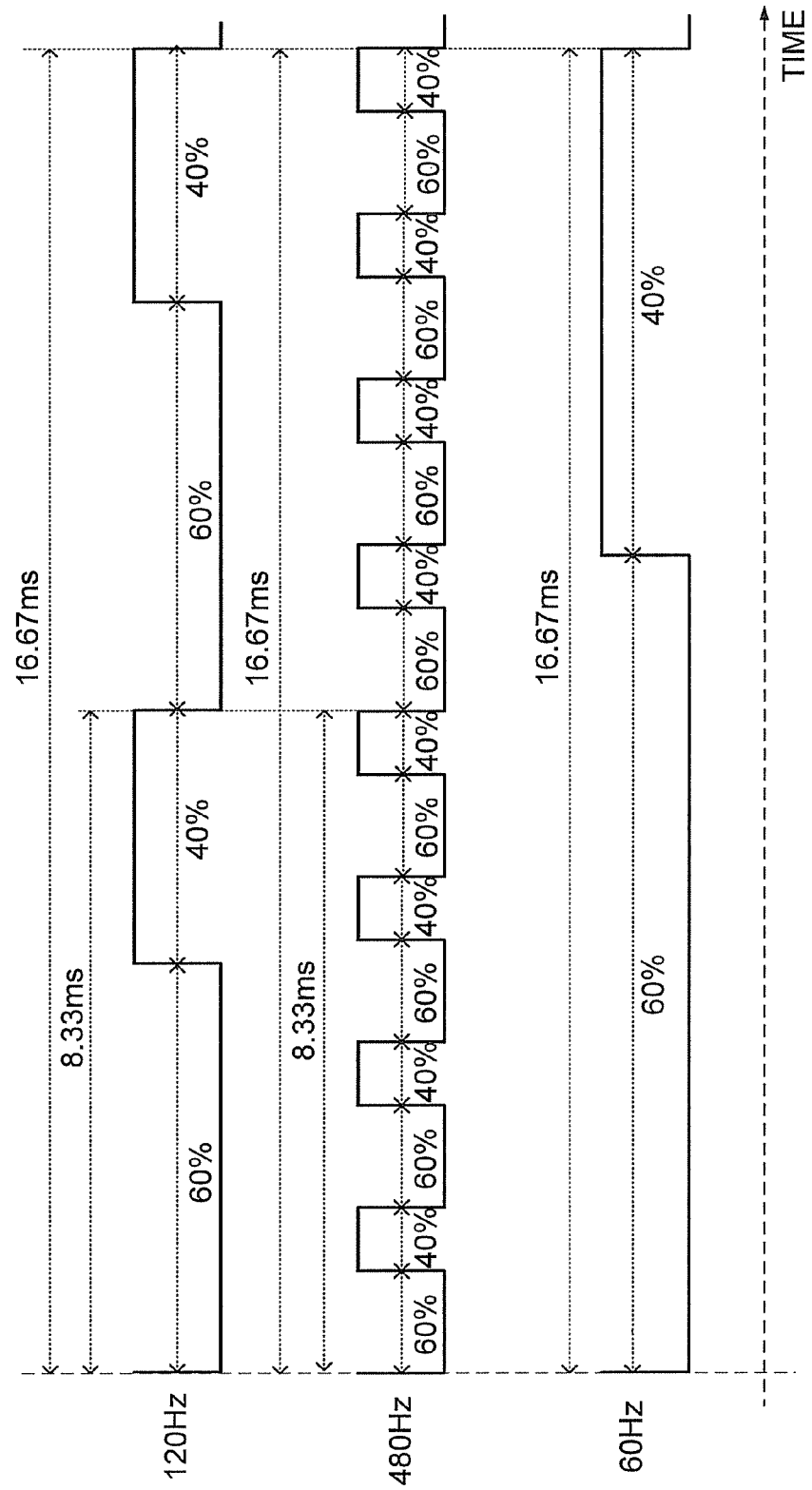
FIG. 67 is a signal waveform diagram of the PWM light modulation signal waveforms of 120 Hz, 480 Hz, and 60 Hz arranged in parallel.

Previously, 120 Hz and 480 Hz were cited by way of exemplary drive frequencies FQ[PWM] of the PWM light modulation signal in a case of a frame frequency of 120 Hz, as shown in FIG. 67 (the duty of the PWM light modulation signal in FIG. 67 is 40%). However, no limitation is provided thereby.

For example, the drive frequency FQ[PWM] may be a value exceeding 120 Hz but less than 480 Hz, such as 240 Hz or 360 Hz; or a value exceeding 480 Hz (that is, the drive frequency FQ[PWM] should be the same as, or greater than, the frame frequency). However, it is preferable for the drive frequency FQ[PWM] to be an integral multiple of the frame frequency, because it is easy to attain synchronization of the frame frequency and the drive frequency FQ[PWM] with one another.

Provided that an excessive degradation in picture quality does not arise, there may be adopted a drive frequency FQ[PWM] that is smaller than the frame frequency. For example, for liquid crystal display panels 60 driven at 240 Hz, which are becoming more common in the market, a drive frequency FQ[PWM] of 120 Hz for the LED 71 is acceptable.

In cases such as this, the control unit 1 will match the low interval of the PWM light modulation signal with an interval equal to at least one frame in continuous frames. The reason for doing so is that excessive degradation in picture quality will not arise.

The drive frequency FQ[PWM] of the LED 71 for a liquid crystal display panel 60 driven at a frame frequency of 120 Hz may be 60 Hz (see FIG. 67). The reason is that, in the case of such a 60 Hz drive frequency FQ[PWM], despite some noticeable flicker, the black insertion effect is dramatically exhibited (flicker is not noticeable in the case of the 120 Hz and 480 Hz drive frequencies FQ[PWM]).

As shown in FIG. 48B, it is preferable for a final timing in a single frame interval and a final timing of a high interval in the PWM light modulation signal to be synchronized (at a frame frequency of 120 Hz of the liquid crystal display panel 60, a single division between the dotted lines along the time axis in the drawing is a single frame).

In so doing, in a comparable fashion to FIG. 13A to FIG. 13D, the low interval of the PWM light modulation signal corresponds to the time span in which the liquid crystal molecules 61M begin to tilt (the initial period within the response process time span CW), and light of the LED 71 is not incident. Because of this, the extent of degradation of picture quality caused by tilting of the liquid crystal molecules 61M is minimized.

Other Embodiments

The present invention is not limited to the aforedescribed embodiments; various modifications are possible without departing from the spirit of the present invention.

<<Overdrive Driving>>

For example, in order to accelerate the response speed Vr of the liquid crystals 61 in the liquid crystal display device 90, an overdrive voltage may be applied to the liquid crystals 61. Specifically, as shown in FIG. 68A (the same drawing as FIG. 13B), even in the case of a relatively low response speed Vr, through overdrive (OD) of the voltage applied to the liquid crystals 61, the result will resemble that shown by the upper graph of FIG. 68B.

Figure 68A:
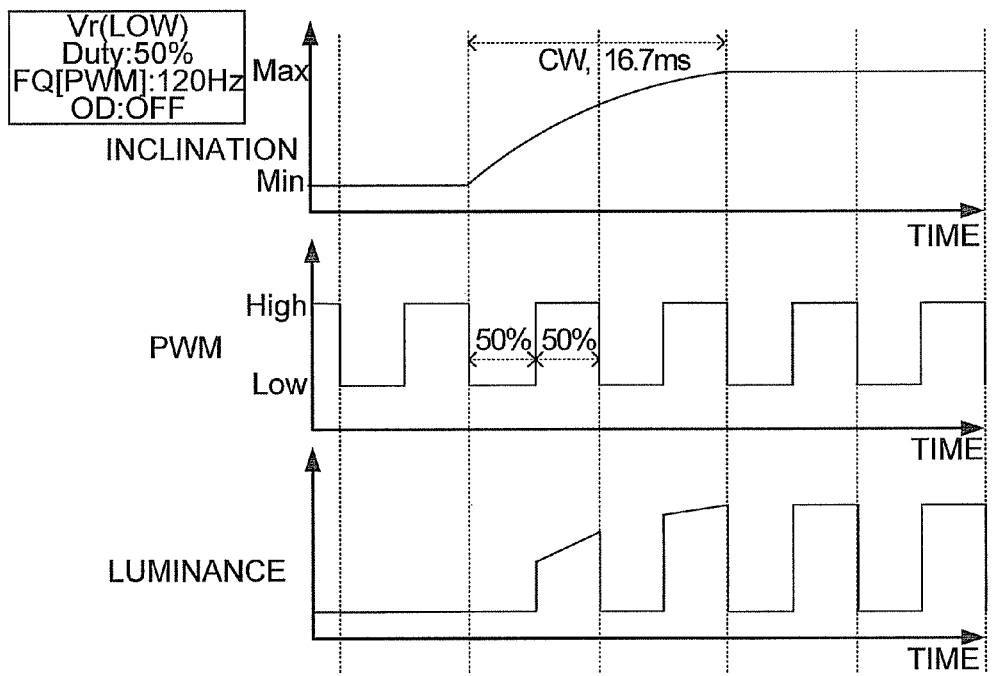
FIG. 68A is a graph showing the tilt amount of the liquid crystal molecules, the waveform of the PWM light modulation signal, and the luminance variation with respect to time in the case that the light of the LEDs driven by PWM light modulation signal at 50% duty is supplied to liquid crystal having relatively low response speed (where the drive frequency of the PWM light modulation signal is 120 Hz, and the voltage applied to the liquid crystal is not overdrive-driven)
Figure 68B:
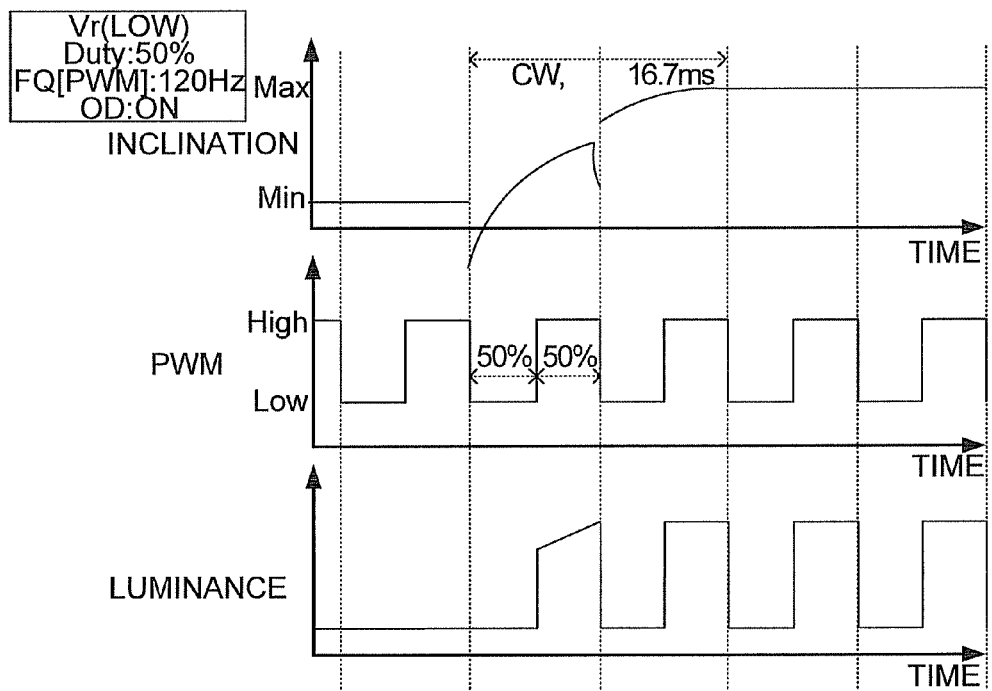
FIG. 68B is a graph showing the tilt amount of the liquid crystal molecules, the waveform of the PWM light modulation signal, and the luminance variation with respect to time in the case that the light of the LEDs driven by PWM light modulation signal at 50% duty is supplied to liquid crystal having relatively low response speed (where the drive frequency of the PWM light modulation signal is 120 Hz, and the voltage applied to the liquid crystal is overdrive-driven)

To describe in detail, as will be clear from a comparison of the response speed Vr of FIG. 68B and the response speed Vr of FIG. 68A, the response speed Vr of FIG. 68B corresponding to the former half of the response process time span CW increases sharply as compared with the response speed Vr of FIG. 68A; and further, the response speed Vr of FIG. 68B corresponding to the latter half of the response process time span CW increases somewhat as compared with the response speed Vr of FIG. 68A (that is, the graph line in the upper graph of FIG. 68B shows overshoot in the former half of the response process time span CW).

In so doing, the luminance value in the response process time span CW is higher as compared with the luminance value in the lower graph of FIG. 68A, as shown by the lower graph of FIG. 68B. Because of this, as shown in FIG. 15, ghost outlines and the like do not readily occur. Specifically, improved picture quality (for example, an improved level of sharpness of picture quality of video) may be attained, despite the control unit 1 overdriving the voltage applied to the liquid crystals 61, depending on the response speed of the liquid crystal molecules 61M in the liquid crystal display device 90.

That is, the control unit 1 includes a function of overdriving the voltage applied to the liquid crystals 61. The control unit 1 then varies the duty of the PWM light modulation signal, depending on the presence of overdrive. In a case where there is an overdrive process, the duty is lower as compared with the duty in a case where there is no overdrive process (the current value AM may also vary depending on variation in duty).

Also, the control unit 1 may vary the drive frequency FQ[PWM] of the PWM light modulation signal depending on the presence of overdrive. The drive frequency FQ[PWM] in the case where there is an overdrive process is lower as compared with the drive frequency FQ[PWM] a case where there is no overdrive process. Improvement in the picture quality of the liquid crystal display device 90 may be realized by the control unit 1 carrying out any of these controls.

<<Liquid-Crystal Display Device>>

In Embodiment 1, the duty setting section 14 and the electric current value setting section 15 were included in the picture signal processing section 10 in the control unit 1. However, these may be included in the LED controller 30 rather than in the picture signal processing section 10. Specifically, using the duty setting section 14 and the electric current value setting section 15, the LED controller 30 may vary the duty of the PWM light modulation signal, or the duty and the electric current value.

In Embodiment 2, the drive frequency variation section 41 was included in the LED controller 30. However, it may be included in the picture signal processing section 10 rather than in the LED controller 30. Specifically, using the drive frequency variation section 41, the picture signal processing section 10 may vary the drive frequency FQ[PWM] of the PWM light modulation signal.

In the preceding, the control unit 1 receives a picture/audio signal such as a television broadcast signal, and the picture signal in the signal is processed by the picture signal processing section 102. Because of this, the receiving device installed in this sort of liquid crystal display device 90 can be called a television broadcast receiving device (a so-called liquid crystal television). However, the picture signal processed by the liquid crystal display device 90 is not limited to a television broadcast. For example, a picture signal included in a recording medium for video recording of content such as a movie or the like, or a picture signal transmitted via the Internet, is also acceptable.

That is, the duty setting section 14, the electric current value setting section 15, and the drive frequency variation section 41 may be included anywhere in the control unit 1, and designed such that the most efficient operation is possible (i.e., there is a high degree of freedom in design of the control unit 1).

Figure 69:
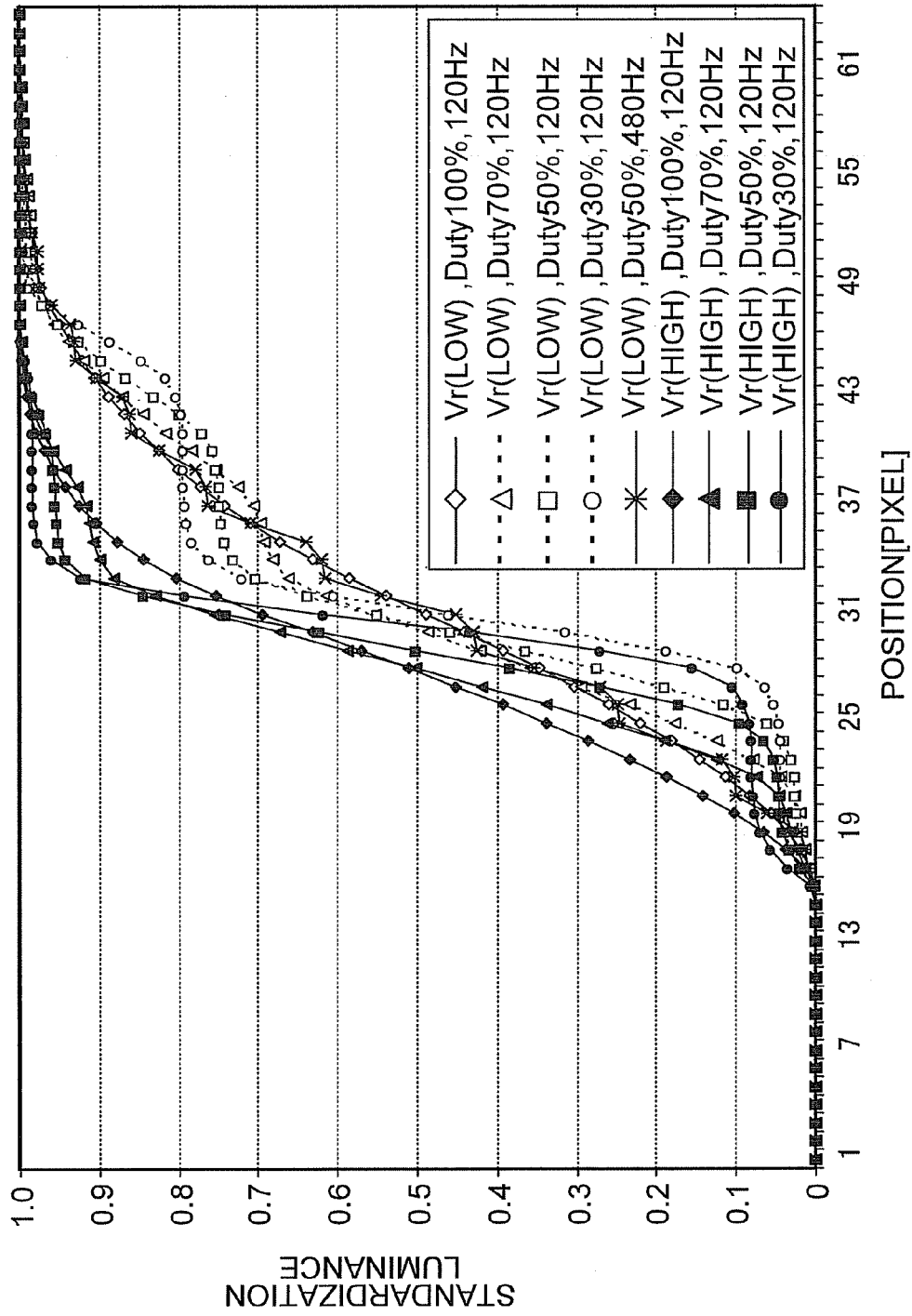
FIG. 69 is a graph showing the integral luminance in the vicinity of the boundary between the black image and the white image.

FIG. 69 shows a graph which is a compilation of graphs relating to the vicinity of the boundary between a black image and a white image displayed on the liquid crystal display panel 60 cited by way of example in Embodiments 1 and 2 (a graph of standardized luminance in which the horizontal axis shows pixel position in a horizontal direction HL in the liquid crystal display panel 60, and the vertical axis is integral luminance standardized by maximum value). (Specifically, FIG. 69 is a graph compiling FIGS. 14 to 17. FIGS. 41 to 44, and FIG. 49).

As seen from this graph, the liquid crystal display device 90 is designed such that, in a case where the response speed Vr of the liquid crystal molecules 61M is rapid, black is inserted by lowering the duty, whereas in a case where the response speed Vr of the liquid crystal molecules 61M is slow, ghost outlines are prevented by increasing the duty. In order to prevent ghost outlines, the liquid crystal display device 90 is designed to increase the PWM light modulation signal FQ[PWM] of the LED 71 to higher than the drive frequency (frame frequency) of the liquid crystal display panel 60.

Specifically, the liquid crystal display device 90 may have at least one of a function for varying duty relating to the PWM light modulation signal described in Embodiment 1, or the duty and electric current value of the PWM light modulation signal; and a function of varying the drive frequency FQ[PWM] relating to the PWM light modulation signal described in Embodiment 2.

<<Local Dimming>>

Figure 70:
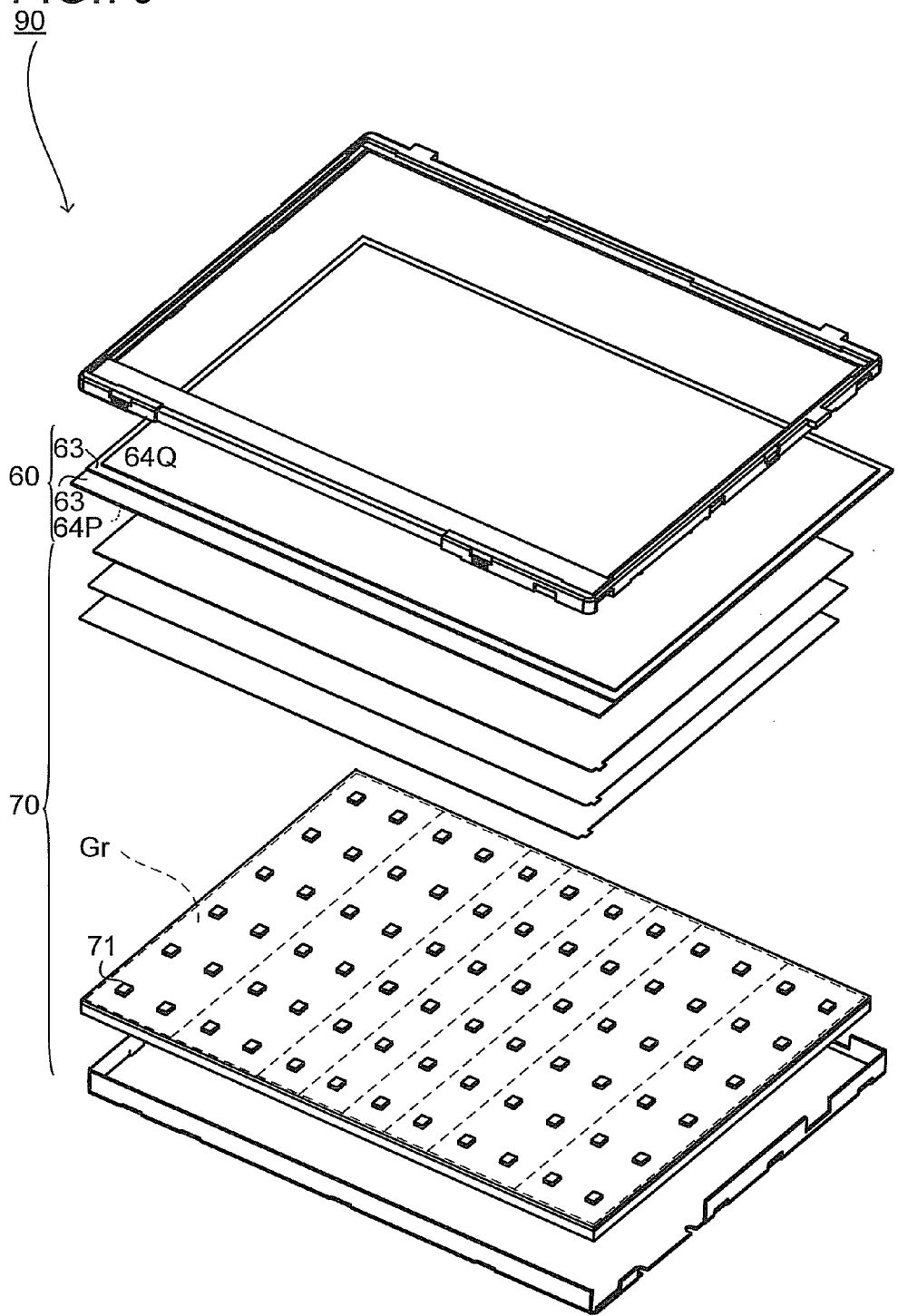
FIG. 70 is an exploded perspective view of the liquid crystal display device.

FIG. 70 shows an exploded perspective view of the liquid crystal display device 90. As shown, the liquid crystal display device 90 includes a backlight unit 70 with a plurality of LEDs 71 laid out in matrix form. The control unit 1 can control all of the LEDs 71 collectively, but there is no limitation thereto; light emission of individual LEDs 71 can be controlled (this technique is called local dimming).

Further, the control unit 1 can divide a plurality of LEDs 71, and control light emission by one, or a plurality of, the divided LEDs 71 (see the broken line divisions. Separated LEDs 71 are termed a divided light source Gr). Specifically, in this backlight unit 70, the LEDs 71 are arranged so as to be capable of partially supplying light to a surface of the liquid crystal display panel 60.

In the liquid crystal display device 90 like that of Embodiment 1, the control unit 1 may vary the duty, or the duty and the electric current value, of every one of the divided LEDs 71. Similarly, in the liquid crystal display device 90 like that of Embodiment 2, the control unit 1 may vary the drive frequency FQ[PWM] of every one of the divided LEDs 71.

As one example, in a case where the number of divided LED 71 (divided light sources Gr) is a plural number, the LEDs 71 thereof may emit linear light in the plane of the liquid crystal display panel 60, emit light in accordance with blocks obtained by dividing the plane interior in ordered fashion, or emit light in accordance with a partial area in the plane.

Figure 71:
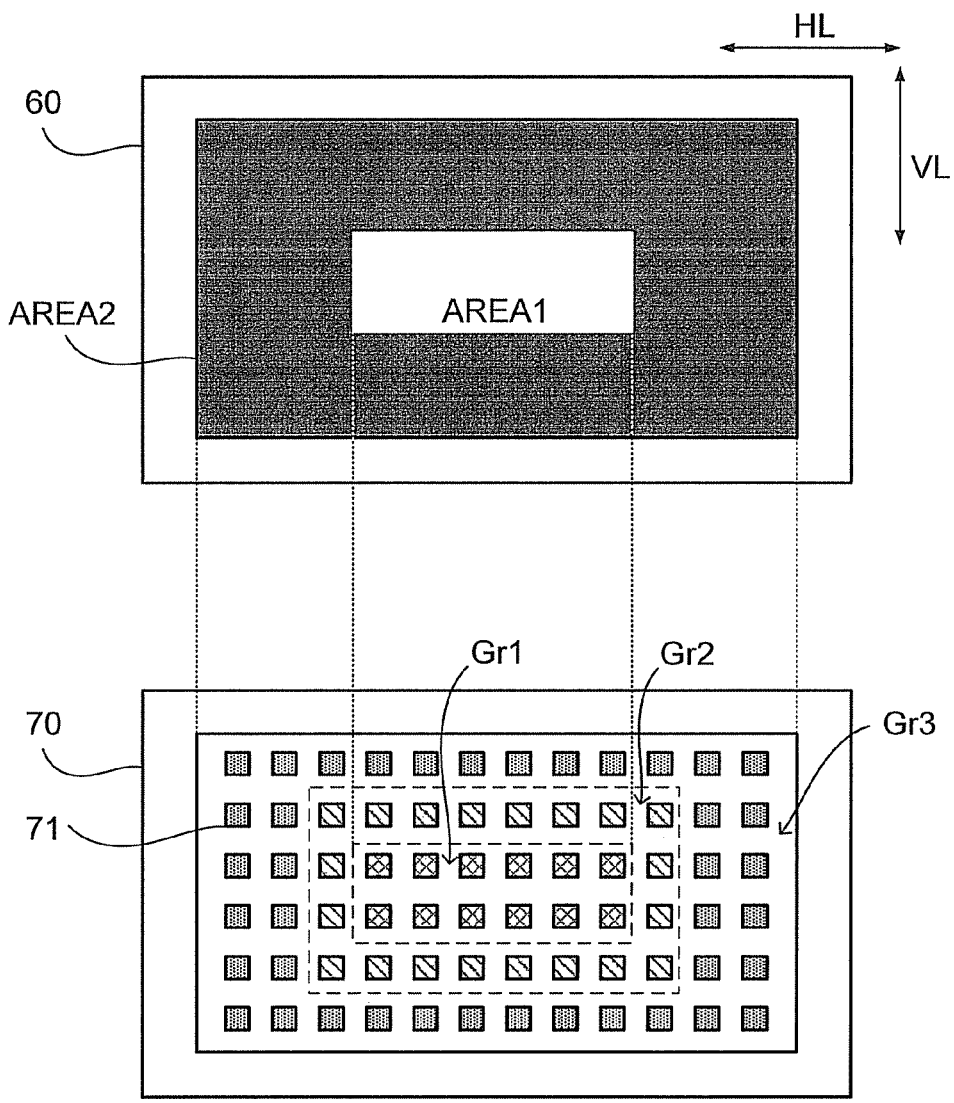
FIG. 71 is a plan view showing both the liquid crystal display panel for displaying a white image in the center and a black image around the white image, and the backlight unit adapted to the image of the liquid crystal display panel.

An example like that shown in FIG. 71 may be cited as a detailed example. In the liquid crystal display panel 60 shown to the upper side of FIG. 71, a high-luminance image (for example, a white image; AREA 1) is displayed at the center, while a low-luminance image (for example, a gray image; AREA 2) is displayed in the remaining area of the liquid crystal display panel 60. The LED 71 of the backlight unit 70 corresponding to such a liquid crystal display panel 60 is shown to the lower side of FIG. 71.

Of the LEDs 71 of the backlight unit 70, the group of LEDs 71 corresponding to AREA 1 (Gr1; the LEDs 71 with cross-hatching) is set, for example, to a drive frequency FQ[PWM] of 480 Hz, corresponding to a white image. Meanwhile, because the remaining LEDs 71 correspond to the gray area corresponding to AREA 2, a setting of, for example, 120 Hz may be contemplated. However, the setting is made such that not all of the remaining LEDs 71 are driven at a drive frequency FQ[PWM] of 120 Hz.

To describe in detail, a group of LEDs 71 corresponding to the vicinity of the boundary between the white image (AREA 1) and the gray image (AREA 2) (Gr2; the LEDs 71 with diagonal lines) is set to a drive frequency FQ[PWM] which is a lower frequency than 480 Hz; for example, to 360 Hz, while the other LEDs 71 (Gr3; LED with halftone dots) are set to be driven at a drive frequency FQ[PWM] of 120 Hz.

Ordinarily, in the vicinity of the boundary between a white image and a gray image, light of a high drive frequency FQ[PWM] corresponding to the white image tends to infiltrate the gray image side. In such cases, despite the LEDs 71 being driven at a low drive frequency FQ[PWM] in order to obtain a black insertion effect for the purpose of the gray image, it is difficult to obtain a black insertion effect, due to light of a high drive frequency FQ[PWM] infiltrating the gray image side.

However, when the group (Gr2) of LEDs 71 corresponding to the boundary between the white image and the gray image has a drive frequency FQ[PWM] of 360 Hz, the frequency will be low as compared with the group (Gr1) of LEDs 71 corresponding to the white image. Because of this, the reduction in the black insertion effect is minimized.

Figure 72:
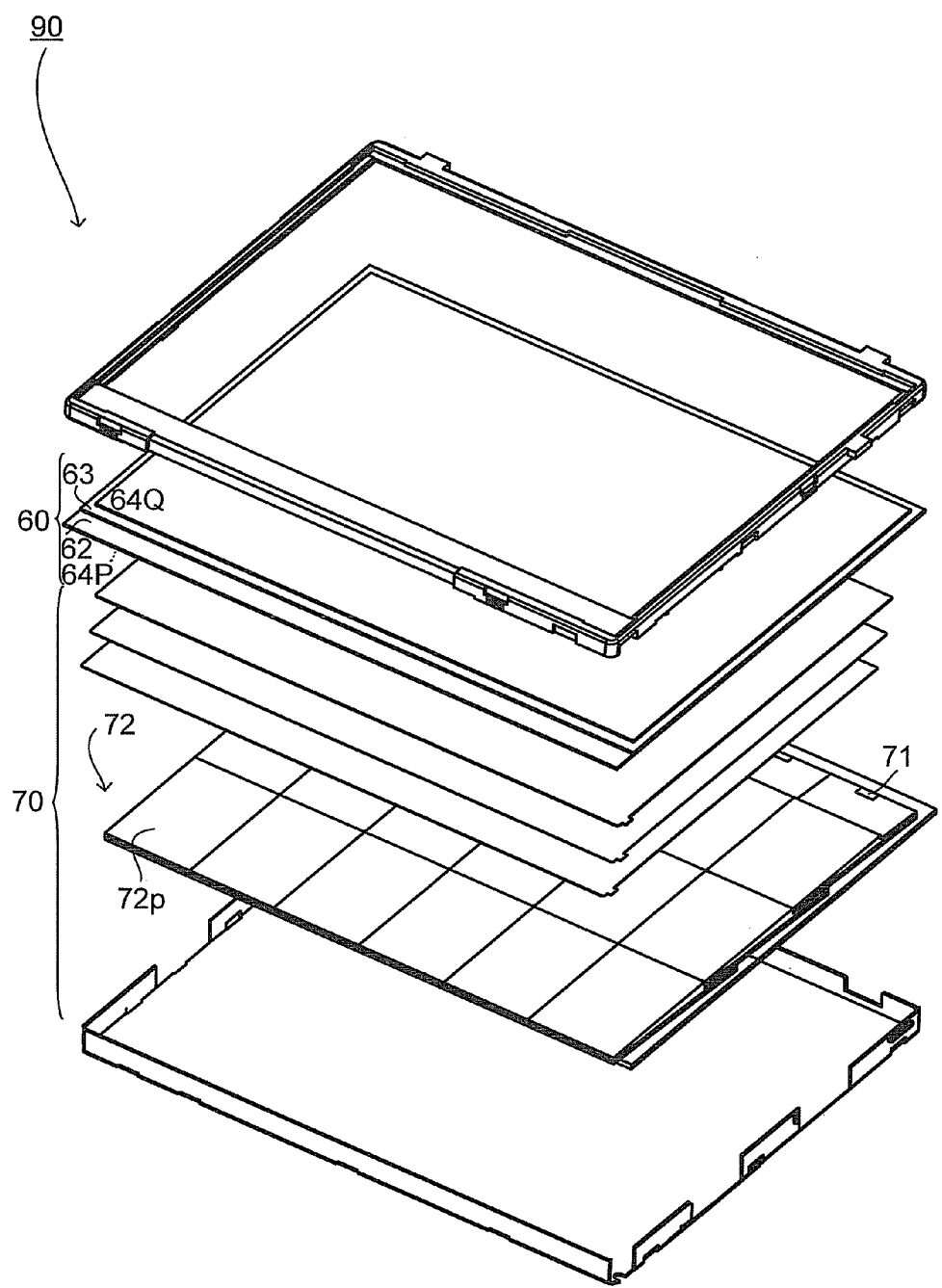
FIG. 72 is an exploded perspective view of the liquid crystal display device.

A so-called direct backlight unit 70 was cited as an example of the backlight unit 70 for local dimming; however, no limitation is provided thereby. As shown in FIG. 72, for example, a backlight unit having installed therein a tandem light guide panel 72 formed by laying out wedge-shaped light guides 72*p* (a tandem backlight unit) 70 is also acceptable.

The reason is that even with such a backlight unit 70, because individual control of light emitted from each of the light guides 72*p* is possible, the display area of the liquid crystal display panel 60 can be partially irradiated. Because partial irradiation of the liquid crystal panel 60 is possible with any of these local dimming (active area type) backlight units 70, it is possible to minimize power consumption. Additionally, by bringing about localized variation of the duty, or of the duty and the electric current value, partial control of the quantity of light is realized, and variations in luminance level are kept in check, making it possible to provide optimum picture quality.

<<Other Liquid Crystal Modes>>

In the preceding, TN mode, VA mode, IPS mode, OCB mode, and the like were cited as modes of the liquid crystal 61; further, MVA mode was described as one example of VA mode using FIGS. 5 to 8, while IPS mode was described using FIGS. 9 and 10. However, liquid crystal modes besides these are also acceptable.

Figure 73:
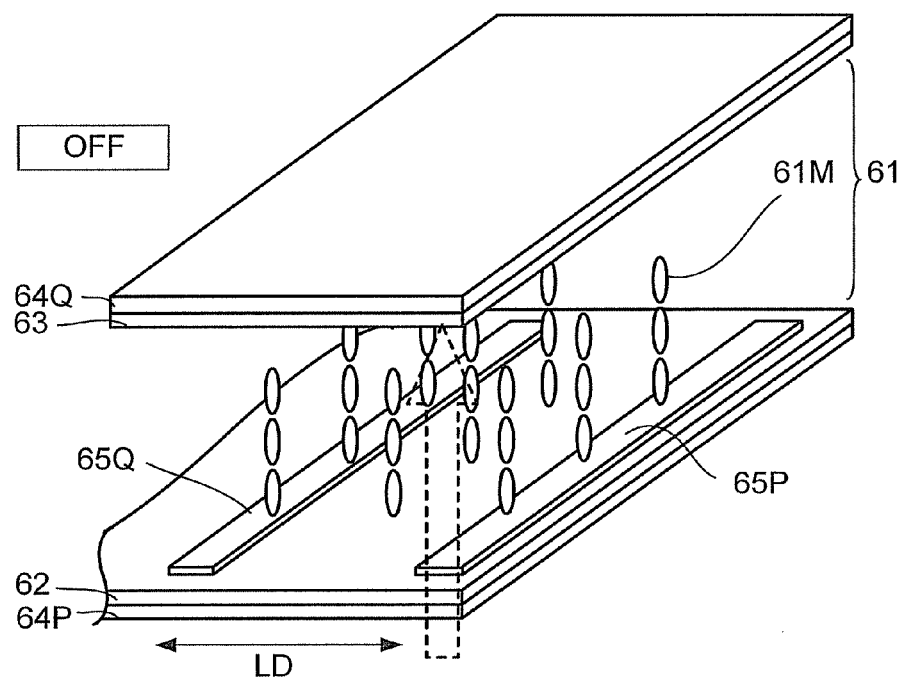
FIG. 73 is a perspective view showing the orientation of the liquid crystal molecules for a case where voltage is not applied in VA-IPS mode liquid crystal (the OFF case)
Figure 74:
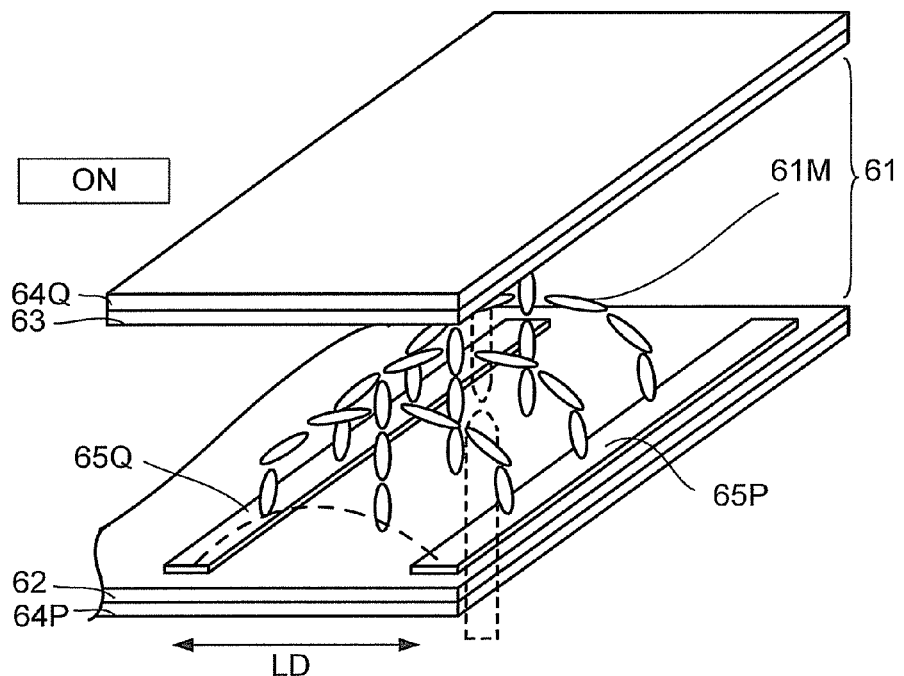
FIG. 74 is a perspective view showing the orientation of the liquid crystal molecules for a case where voltage is applied in VA-IPS mode liquid crystal (the ON case)

For example, a liquid crystal 61 mode such as that shown in FIGS. 73 and 74 (this mode is termed Vertical Alignment-In-Plane Switching (VA-IPS) mode) is also acceptable. The liquid crystal 61 containing the liquid crystal molecules 61M shown in the drawings is a positive-type liquid crystal having positive dielectric anisotropy (in the drawings, the arrows formed by single-dot and chain lines signify light).

A pixel electrode 65P of linear form and an opposing electrode 65Q of linear form are formed on one face of an active matrix substrate 62, facing towards the liquid crystal 61 side. In particular, the electrodes 65P, 65Q are arranged to face towards one another (the shape of the electrodes 65P, 65Q is not limited to linear form; a pectinate form such as that shown in FIG. 11 is also acceptable).

Further, as shown in FIG. 73, the major-axis direction of the liquid crystal molecules 61M is oriented so as to be aligned in the vertical direction of the substrates 62, 63 (the direction in which the substrates 62, 63 are arranged in a row). (Initial orientation in the absence of an electric field is designed, for example, through application of an orientation film material (not shown) having orientation-regulating force to the electrodes 65P, 65Q).

In so doing, the polarization film 64P and the polarization film 64Q form a crossed Nicol arrangement, whereupon backlight light BL passing through the active matrix substrate 62 is not emitted to the outside (that is, the liquid crystal display panel 60 is in normal black mode).

On the other hand, when a voltage is applied across the pixel electrode 65P and the opposing electrode 65Q, the liquid crystal molecules 61M attempt to face along the electric field generated between the electrodes 65P, 65Q. This electric field direction is arcuate along the direction LD in which the pixel electrode 65P and the opposing electrode 65Q are arranged in a row (that is, the leading edge of the curve faces the opposing substrate 63, and arcuate electric force lines are generated that follow along the direction LD in which the pixel electrode 65P and the opposing electrode 65Q are arranged in a row; see the two-dot chain line of FIG. 74).

Thereupon, the liquid crystal molecules 61M whose initial orientation has followed along the vertical direction of the substrates 62, 63 assume the following state under the influence of the arcuate electric field direction. Specifically, as shown in FIG. 74, the liquid crystal molecules 61M in the vicinity of the middle between the electrodes 65P, 65Q continue to follow along the vertical direction of the substrates 62, 63, while the majority of the other liquid crystal molecules 61M are aligned such that the major-axis direction thereof follows along the arcuate electric field direction (the liquid crystal molecules 61M in the vicinity of the center of the electrodes 65P, 65Q continue to follow along the vertical direction of the substrates 62, 63 (not shown)).

Once the liquid crystal molecules 61M are oriented in this manner, some of the backlight light BL which has passed through the active matrix substrate 62 is emitted to the exterior as light following along the transmissive axis of the polarization film 64Q due to the tilt of the liquid crystal molecules 61M.

In other words, whereas in VA-IPS mode the liquid crystal molecules 61M are positive-type just as in IPS mode, in cases where voltage is not being applied to the electrodes 65P, 65Q, the major-axis direction thereof is oriented so as to be aligned along the vertical direction of the two substrates 62, 63 (assuming a homeotropic orientation).

Even in cases where voltage has been applied to the electrodes 65P, 65Q, some of the liquid crystal molecules 61M are aligned such that the major-axis direction thereof is made to follow along the vertical direction of the two substrates 62, 63; but in cases where voltage is applied to the electrodes 65P, 65Q, the rest of the liquid crystal molecules 61M are aligned such that the major-axis direction thereof is made to follow along the arcuate electric field direction between the electrodes 65P, 65Q. As a result, in cases where voltage is applied to the liquid crystal display panel 60, there is a mixture of arcuately oriented liquid crystal molecules 61M, and liquid crystal molecules 61M oriented as shown by the arrow with respect to the arcuate form (liquid crystal molecules 61M following along the vertical direction of the substrates 62, 63).

Figure 75:
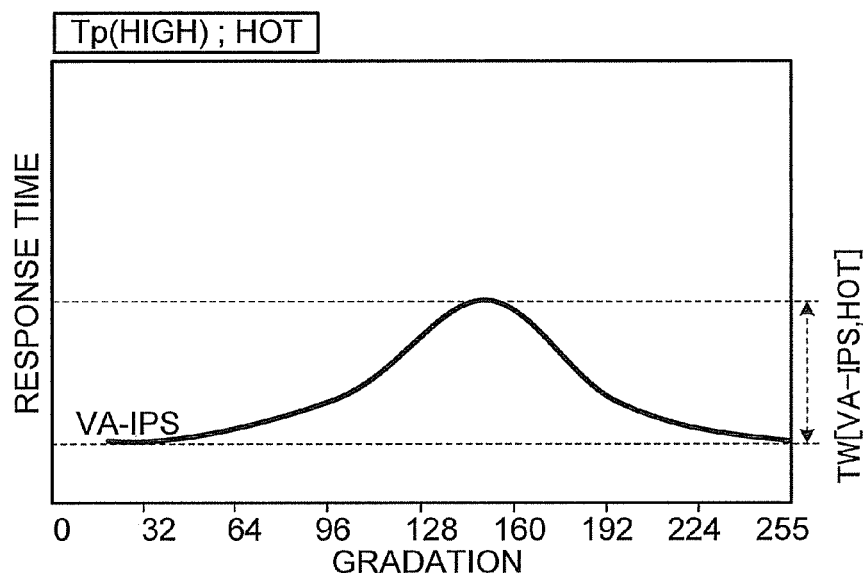
FIG. 75 is a graph showing the relationship between the gradation value and the response time of the liquid crystal molecules (in a case where the liquid crystal temperature is relatively high is VA-IPS mode liquid crystal)
Figure 76:
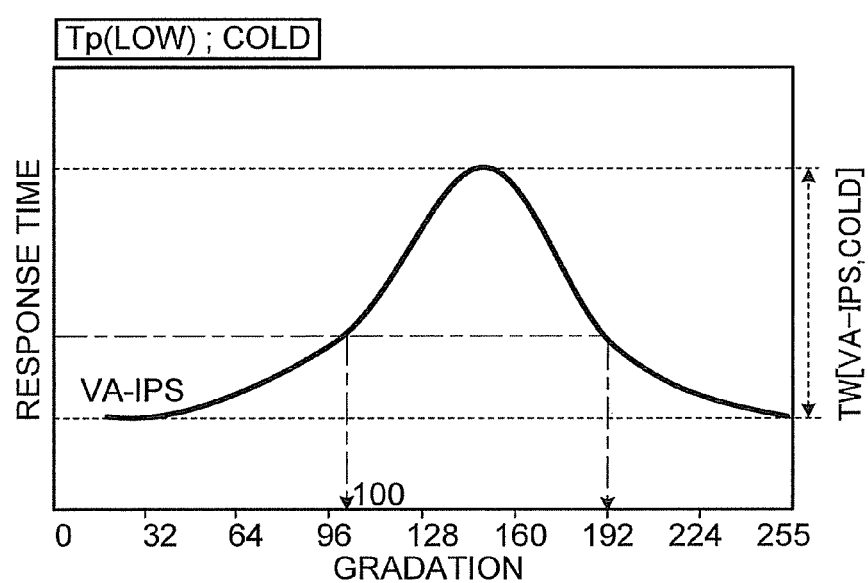
FIG. 76 is a graph showing the relationship between the gradation value and the response time of the liquid crystal molecules (in a case where the liquid crystal temperature is relatively low in VA-IPS mode liquid crystal)

Due to this orientation pattern of the liquid crystal molecules 61M, the variation in response speed Vr between gradations of the liquid crystal molecules 61 is different than for the MVA mode and the IPS mode. FIGS. 75 and 76 show graphs showing response time for tilt of the liquid crystal molecules 61M attempting to vary between gradations from a $0^{th}$ gradation to another gradation, by liquid crystal 61 in the VA-IPS mode. FIG. 75 corresponds to a liquid crystal temperature Tp of relatively high temperature, and FIG. 76 corresponds to a liquid crystal temperature Tp of relatively low temperature. The graph of FIG. 77 and the graph of FIG. 78 also include, in addition to VA-IPS mode, response times in MVA mode and IPS mode (FIG. 77 corresponds to a liquid crystal temperature Tp of relatively high temperature, and FIG. 78 corresponds to a liquid crystal temperature Tp of relatively low temperature).

Figure 77:
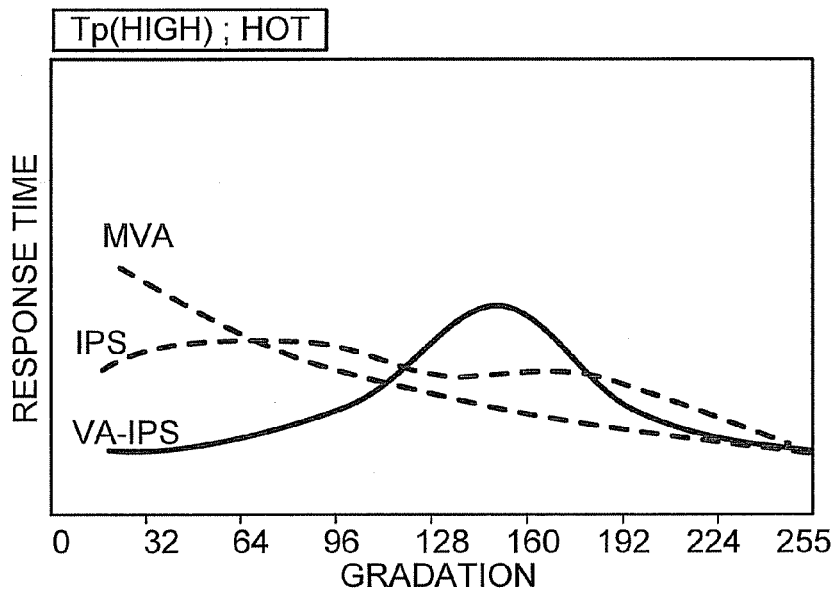
FIG. 77 is a graph showing the relationship between the gradation value and the response time of the liquid crystal molecules (in a case where the liquid crystal temperature is relatively high in MVA mode, IPS-mode, and VA-IPS mode liquid crystal)
Figure 78:
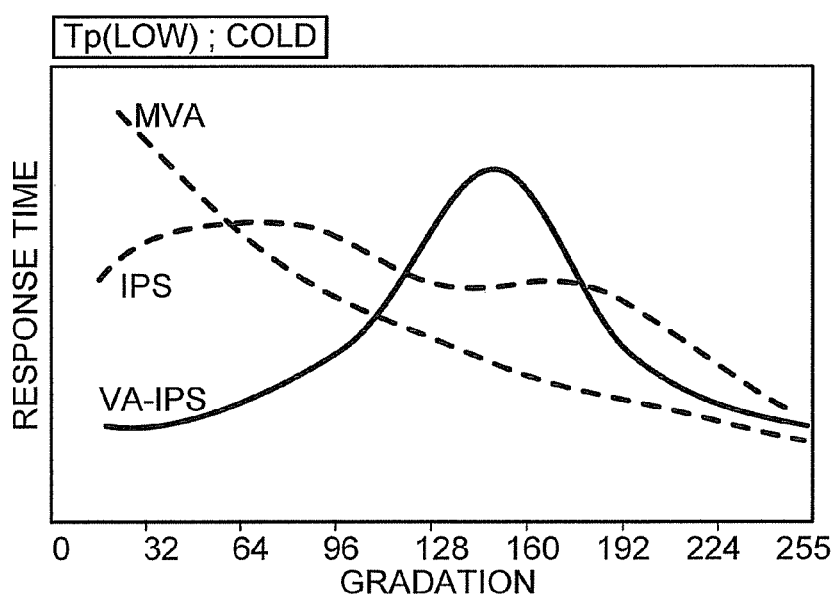
FIG. 78 is a graph showing the relationship between the gradation value and the response time of the liquid crystal molecules (in a case where the liquid crystal temperature is relatively low in MVA mode, IPS-mode, and VA-IPS mode liquid crystal)

As shown by the graph of FIG. 77 and the graph of FIG. 78, in the MVA mode, there is a tendency for response time to become shorter in association with higher gradation of the displayed image. This is due to the fact that the liquid crystal molecules 61M are made to tilt to a greater extent, whereby the voltage value applied to the liquid crystal molecules 61M is relatively high.

On the other hand, while the tendency in the IPS mode is similar to that in the MVA mode, due to a characteristic of the liquid crystal molecules 61M to rotate, differentials in response time between individual gradations are smaller as compared with the MVA mode.

However, in the case of the VA-IPS mode, response times corresponding to low gradations and high gradations are relatively short, while response times corresponding to intermediate gradations are relatively long. The reason is as follows.

In the VA-IPS mode, in cases where a high-gradation image is displayed, the response time is short because a relatively high voltage is applied to the liquid crystal molecules 61M, in similar fashion to the MVA mode and the IPS mode.

In cases where a low-gradation image is displayed, while the voltage applied to the liquid crystal molecules 61M is relatively low, the liquid crystal molecules 61M tilt in a crescent to follow along the arcuate electric field direction. In such cases, flux (flow) of the liquid crystal acts to accelerate variation of orientation, and therefore response time is shorter (the flow effect is generated in cases of high-gradation as well).

On the other hand, in cases where an intermediate-gradation image is displayed, while the liquid crystal molecules 61M try to tilt further in a crescent as compared with cases where a low-gradation image is displayed, liquid crystal molecules 61M that follow along the vertical direction of the substrates 62, 63 are always situated in the vicinity of the middle between the electrodes 65P, 65Q (to describe in greater detail, in the vicinity of the center of the arcuate electric field).

Because of this, as the other liquid crystal molecules 61M tilt so as to fall over relative to the liquid crystal molecules 61M following along the vertical direction of the substrates 62, 63, energy density reaches a high level in the area where these liquid crystal molecules 61M are gathered. As the energy density reaches a high level in this way, more energy is needed in order for the liquid crystal molecules 61M to tilt, and therefore the response speed Vr is lower.

For reasons such as the preceding, in the case of the VA-IPS mode, a different graph line is shown than in the MVA mode and the IPS mode. However, as shown in FIGS. 75 and 76, it will be apparent that in the VA-IPS mode as well, the differential TW between the maximum value and the minimum value of response time differs according to the liquid crystal temperature Tp (the differential TW at a liquid crystal temperature Tp of high temperature [VA-IPS, HOT] is smaller as compared with the differential TW at a liquid crystal temperature Tp of low temperature [VA-IPS, COLD]).

Consequently, in cases where there is such a large differential TW of graph lines, when there is a differential between the occupancy ratio of the low-gradation range, the occupancy ratio of the intermediate-gradation range, and the occupancy ratio of the high-gradation range in an image (single-frame image), this may cause degradation of picture quality, depending on the characteristics of the backlight light BL.

For example, at a low-temperature liquid crystal temperature Tp of about 20° C., when the occupancy ratio of the intermediate-gradation range (for example, a gradation range of from 100 to 192 within a total gradation range of from 0 to 255) is high, the response speed Vr of the liquid crystal molecules 61M is relatively low. Where the duty of the PWM light modulation signal is set to a low level for such liquid crystal molecules 61M, there is a possibility of ghost outlines occurring, as shown in FIG. 15. In such cases, the duty of the PWM light modulation signal is set to a high level.

Conversely, where the occupancy ratio of the low-gradation range and the occupancy ratio of the high-gradation range are high, the response speed Vr of the liquid crystal molecules 61M is relatively high. Because of this, in such cases, the duty of the PWM light modulation signal should be set to a low level (that is, so that the black insertion effect of the PWM light modulation signal is dramatically exhibited).

In VA-IPS mode, the control unit 1 may use histogram data HGM when setting the duty of the PWM light modulation signal, in the same fashion as in the MVA mode discussed in Embodiment 1.

In other words, the control unit 1 divides all gradations of the histogram data HGM, and decides whether the occupancy ratio in at least one specific gradation range among the divided gradation ranges exceeds, or is equal to or less than, an occupancy ratio threshold value. Then, the duty in a case where the occupancy ratio exceeds the occupancy ratio threshold value is set to be greater than the duty when the occupancy ratio is equal to or less than the threshold value; whereas the duty in a case where the occupancy ratio is equal to or less than the occupancy ratio threshold value is set to be lower than the duty in a case where the occupancy ratio exceeds the occupancy ratio threshold value (the electric current value AM may also be varied depending on variation in the duty).

For example, in a case where, for liquid crystal 61 in VA-IPS mode at a liquid crystal temperature Tp of about 20° C., a specific gradation range of from the 100th gradation to the 192nd gradation exceeds an occupancy ratio of 50% (that is, in a case where the occupancy ratio threshold value is 50%, with the occupancy ratio threshold value having been exceeded), the duty is set to a relatively high value such as 100% or 70%, whereas in a case where the occupancy ratio is equal to or less than 50%, the duty is set to a relatively low value such as 50% or 30%) (the chart of FIG. 79 shows how the magnitude of duty tends to correspond to the magnitude relationship of the occupancy ratio).

In the VA-IPS mode as well, the control unit 1 may use histogram data HGM when setting the drive frequency FQ[PWM] of the PWM light modulation signal, in the same fashion as in the MVA mode discussed in Embodiment 2.

In other words, in the same manner discussed earlier, the control unit 1 divides all gradations of the histogram data HGM, and decides whether the occupancy ratio in at least one specific gradation range among the divided gradation ranges exceeds, or is equal to or less than, an occupancy ratio threshold value. Then, the drive frequency FQ[PWM] in a case where the occupancy ratio exceeds the occupancy ratio threshold value is set to be lower than the drive frequency in a case where the occupancy ratio is equal to or less than the occupancy ratio threshold value; whereas the drive frequency FQ[PWM] in a case where the occupancy ratio is equal to or less than the occupancy ratio threshold value is set to be higher than the drive frequency in a case where the occupancy ratio exceeds the occupancy ratio threshold value.

For example, in a case of a liquid crystal temperature Tp of about 20° C. in VA-IPS mode, in a case where a specific gradation range of from the 100th gradation to the 192nd gradation exceeds an occupancy ratio of 50%, the drive frequency FQ[PWM] is set to a low setting, such as 120 Hz for example, in order to improve video performance. On the other hand, in a case where the occupancy ratio is equal to or less than 50%, the drive frequency FQ[PWM] is set to a high setting, such as 480 Hz for example, in order to prevent ghost outlines (the chart of FIG. 80 shows how the magnitude of the drive frequency FQ[PWM] tends to correspond to the magnitude relationship of the occupancy ratio).

In the case of VA-IPS mode, in the same manner as in MVA mode and IPS mode, at least one of a specific gradation range and an occupancy ratio threshold may vary according to temperature data (specifically, the liquid crystal temperature Tp) of the panel thermistor 83. For example, setting of a specific gradation range may be carried out in the case of the liquid crystal temperature Tp shown in FIG. 75 as well.

(Regarding the Program)

Duty setting of the PWM light modulation signal, or duty setting and electric current value setting, as well as setting of the drive frequency FQ[PWM], may be realized by an LED control program (light source control program). This program may be a program which is executable by a computer, and may be recorded onto a recording medium readable by a computer. This allows the program recorded onto the recording medium to be transportable.

As the recording medium, there may be cited, for example, tape systems such as detachable magnetic tape or cassette tape systems; disk systems of magnetic disks or optical disks such as CD-ROMs and the like; card systems such as IC cards (including memory cards), optical cards, or the like; or semiconductor memory systems such as flash memory and the like.

The control unit 1 may acquire the LED control program from a communications network. The communications network may be wired or wireless; the Internet, infrared communications, and the like may be cited by way of example.

LIST OF REFERENCE SIGNS

1 control unit (control unit)
10 picture signal processing section
11 timing adjustment section
12 histogram processing section
13 computation processing section
14 duty setting section
15 electric current value setting section
16 viewing mode setting section
17 memory
18 histogram unit
20 liquid crystal display panel controller
30 LED controller
31 LED controller setting register group
32 LED driver control section
33 serial/parallel converter
34 individual variation-correcting section
35 memory
36 temperature correction section
37 deterioration-correcting section
38 parallel/serial converter
41 drive frequency variation section
50 microprocessor unit
51 main microprocessor
60 liquid crystal display panel
61 liquid crystal
61M liquid crystal molecules
62 active matrix substrate
63 opposing substrate
64P polarization film
64Q polarization film
65P pixel electrode (first electrode/second electrode)
65Q opposing electrode (second electrode/first electrode)
66P slit (first slit/second slit)
66Q slit (second slit/first slit)
67P rib (first rib/second rib)

67 Q rib (second rib/first rib)
70 backlight unit
71 LEDs (light source, light-emitting elements)
81 gate driver
82 source driver
83 panel thermistor (first temperature sensor)
84 environment illumination intensity sensor (illumination intensity sensor)
85 LED driver
86 LED thermistor
87 LED luminance sensor
90 liquid crystal display device

The invention claimed is:

1. A liquid crystal display device comprising:
a liquid crystal display panel for displaying an image by having liquid crystal that changes orientation in accordance with application of a voltage;
a backlight unit housing a Pulse Width Modulation (PWM) light-modulating light source configured to emit light to be supplied to the liquid crystal display panel;
a control unit configured to control the liquid crystal display panel and the backlight unit; and
a first temperature sensor for measuring the temperature of the liquid crystal, wherein
the liquid crystal is included in the liquid crystal display panel and is disposed between two substrates;
a first electrode and a second electrode are aligned opposite one another on a surface of one of the two substrates that faces the liquid crystal;
liquid crystal molecules included in the liquid crystal are of a positive type and are oriented so that a major-axis direction thereof is made to follow along a vertical direction of the two substrates in a case where a voltage is not applied to the two electrodes;
the control unit is configured to acquire response speed data of an orientation change of the liquid crystal molecules in the liquid crystal, and vary a drive frequency of the PWM light-modulation signal in accordance with the response speed data, the control unit includes,
a histogram unit configured to generate histogram data showing a frequency distribution for gradation by forming a histogram from picture data, and
a storage section configured to store an occupancy ratio threshold value, the control unit being configured to divide all gradations of the histogram data into gradation ranges and judge whether an occupancy ratio in at least one of the gradation ranges among the divided gradation ranges exceeds or is equal to or less than the occupancy ratio threshold value, wherein
in a case where the occupancy ratio exceeds the occupancy ratio threshold value, the control unit is configured to adjust the drive frequency to be less than the drive frequency in a case where the occupancy ratio is equal to or less than the occupancy ratio threshold value,
in a case where the occupancy ratio is equal to or less than the occupancy ratio threshold value, the control unit is configured to adjust the drive frequency to be greater than the drive frequency in a case where the occupancy ratio exceeds the occupancy ratio threshold value, and
the control unit is configured to vary at least one of the gradation ranges and the occupancy ratio threshold value of the occupancy ratio in accordance with the temperature data of the first temperature sensor.

2. The liquid crystal display device according to claim 1, wherein
the control unit has at least one response speed data threshold value, and
the control unit is configured to,
set a plurality of response speed data ranges using the response speed data threshold value as a boundary, and
vary the drive frequency for each of the response speed data ranges.

3. The liquid crystal display device according to claim 2, wherein the control unit is configured to vary the drive frequency for each of the response speed data ranges so as to yield an inverse relationship with a magnitude relationship of the data values in the plurality of response speed data ranges.

4. The liquid crystal display device according to claim 1, wherein the drive frequency is equal to or greater than a frame frequency.

5. The liquid crystal display device according to claim 4, wherein the drive frequency is an integral multiple of the frame frequency.

6. The liquid crystal display device according to claim 1, wherein,
the storage section is configured to store,
response speed data of the liquid crystal molecules with dependency on the liquid crystal temperature, and
at least one response speed datum as a response speed data threshold value; and
the control unit is configured to acquire the response speed data by correlating the temperature data of the first temperature sensor and the liquid crystal temperature.

7. The liquid crystal display device according to claim 1, wherein
the control unit has an FRC processing section configured to carry out frame rate control processing; and
the control unit is configured to vary the drive frequency in accordance with a presence of the frame rate control processing of the FRC processing section.

8. The liquid crystal display device according to claim 7, wherein the drive frequency in a case where the frame rate control processing is carried out, is lower than the drive frequency in a case where frame rate control processing is not carried out.

9. The liquid crystal display device according to claim 1, wherein
the control unit has a viewing mode setting section configured to switch a viewing mode of the liquid crystal display panel; and
in a case that the viewing mode setting section has switched the viewing mode, the control unit is configured to vary the drive frequency in accordance with the selected viewing mode.

10. The liquid crystal display device according to claim 9, wherein
in the case that the viewing mode setting section sets a high video level viewing mode suited for displaying an image involving rapid movement and a low video level viewing mode suited for displaying an image involving slow movement, the control unit is configured to set the drive frequency in the high video level viewing mode lower than the drive frequency in the low video level viewing mode.

11. The liquid crystal display device according to claim 9, wherein
in the case that the viewing mode setting section sets a high contrast level viewing mode and a low contrast level viewing mode in accordance with the contrast level of the picture data, the control unit is configured to vary the drive frequency for each of the high contrast level and low contrast level viewing modes so as to be in an inverse relationship with the high-low relationship of the contrast levels in the plurality of viewing modes.

12. The liquid crystal display device according to claim 1, wherein the control unit is configured to,
   acquire exterior illumination intensity data ranges, and
   vary the drive frequency in accordance with the illumination intensity data ranges.

13. The liquid crystal display device according to claim 12, wherein the control unit is configured to vary the drive frequency for each of the illumination intensity data ranges so as to be in an inverse relationship with a magnitude relationship of data values in each of the plurality of illumination intensity data ranges.

14. The liquid crystal display device according to claim 12, comprising an illumination intensity sensor for measuring exterior illumination intensity, wherein the illumination intensity data is the illumination intensity measured by the illumination intensity sensor.

15. The liquid crystal display device according to claim 1, wherein the control unit is configured to synchronize a final timing in a single frame interval and a final timing of a high interval in the PWM light modulation signal.

16. The liquid crystal display device according to claim 1, wherein
   a plurality of the light sources are arranged so as to be configured to partially supply light to a surface of the liquid crystal display panel; and
   when the plurality of light sources are divided, and the divided single or plurality of light sources constitutes a divided light source, the control unit is configured to vary the drive frequency for each of the divided light sources.

17. The liquid crystal display device according to claim 16, wherein in the case that the number of divided light sources is a plurality,
   the divided light sources are configured to,
      emit linear light in a plane of the liquid crystal display panel,
      emit light in accordance with blocks obtained by dividing a plane interior in an ordered fashion, or
      emit light in accordance with a partial area in the plane.

18. The liquid crystal display device according to claim 1, wherein the control unit,
   has a function for overdriving the voltage applied to the liquid crystal; and
   is configured to vary the drive frequency in accordance with the presence of the overdriving.

19. A liquid crystal display device comprising:
   a liquid crystal display panel for displaying an image by having liquid crystal that changes orientation in accordance with application of a voltage;
   a backlight unit housing a Pulse Width Modulation (PWM) light-modulating light source configured to emit light to be supplied to the liquid crystal display panel; and
   a control unit configured to control the liquid crystal display panel and the backlight unit, wherein
   the liquid crystal is included in the liquid crystal display panel and is disposed between two substrates,
   a first electrode and a second electrode are aligned opposite one another on a surface of one of the two substrates that faces the liquid crystal,
   liquid crystal molecules included in the liquid crystal are of a positive type and are oriented so that a major-axis direction thereof is made to follow along a vertical direction of the two substrates in a case where a voltage is not applied to the two electrodes,
   the control unit includes a Frame Rate Control (FRC) processing section configured to,
      carry out frame rate control processing,
      acquire response speed data of an orientation change of the liquid crystal molecules in the liquid crystal, and
      vary a drive frequency of a PWM light modulation signal in accordance with the response speed data and the presence of frame rate control processing of the FRC processing section, and
   the drive frequency in a case where the control unit carries out frame rate control processing, is lower than the drive frequency in a case where the control unit does not carry out the frame rate control processing.

* * * * *